(12) United States Patent
LeCrone et al.

(10) Patent No.: US 7,024,528 B2
(45) Date of Patent: Apr. 4, 2006

(54) STORAGE AUTOMATED REPLICATION PROCESSING

(75) Inventors: Douglas E. LeCrone, Hopkinton, MA (US); Brett A. Quinn, Lincoln, RI (US); Ronald G. Haupert, Circle Pines, MN (US); Gary H. Cox, Franklin, MA (US); Eugene D. Pflueger, Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 421 days.

(21) Appl. No.: 10/225,021

(22) Filed: Aug. 21, 2002

(65) Prior Publication Data

US 2004/0039888 A1 Feb. 26, 2004

(51) Int. Cl.
*G06F 12/16* (2006.01)

(52) U.S. Cl. ........................................ 711/162; 707/204
(58) Field of Classification Search ................. 707/204; 711/162; 714/6
See application file for complete search history.

(56) References Cited

U.S. PATENT DOCUMENTS

| | | | |
|---|---|---|---|
| 5,544,347 A | | 8/1996 | Yanai et al. |
| 5,742,792 A | | 4/1998 | Yanai et al. |
| 5,901,327 A | * | 5/1999 | Ofek ............................. 710/5 |
| 6,035,412 A | * | 3/2000 | Tamer et al. ................... 714/6 |
| 6,101,497 A | | 8/2000 | Ofek |

OTHER PUBLICATIONS

Lotus Development Corporation, Domino 5 Administration Help, 2000, IBM, R5.0.3, Chapters 4,6 and 9 of Administering the Domino System and Chapter 1 of the Administering Domino Clusters.*
http://www–10.lotus.com/ldd/notesua.nsf/
0b345eb9d127270b8525665d006bc355/
a101031f22b3563e852568b60067a1f2?OpenDocument.*
Pending U.S. Appl. No. 09/613,118, filed Jul. 10, 2000.
Pending U.S. Appl. No. 09/338,328, filed Sep. 1, 1999.
Pending U.S. Appl. No. 09/591,827, filed Jun. 12, 2000.
Pending U.S. Appl. No. 09/997,810, filed Nov. 30, 2001.
Pending U.S. Appl. No. 09/998,683, filed Nov. 30, 2001.
Pending U.S. Application Reference No. EMC–01–163, filed Apr. 29, 2002.

* cited by examiner

*Primary Examiner*—Gary Portka
(74) *Attorney, Agent, or Firm*—EMC Corporation

(57) ABSTRACT

Described are techniques used in performing data replication processing. Data is replicated on a recovery site from a production site. When a disaster occurs, the state of the replication processing is determined and a restart copy of the data is made available from the recover site. Processing continues based on whether protection mode is desired such that the system executes using the recovery site as the restart with a replicated copy of the data. Data is propagated from the recovery site to the production site to resume operations and replication processing originating from the production site.

15 Claims, 60 Drawing Sheets

200 { ADD seq#,process-name,
HOP_Type(SINGLE|MULTI[,MAXGrp(xxxx)[,MAXDev(yyyy)[,MAXMsg(zzzz)]]])

210 {
MODify seq#,process-name,
DEFINE,
  [DEvice_List(SRCRIBCV(cuus|cuus-cuus|symdv#|symdv#-symdv#)],
  [SRCSTD(cuup|cuup-cuup|symdv#|symdv#-symdv#[,ragroup][,cuug]])],
  [TGTBCV(symdv#|symdv#-symdv#)]
  [,CYCle(hh:mm:ss[,0-9999])]
  [,CYCle_OverFlow(NEXT|IMMED)]
  [,TIMEOUT(15|ssss,TERM)]
  [,MSGOPT([BUFfered][,WTO[(nn)]])]
—RESTART
—START
  [CYCle(hh:mm:ss[,0-9999])]
  [CYCle_OverFlow(NEXT|IMMED)]
  [TIMEOUT(15|ssss,TERM)]
—STOP(NORMal|STEP|FORCE)
—QUERY(STATUS|DEvices|MSG[,RETAIN])
—WAIT 216 { DELete seq#,process-name

FIG. 12

220 ~ STOP jobname,SAR,STOP,process-name[,STEP|FORCE]

FIG. 13

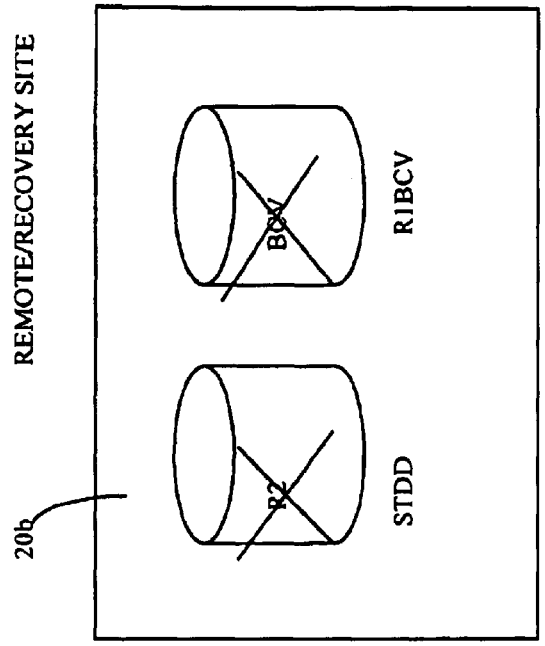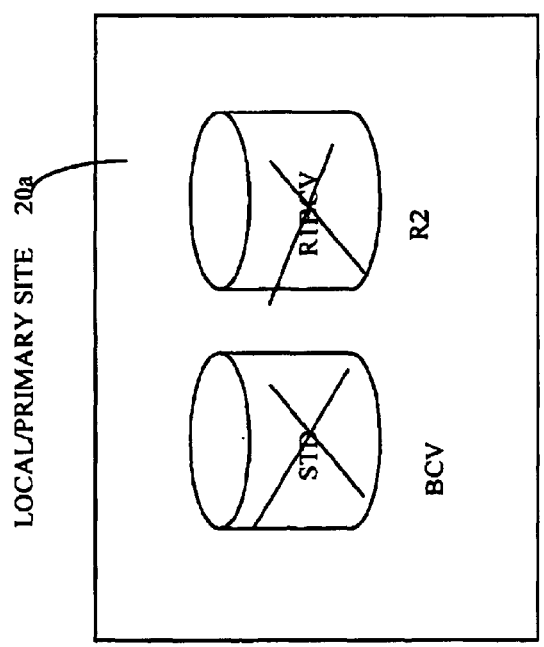
FIGURE 24

2450

2452 — ESTABLISH SOURCE BCVs (BUNKER)
```
//ESTAB    JOB CSE,TF51,CLASS=A,MSGCLASS=X
//EMCTF       EXEC PGM=EMCTF,REGION=1M,PARM='SAR_RESTART'
//STEPLIB     DD  DSN=CSEPROD.TFV510.LINKLIB,DISP-SHR
//SYSOUT      DD  SYSOUT=*
//SYSIN       DD  *
GLOBAL       MAXRC=4
ESTABLISH 01,RMT(D010,0140-0144-0010-0014,0)
/*
```

2454 — ESTABLISH TARGET BCVs
```
//ESTABR    JOB CSE,TF51,CLASS=A,MSGCLASS=X
//EMCTF       EXEC PGM=EMCTF,REGION=1M
//STEPLIB     DD  DSN=CSEPROD.TFV510.LINKLIB,DISP-SHR
//SYSOUT      DD SYSOUT=*
//SYSIN       DD  *
GLOBAL       MAXRC=4
ESTABLISH 01,RMT(D010,00A0-00A4,0000-0004,0.3)
/*
```

2456 — SPLIT SOURCE BCVs
```
//SPLITRMT  JOB CSE,TF51,CLASS=A,MSGCLASS=X,NOTIFY=USER1
//EMCTF       EXEC PGM=EMCTF,REGION=1M
//STEPLIB     DD  DSN=CSEPROD.TFV510.LINKLIB,DISP-SHR
//SYSOUT      DD  SYSOUT=*
//SYSIN       DD  *
GLOBAL       MAXRC=4
SPLIT 01,RMT(D010,0140-0144,0),WAIT(0030)
/*
```

2458 — RE-ESTABLISH SOURCE BCVs
```
//ESTAB    JOB CSE,TF51,CLASS=A,MSGCLASS=X
//EMCTF       EXEC PGM=EMCTF,REGION=1M,PARM='SAR_RESTART'
//STEPLIB     DD  DSN=CSEPROD.TFV510.LINKLIB,DISP-SHR
//SYSOUT      DD  SYSOUT=*
//SYSIN       DD  *
GLOBAL       MAXRC=4
RE-ESTABLISH 01,RMT(D010,0140-0144,0)
/*
```

2460 — SPLIT TARGET BCVs
```
//ESTABR    JOB CSE,TF51,CLASS=A,MSGCLASS=X
//EMCTF       EXEC PGM=EMCTF,REGION=1M
//STEPLIB     DD  DSN=CSEPROD.TFV510.LINKLIB,DISP-SHR
//SYSOUT      DD SYSOUT=*
//SYSIN       DD  *
GLOBAL       MAXRC=4
SPLIT 01,RMT(D010,00A0-00A4,0.3)
/*
```

```
//FFOMIN30 JOB CSE,SAR,CLASS=A,MSGCLASS=X,NOTIFY=FFOMIN1
//EMCTF     EXEC PGM=EMCTF,REGION=1M
//STEPLIB   DD  DSN=CSETEST.TFV510.LINKLIB,DISP=SHR
//SYSOUT    DD  SYSOUT=*
//SYSIN     DD  *
GLOBAL     MAXRC=4
ADD     01,SARTEST03,HOP_TYPE(MULTI)
MODIFY  02,SARTEST03,DEFINE,
        DEFINE_LIST(SRCR1BCV(0140-0144),
                    SRCSTD(D010-D014),
                    TGTBCV(00A0-00A4))
MODIFY  03,SARTEST03,DEFINE,CYCLE(00:01:00,0),TIMEOUT(15)
MODIFY  05,SARTEST03,START
/*
```

STORAGE AUTOMATED REPLICATION PROCESSING

BACKGROUND

1. Technical Field

This application generally relates to computer systems, and more particularly to computer data storage.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks, such as data backup and mirroring operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

A computer system may utilize techniques in connection with data storage to provide for multiple copies of data that are as current as possible to be used, for example, in the event of a system disaster at a data storage site.

Referring to FIG. 50, shown is an example of a prior art system 2000 utilizing data replication techniques. The host 2002 communicates with the primary data storage 2004*a* to perform data processing operations, such as data read and write operations. The system 2000 includes a mirror copy of the data of device 2004*a* in device 2004*b*. The mirror copy 2004*b* may be stored locally, or within close proximity to device 2004*a*, rather than at a remote other geographic location. The device 2004*a* may be a master storage device having one or more slave storage devices, such as 2004*b* and 2004*c*. Device 2004*c* may be remotely located with respect to 2004*a* and 2004*b*. The data storage devices 2004*a*–2004*c* may communicate using the Remote Data Facility (RDF) product as provided by EMC Corporation. The devices 2004*a*–2004*c* may be one or more Symmetrix™ data storage systems. RDF may be used facilitate copying of data between storage devices. The host 2002 interacts with the device 2004*a* but data updates may be automatically propagated to devices 2004*b* and 2004*c* using RDF. The devices 2004*a*–2004*b* and 2004*b*–2004*c* may be connected by a data link, such as an ESCON link or Fibre Channel link. The RDF functionality may be facilitated with an RDF adapter (RA) provided within each storage device 2004*a*–2004*c*.

When 2004*b* is remote with respect to 2004*a*, devices 2004*a* and 2004*b* communicate in a synchronous mode such that the host receives an acknowledgement that a write operation is complete when it has been written to both devices. Device 2004*a* may send the host an acknowledgement that the data operation is complete after receiving a completion acknowledgement from device 2004*b*. Devices 2004*b* and 2004*c* may communicate using an asynchronous communication mode.

It may be that the copy of data to be used, for example, in connection with performing data recovery operations, is remotely located, such as device 2004*c*, rather than locally located, such as device 2004*b*. Communications with such remote devices may performed asynchronously, as described above. If a remote device is used in connection with, for example, data recovery operations, the remote device 2004*c* may not contain an up-to-date copy of the data of device 2004*a*.

Another technique may utilize Business Continuance Volumes (BCVs). BCVs, and data operations used in connection therewith, are described in U.S. Pat. No. 6,101,497, filed on Apr. 25, 1997, which is incorporated by reference herein. Referring again to FIG. 50, the data storage system 2004*a* may include a BCV device for each standard device to which the host 2002 may perform data operations. A standard device may be characterized as a device configured for use with host applications. The BCV may be attached to a standard device. Subsequently, the BCV may be split consistently from the associated STD device to provide a copy of the data on the BCV device for some other purpose. In other words, after the BCV is attached and achieves a state of synchronism with the standard device R1, the BCV may be split or detached from the standard device. The copy of data on the BCV device may then be available for use by other applications, for example, an ancillary application such as a backup or remote copy application that copies data from the device 2004*b*. The BCV allows for a consistent copy of data on the standard device to be maintained and then independently allows another application to act on the data copy while letting the host perform continued data operations to the standard device. However, this technique may also have the drawback that the copy of the data on the device 2004*b* may not be an up-to-date copy of the data in the standard device.

Thus, it may be desirous and advantageous to have an efficient technique which provides automated data replication processing to provide one or more consistent copies of data wherein a copy of data is as current as possible. It may also be desirable and advantageous to provide a copy of data that is restartable from a remote data storage site different from a local data storage site, for example, in the event of a disaster at the local data storage site. It may be desirable that such techniques be automated and may be used in connection with one or more groups of devices.

SUMMARY OF THE INVENTION

In accordance with one aspect of the invention is a method executed in a computer system for performing automated data replication from a first site to a second site comprising: performing a consistent split data operation splitting a synchronized copy of data from a first device in a first site, said synchronized copy being a consistent point in time copy of data from said first device; replicating said synchronized copy of data to a second device included in said second site; and performing incremental synchronization of said second device to a third device included in said second site, wherein commands are issued from a host computer to control said automated data replication.

In accordance with another aspect of the invention is a computer system comprising: at least three data storage systems including a primary site, a secondary site and a target site, said secondary site being between said primary and target sites; a host computer connected to said primary site including instructions that: automatically control replication of consistent point in time copies of data from said secondary site to said target site; perform a consistent split data operation splitting a synchronized copy of data from a first device in said secondary site, said synchronized copy being a consistent point in time copy of data from said first device, said first device being a mirrored copy of data from a standard device included in said primary site; replicate said synchronized copy of data to a second device included in said target site; and perform incremental synchronization of said second device to a third device included in said target site.

In accordance with another aspect of the invention is a computer system comprising: at least two data storage systems including a primary site and a target site; a host computer connected to said primary site including instructions that: automatically control replication of consistent point in time copies of data from said primary site to said target site; perform a consistent split data operation splitting a synchronized copy of data from a first device in said primary, said synchronized copy being a consistent point in time copy of data from said first device; replicate said synchronized copy of data to a second device included in said target site; and perform incremental synchronization of said second device to a third device included in said target site.

In accordance with yet another aspect of the invention is a computer program product for performing automated data replication from a first site to a second site comprising: machine executable code that performs a consistent split data operation splitting a synchronized copy of data from a first device in a first site, said synchronized copy being a consistent point in time copy of data from said first device; machine executable code that replicates said synchronized copy of data to a second device included in said second site; and machine executable code that performs incremental synchronization of said second device to a third device included in said second site, wherein commands are issued from a host computer to control said automated data replication.

BRIEF DESCRIPTION OF THE DRAWINGS

Features and advantages of the present invention will become more apparent from the following detailed description of exemplary embodiments thereof taken in conjunction with the accompanying drawings in which:

FIGS. 12–13 are examples of commands that may be included in an embodiment of the computer system of FIG. 1;

FIGS. 14–15A are examples of embodiments illustrating a sequence of commands described herein in connection with data replication processing;

FIGS. 21B–25 are examples of steps of an embodiment for performing reverse SAR processing;

FIG. 44B are examples of commands that may be executed to perform the processing steps of FIG. 44A;

DETAILED DESCRIPTION OF EMBODIMENT(S)

Figure 1:
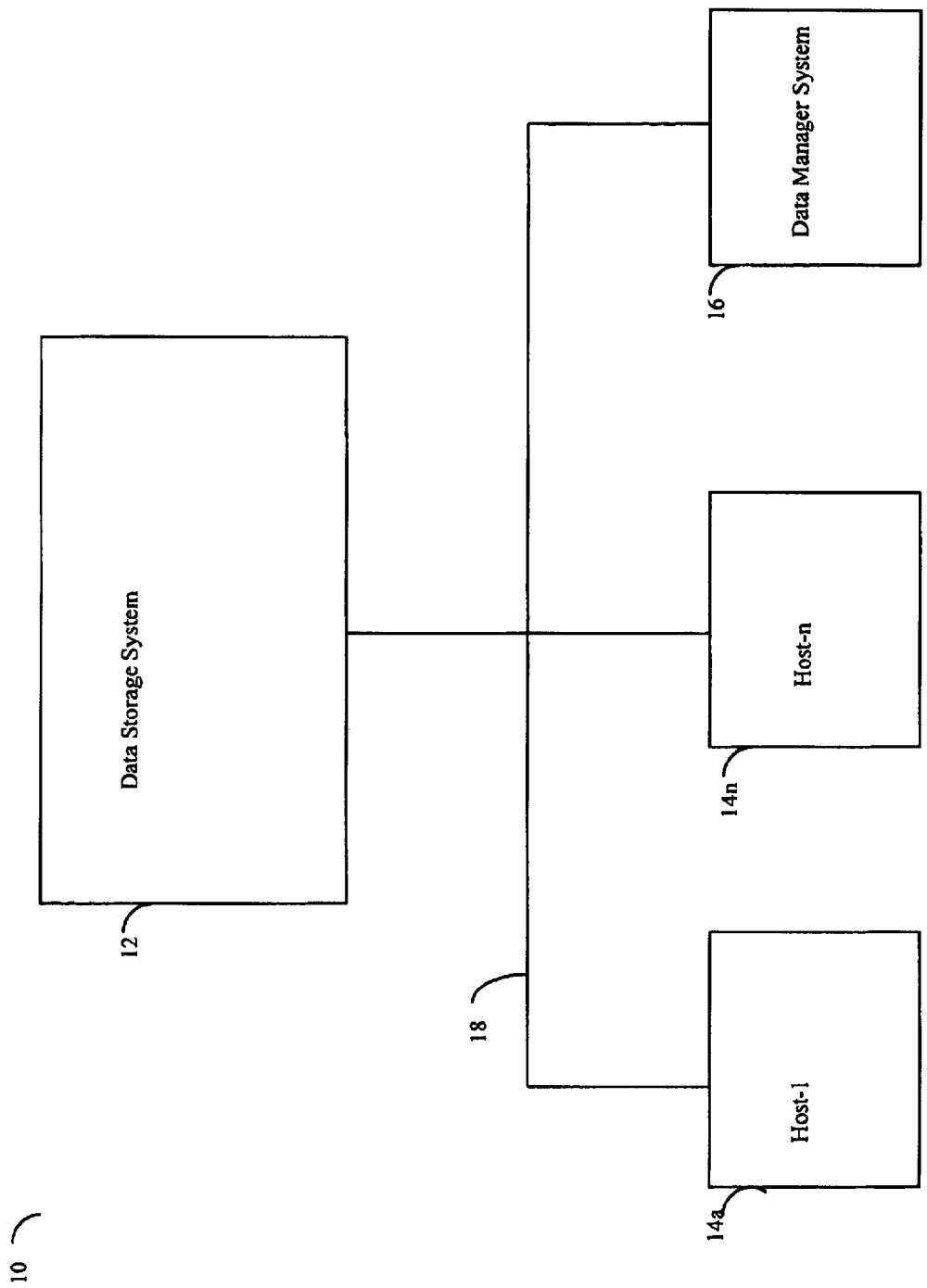
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI (Small Computer System Interface), ESCON, Fibre Channel, or GIGE (Gigabit Ethernet), FICON and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, or other administrative operation and may do so while performing data requests to the data storage system 12.

Figure 2:
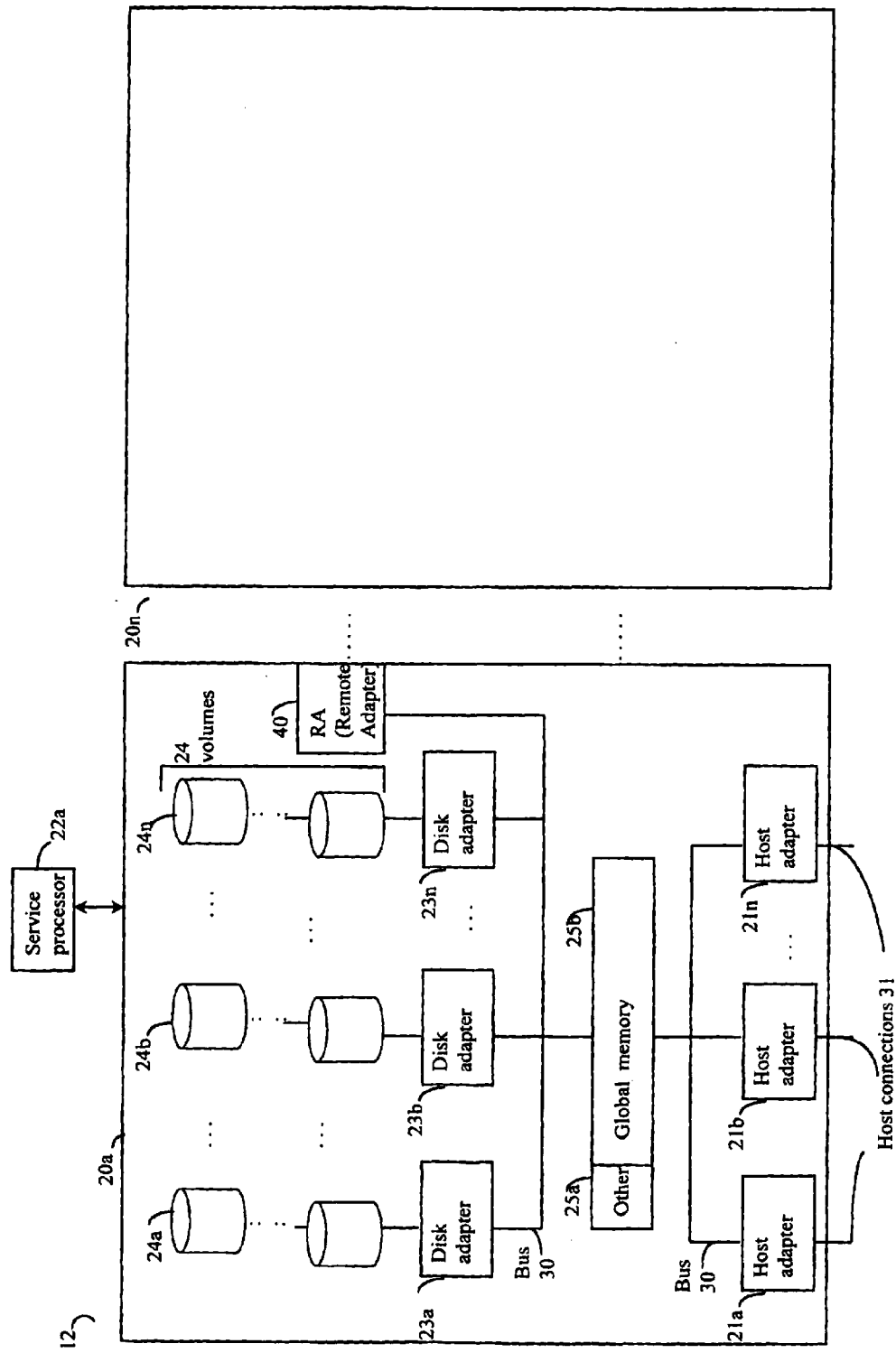
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix™ data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix™ data storage system and a host system. The RAs may be used in facilitating communications between two Symmetrix™ data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations in connection with multiple LVs that may reside on a disk. The DA may accomplish this by creating job records for the different LVs associated with the particular DA. These different job records may be associated with the different LVs in a data structure stored and managed by each DA.

Figure 3:
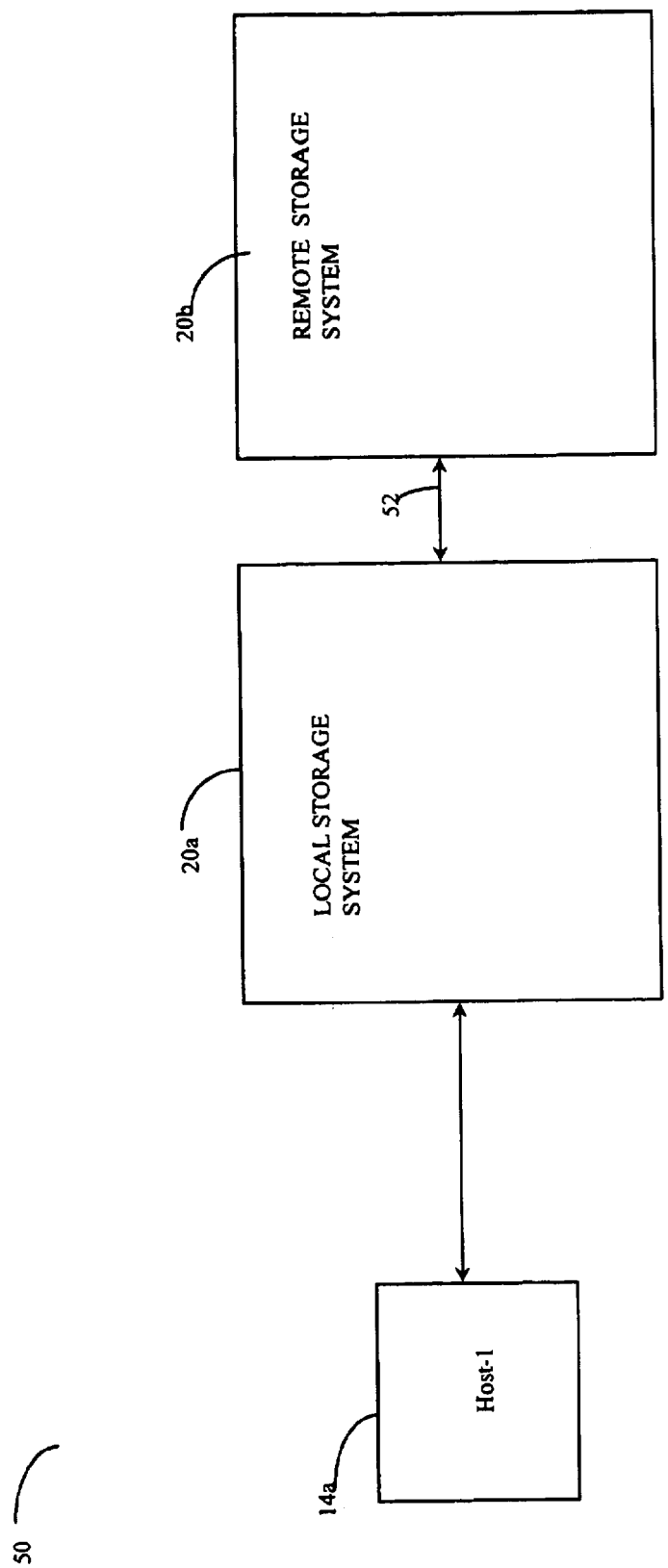
FIG. 3 is an example of an embodiment of portions of the computer system of FIG. 1.

Referring now to FIG. 3, shown is an example of an embodiment of a computer system 50 that includes elements of the previously described computer system of FIG. 1. It should be noted that elements of the computer system 50 are a simplified view of those previously described in connection with the system of FIG. 1. In this example, one of the hosts, such as 14a, performs data operations to a local storage system 20a. Data from a local storage system 20a may be copied to a remote storage system 20b, for example, using an RDF connection or other type of link such that the data of the remote storage system 20b is identical to the data in a local storage system 20a.

It should be noted that there may be a time delay between the transfer of data from the local storage system 20a to the remote storage system 20b. Therefore, at certain points in time, the data in 20a may not be identical to that which is contained in 20b. Data storage device communication between Symmetrix™ data storage systems using RDF is described, for example, in U.S. Pat. Nos. 5,742,792 and 5,544,347, both of which are incorporated by reference herein. As described elsewhere herein, the storage systems 20a and 20b may communicate using RDF as facilitated by an RDF adapter unit or RA that may be included in each of the storage systems 20a and 20b. RAs may be included in each of the local and remote storage systems 20a and 20b, respectively, and may be coupled via the RDF link 52 used to transfer data between the local and remote storage systems.

In the example 50, the host 14a reads and writes data to and from logical devices that may be included in the local storage system 20a. RDF may be used to cause any data modifications to be transferred from the local storage system 20a to the remote storage system 20b using RAs included in each of the local storage systems and also using the RDF link 52.

In the following paragraphs, a logical device on the local storage system 20a that may be accessed by the host 14 may be referred to as the "R1 volume", or just "R1". A logical device on the remote storage system 20b that contains a copy of the data of the R1 volume may be referred to as the "R2 volume" or just "R2". The host 14a may read and write data to and from the R1 volume. RDF will handle the automatic copying and updating of the data from the R1 volume to the R2 volume.

As described herein, RDF is software that provides an on-line host independent data storage system solution for duplicating production site data on one or more physically separated target Symmetrix data storage systems. A local RDF device, also referred to as the source or R1 device as described herein, may be configured in a pairing relationship with a remote or target R2 device forming an RDF pair. While the R2 device is mirrored with the R1 device, the R2 device may be write disabled and "not ready" from a host's point of view. In this example, a "not ready" status means that a device is disabled for both read and writes with respect to operations issued from the host. After the R2 device becomes synchronized with its R1 device, the R2 device may be suspended from the R1 device making the R2 device fully accessible again to its host. After the split, the R2 device contains valid data and may be used in connection with other tasks.

The TimeFinder software product by EMC Corporation works by configuring multiple independently addressable on-line business continuance volumes or BCVs for information storage. The BCV in this example may be a Symmetrix data storage device having special attributes created when the Symmetrix data storage system is configured. The BCV may function either as an additional mirror, or alternatively, as an independent host addressable volume.

Establishing and splitting BCV devices as mirrors of active production volumes allows for separate tasks to run simultaneously. The principal or main device as described herein may also be referred to as the standard device (STD) that remains on line for the regular Symmetrix data storage device operations from the original server. When a BCV is established as a mirror of a standard device such as STD described herein, that relationship may also be referred to as a BCV pair. The BCV may be temporarily inaccessible to its host until the BCV pair is split as in connection with a split operation described herein.

It should be noted that additional details as to the local storage system 20a and the remote system 20b in one particular embodiment are described in more detail in following paragraphs in connection with steps for performing storage automated replication (SAR) processing. It should also be noted that although the local and remote storage systems 20a and 20b described herein may be referred to as Symmetrix™ data storage systems, techniques described herein may be used in connection with other types of data storage systems and are not limited to the particulars set forth herein.

In SAR processing steps described herein, various data structures may be used that are stored in the host and/or the data storage devices. Information included in these data structures may be communicated to an application using Application Programming Interface (API) calls. For example, in one embodiment, a Symmetrix data storage system may include a track status block or table of information regarding the validity of data storage tracks. An API request, such as may be included in part of the underlying system software, may communicate data included in the table to an executing application. The techniques of providing and storing information used in connection with SAR processing steps may vary in accordance with each embodiment.

Various commands and terms are used herein, such as BCVs and associated commands, such as ESTABLISH, SPLIT, RE-ESTABLISH, and RESTORE, are described in U.S. Pat. No. 6,101,497, which is herein incorporated by reference. Additionally, the TimeFinder product by EMC Corporation and the CONSISTENT SPLIT/CONSISTENT SNAP commands for BCVs are described in U.S. patent application Ser. No. 09/613,118, filed on Jul. 10, 2000, which is herein incorporated by reference. CONSISTENT SPLIT operations may also be performed using techniques as described in U.S. patent application Ser. No. 10/134,420, filed on Apr. 29, 2002, entitled "Method and Apparatus for Enhancing Operations in Disk Array Storage Devices, which is incorporated by reference herein. Consistency groups and consistency group trip events are described in U.S. patent application Ser. No. 09/388,328 filed on Sep. 1, 1999, which is herein incorporated by reference.

What will now we described is a SAR technique that facilitates setting up and controlling repeated cycles of consistent SPLITs against remotely mirrored BCVs in an RDF configuration. The SAR technique may provide a restartable image of data at a remote site that is as current as possible in the event of a disaster at a production site, such as the local storage system. SAR ensures that a dependent write consistent (i.e., restartable) image of data is perpetually propagated to the recovery site, such as a remote storage system $20b$, in an automated fashioned under the control of the Symmetrix™ Control Facility (SCF) address space that may be included, for example, in the TimeFinder product set by EMC Corporation. These and other components that may be included in a host system are described elsewhere herein in more detail.

It should be noted that SAR techniques that will be described herein may be utilized in connection with a single-hop or a multi-hop RDF configuration.

When using a multi-hop configuration, the SAR techniques described herein may be coupled with the consistency group. An embodiment may also use the techniques described in U.S. patent application Ser. No. 10/134,420, filed on Apr. 29, 2002, entitled "Method and Apparatus for Enhancing Operations in Disk Array Storage Devices, in maintaining consistent copies of data. The coupling of the multi-hop configuration with the consistency group may be used to create a robust disaster restart infrastructure.

As will be described herein, the SAR techniques may utilize the consistent SPLIT functionality which performs a consistent SPLIT across the plurality of devices, such as those in a consistency group, requested in the same SPLIT command sequence level. The execution of the consistent SPLIT suspends all host I/O operations to the devices that are being split. The techniques that will be described herein extend the functionality of this consistent SPLIT functionality by automatically repeating and monitoring consistent SPLIT cycles. Additionally, the technique described herein may be used with multiple Symmetrix™ data storage system configurations.

An embodiment implementing SAR techniques described herein may use processes that each control a group of devices to be SPLIT consistently. Multiple processes may be defined. Each of the named processes, which are SAR processes, may be started, stopped, and restarted at particular points in time. The control structures for each of the processes may be retained until the process is deleted. A SAR process may therefore be stopped and restarted sometime later. Control structures necessary for the execution of a particular SAR process may be loaded as each of the SAR processes are restarted for example in connection with performing a context switch of a process. These are described in more detail elsewhere herein.

The data copy created by the SAR processing is a consistent copy. The term consistent as described herein refers to the concept of dependent write I/O operations. A dependent write may be referred to as a write that will not be issued by an application unless some prior write I/O has completed. Applications, such as database management systems (DBMS), have dependent write logic embedded in them to ensure data integrity in the event that a failure occurs in the host processor software or storage subsystem. For example, consider a database update. When a DBMS updates a database, it first writes to the disk containing the log. The DBMS then subsequently writes the data to the actual database data set and then again finally writes to the log volume to indicate that the database update was made. These three write I/O operations, to the log, to the database and then once again to the log, are related and each I/O operation is not issued until the prior I/O operation has successfully completed. Consistent split operations as described herein prevent dependent I/O operations from being issued by an application during the split process thus ensuring integrity and consistency of the data on the BCV copy. This results in a copy of the data that is restartable or "dependent write consistent".

In connection with performing a consistent split as may be executed from the host system using the TimeFinder software commands described herein, the TimeFinder software may provide for suspending any host I/Os to the entire group of devices, as may be included in the same consistency group, defined in the same command sequence level, execute an instant split of the BCV devices, and then release any I/Os to the standard devices. In the foregoing SAR configuration, the BCVs may also be configured as R1 devices. After an instant split operation is executed, RDF immediately starts an incremental synchronization of the R1 BCVs with the corresponding R2 devices. In connection with devices as described herein for one embodiment, all devices that are used by a common application are part of the same consistency group. Multiple consistency groups may be defined which may require the use of multiple SAR processes to be defined. This technique may be used when the applications are independent and when the business recovery is not affected by time differences among the multiple consistency groups. When there is an interrelationship among applications, or when the business recovery requires a common time of recovery, a single consistency group may be considered. It should be noted that a consistency group may span multiple Symmetrix data storage systems and that a single consistency group may be created for an entire production environment.

What will now be described in more detail are steps that may be included in an embodiment of the SAR process. The SAR process may be divided into a series of steps. It should be noted that it is possible to stop a cycle at the end of a step, and than later restart from that particular point on. The particular example described in following paragraphs may be referred to as a single-hop embodiment rather than a multi-hop embodiment which is described in more detail elsewhere herein.

Figure 4:
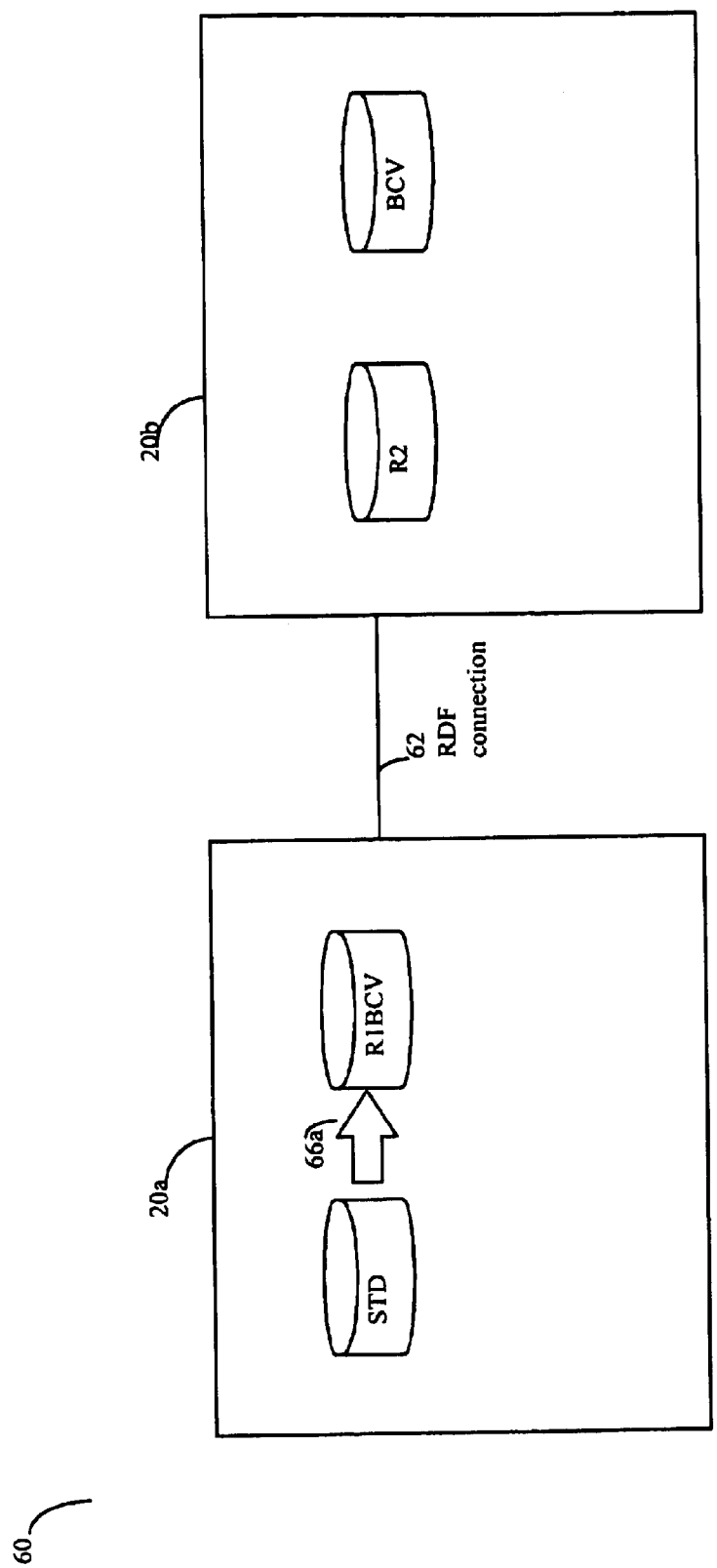
FIGS. 4–9 illustrate examples of processing steps in connection with performing automated data replication processing in one embodiment.

Referring now to FIG. 4, shown is an example 60 of data storage systems 20a and 20b that may be included in a computer system. In this example, the data storage system 20a may be a local data storage system accessed, for example, by a host computer (not shown). It should be noted that the systems 20a and 20b may also be referred to as, respectively, source and target data storage systems. The source data storage system may be referred to as having source devices and the target data storage system may be referred to as having target devices. The data storage system 20b may be a remote data storage system that is used as a secondary site for the data contained in the data storage device 20a. R2 may be the remote device corresponding to the device STD or R1 in FIG. 4, storage system 20a. The data storage system 20a may communicate with data storage system 20b in this and following processing steps using one or more RDF connections 62.

The first step illustrated by the example 60 is that all source devices are validated. All source BCV pairs are correctly established such that there is an association, for example, between the STD and the R1BCV as demonstrated by arrow 66a. This may be performed using the ESTABLISH command. In one embodiment, all source BCV pairs are correctly established if splits are not in progress, there are no invalid tracks, and the BCV is not held or allocated for another use within the system configuration.

The ESTABLISH command may be characterized as effectively connecting the R1BCV as a mirror volume of STD. The R1BCV volume synchronizes with the device STD.

Figure 5:
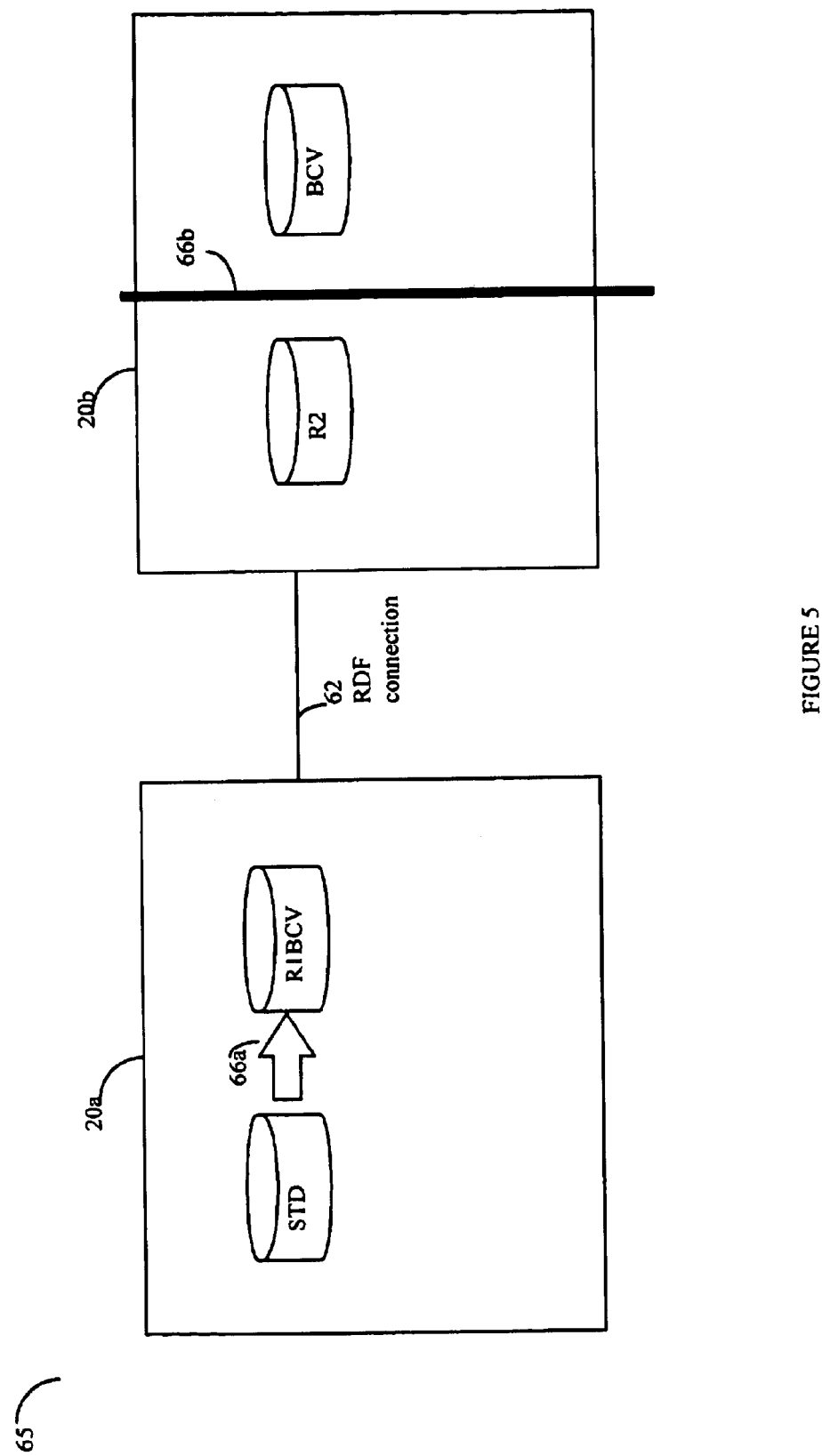

Referring now to FIG. 5, shown is an example 65 of the data storage system devices 20a and 20b where the target devices are validated such that all target BCV pairs are SPLIT and have a relationship to the STD device specified in the input. For example, the device R2 may be a mirror of the device R1BCV. This SPLIT between R2 and the BCV included in the storage system 20b is illustrated by line 66b. The foregoing step may be performed using the SPLIT command. The SPLIT command effectively unlinks or disconnects the BCV of the system 20b from the device R2.

Figure 6:
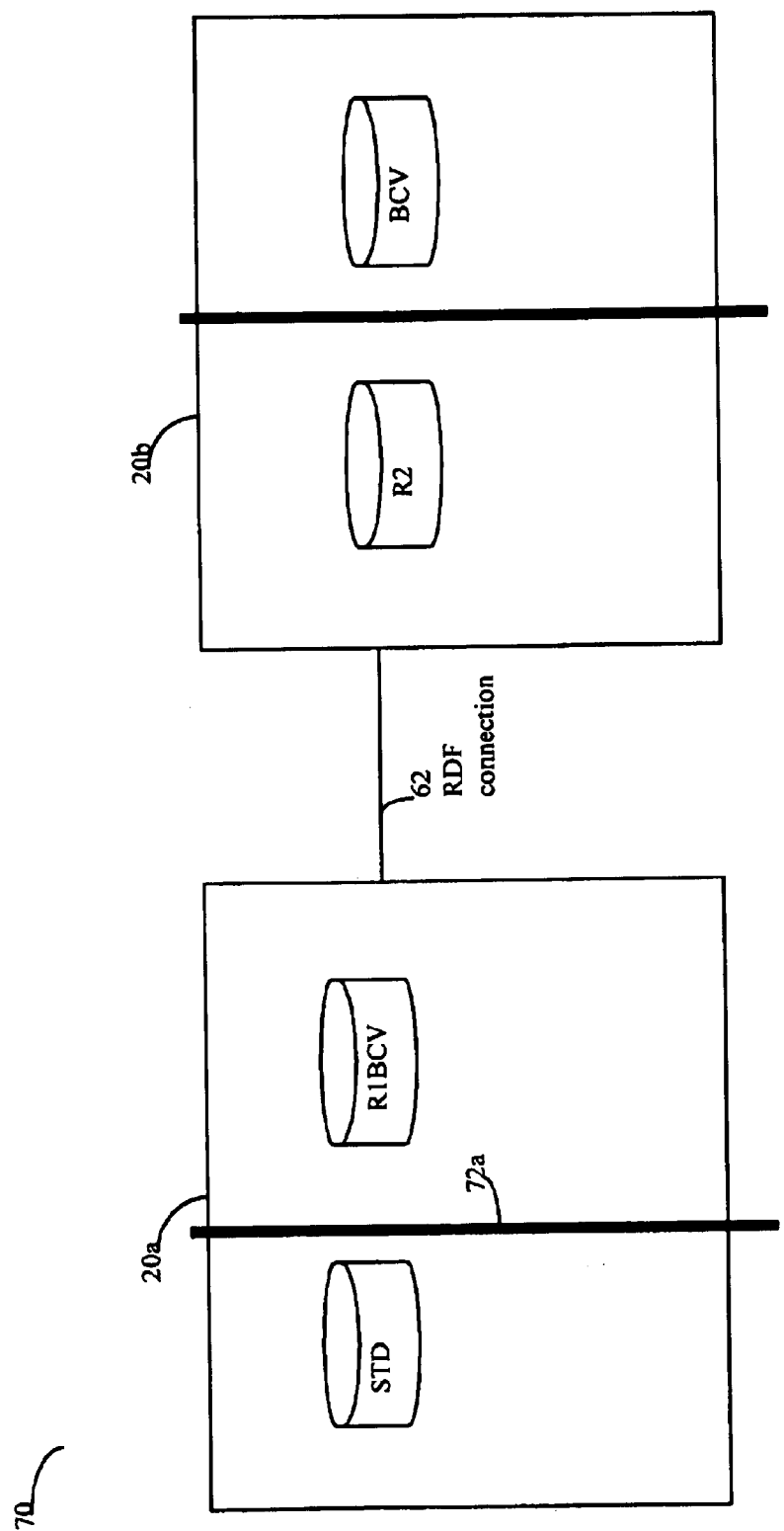

Referring now to FIG. 6, shown is an example 70 that illustrates the next SAR step in which a CONSISTENT SPLIT is performed on the source BCVs. This is illustrated by the line 72a which splits the STD from the R1BCV. The CONSISTENT SPLIT operation ensures that a group of BCVs with a common data set or application can be SPLIT with the assurance that the data on all the SPLIT BCV devices will be dependent write consistent and restartable. As described in more detail herein, the CONSISTENT SPLIT operation may be used in connection with performing a CONSISTENT SPLIT of a set of devices such that write I/O operations to this set of devices are suspended and then a split of the devices is performed. The set of devices may form a consistency group. Although the descriptions herein, such as in connection with FIG. 6, show only a single device in the systems 20a and 20b, this is for illustration purposes. An embodiment may include a plurality of such source and target devices and pairings as described herein in connection with FIG. 6 such that, for example, the operation of a CONSISTENT SPLIT is performed with respect to all the source devices included in the same consistency group.

Figure 7:
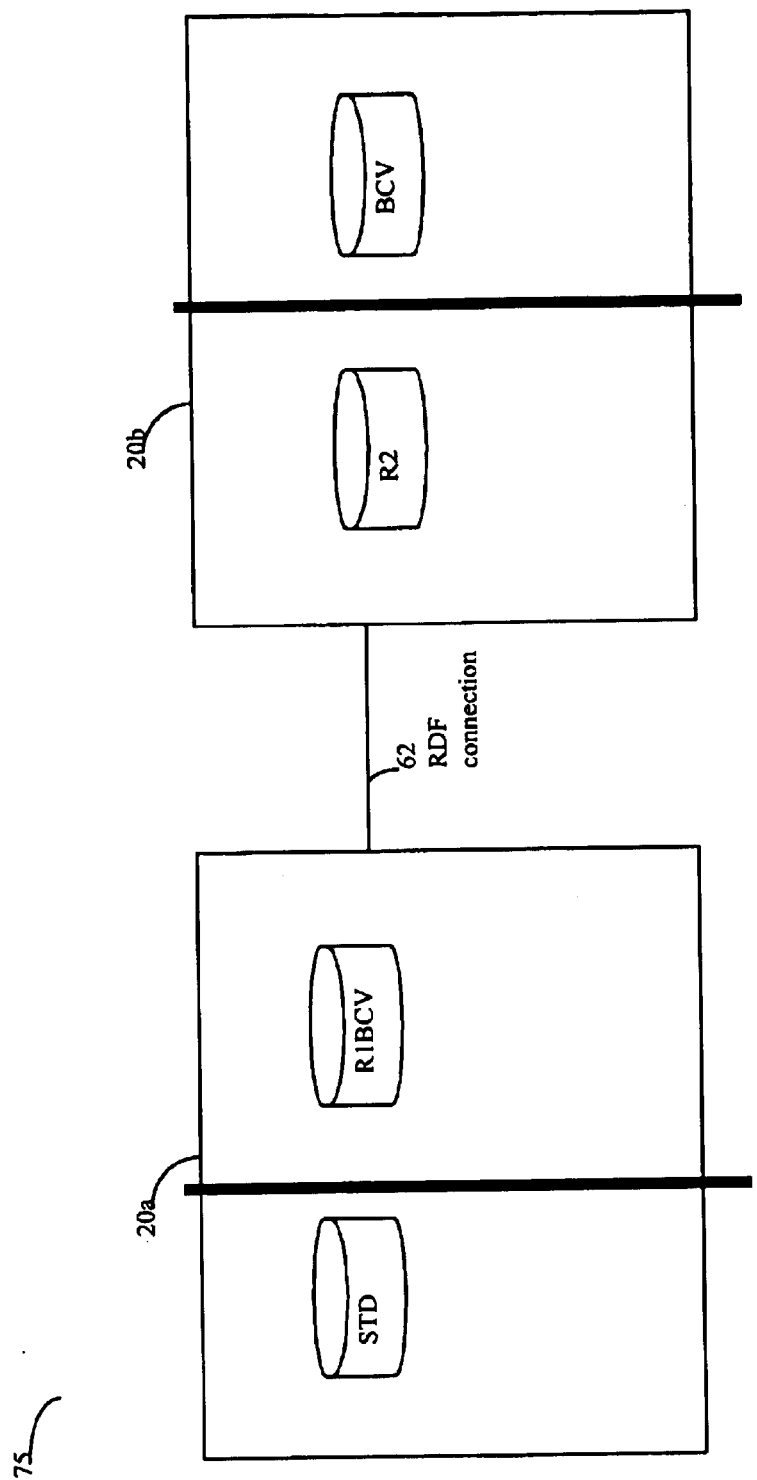

Referring now to FIG. 7, shown is an example 75 illustrating the next subsequent steps in the SAR process in which there is a wait for the source R1BCVs to synchronize with the target R2 device. In this embodiment, the devices may transfer data using an RDF connection.

Figure 8:
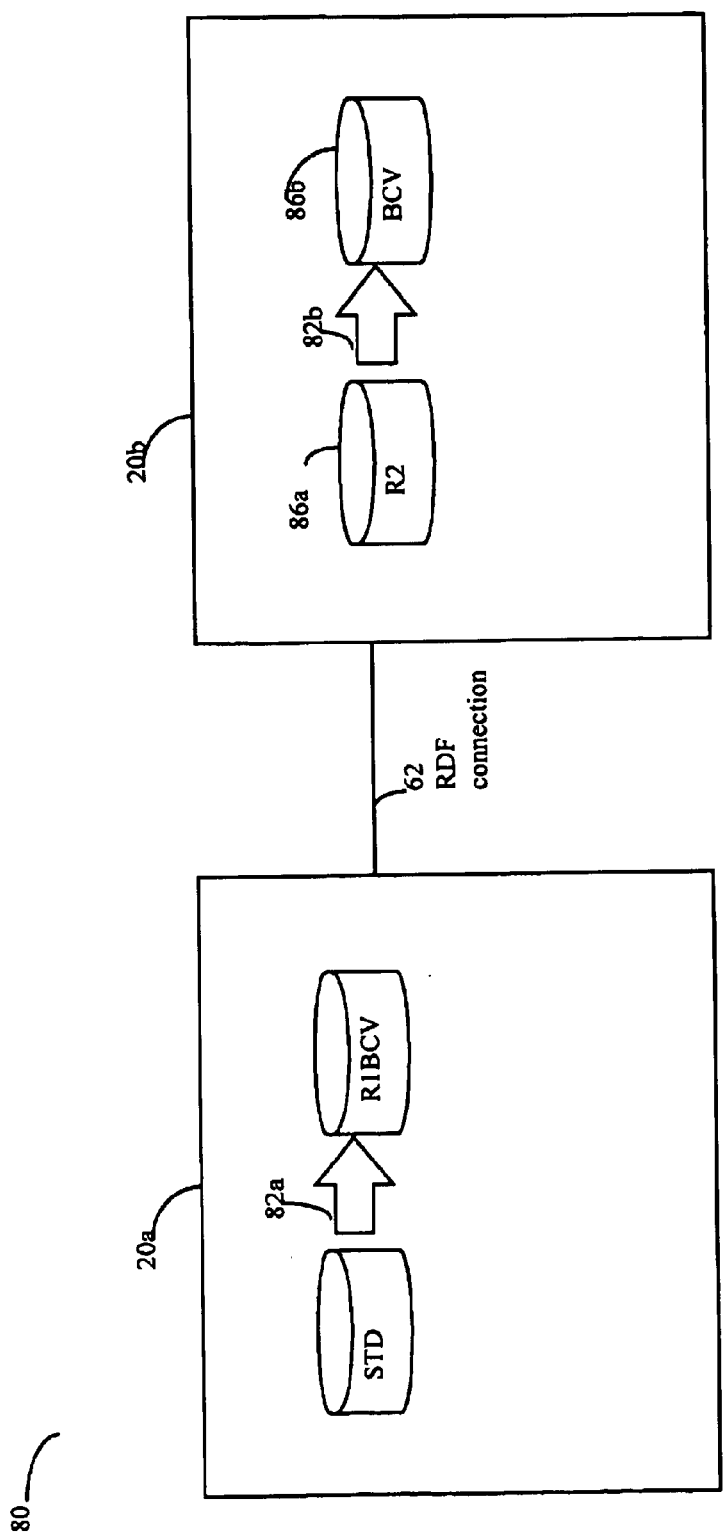

Referring now to FIG. 8, shown is an example 80 of the next SAR processing steps where the source BCVs are RE-ESTABLISHED, for example, as indicated by arrow 82a. Additionally, the target BCVs are RE-ESTABLISHED as indicated by arrow 82b. There is a waiting period within which the R2 devices synchronize with their BCVs. In other words, data is copied from R2 to R2's BCV as indicated in the system 20b where data is copied from device 86a to 86b. A RE-ESTABLISH operation enables a reconnection or association of a device, such as source device STD, and an associated BCV, such as re-establishing the R1BCV's previous mirror status with respect to STD.

Figure 9:
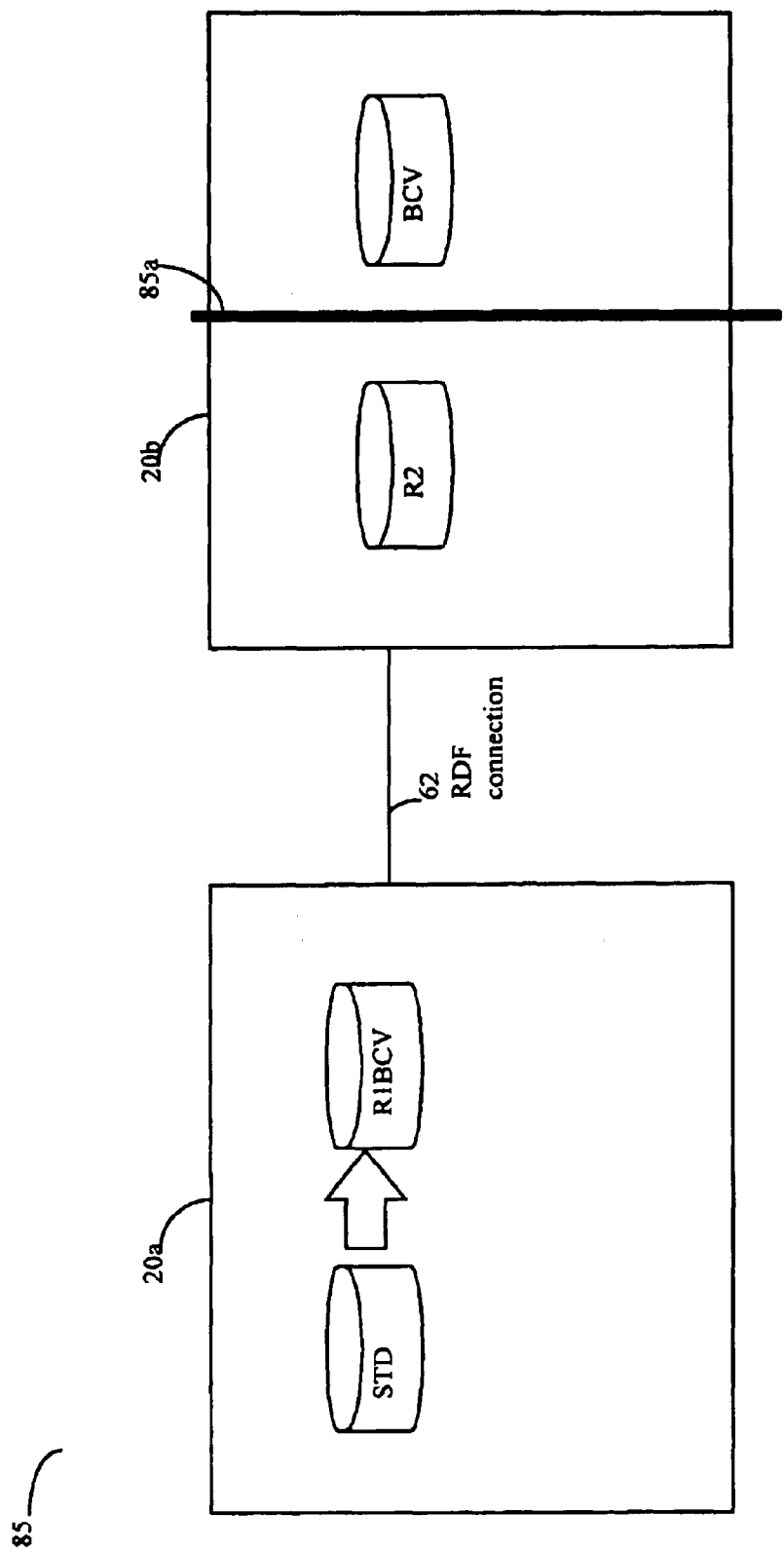

Referring now to FIG. 9, shown is an illustration 85 of the next steps in the SAR process. The target BCVs are SPLIT as indicated by the line 85a in the system 20b between R2 and the BCV included therein. Subsequently, there is a waiting time period to ensure that the source BCV, R1BCV, is synchronized with STD in the storage system 20a. There is also a waiting time period so that the target BCV mirror synchronization may occur. In other words, there may be a wait such that the BCV device may synchronize with its mirror devices.

At this point in processing, the current time is obtained, for example, such as using a system clock and a wait interval is calculated specifying the amount of time until a next cycle of the SAR process may start. A CYCLE TIME specifying a predetermined time interval for a cycle may be specified using a command subscribed elsewhere herein. If the CYCLE TIME specified is greater than the actual amount of time that has elapsed for this current cycle that has just been performed, there is a wait interval before the next cycle has begun. However, if the specified CYCLE TIME is actually less than the amount of time that has elapsed for processing the current cycle, the next cycle may start immediately if so specified, for example, using command options described elsewhere herein. Otherwise, the next SAR processing cycle may start at the next predetermined time interval. The SAR process may be repeated for example as specified in connection with FIGS. 4 through 9 until a STOP command issued, or until the number of specified cycles that may be specified in connection with a command described elsewhere herein has elapsed. It should be noted that the STOP command and others are described in more detail in following paragraphs. An embodiment may determine the start of SAR cycle in accordance with other criteria. For example, an embodiment may START a SAR cycle when a threshold level number of tracks have changed.

Figure 10A:
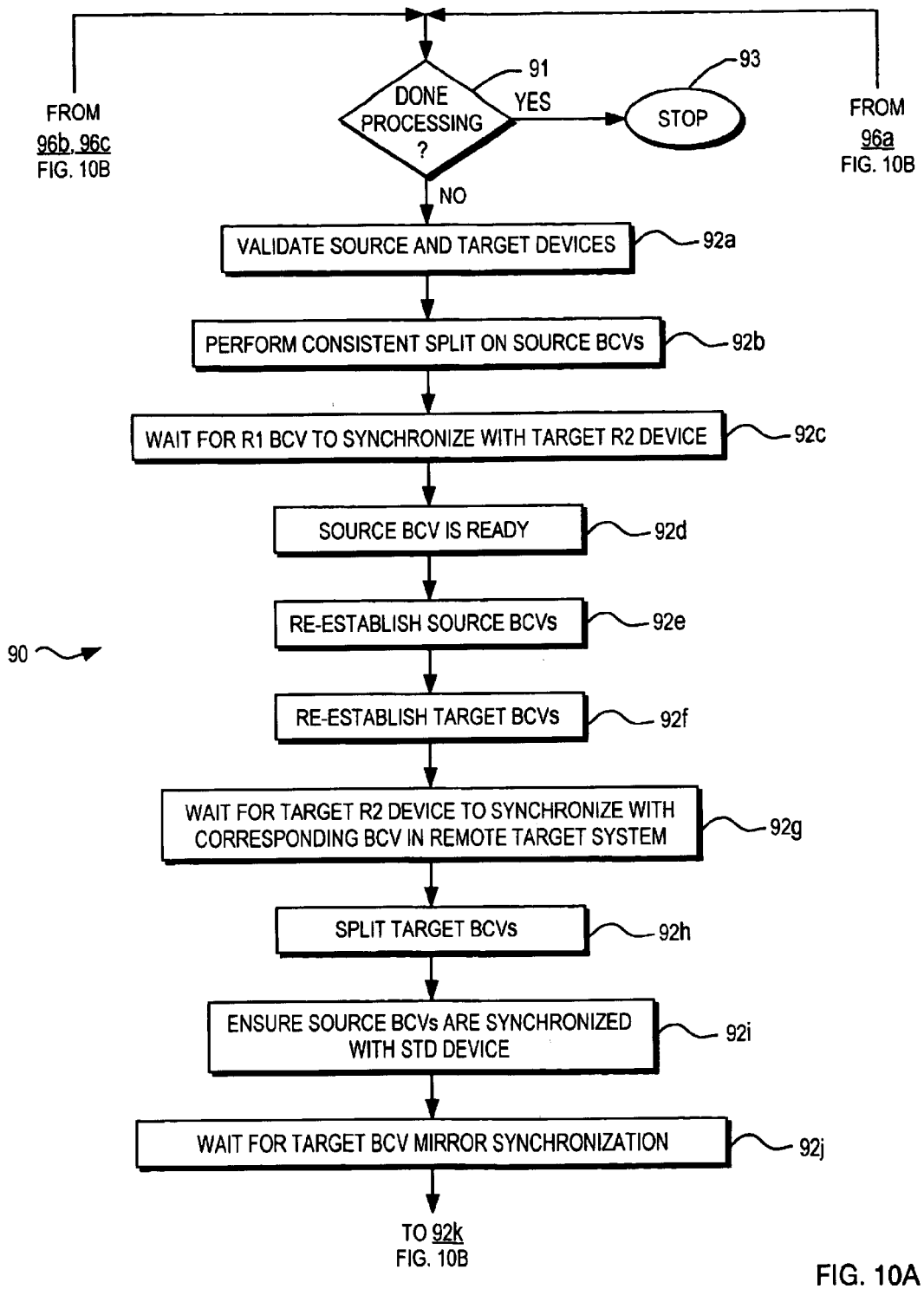
FIG. 10 is a flowchart of steps of one embodiment for performing automated data replication processing.
Figure 10B:
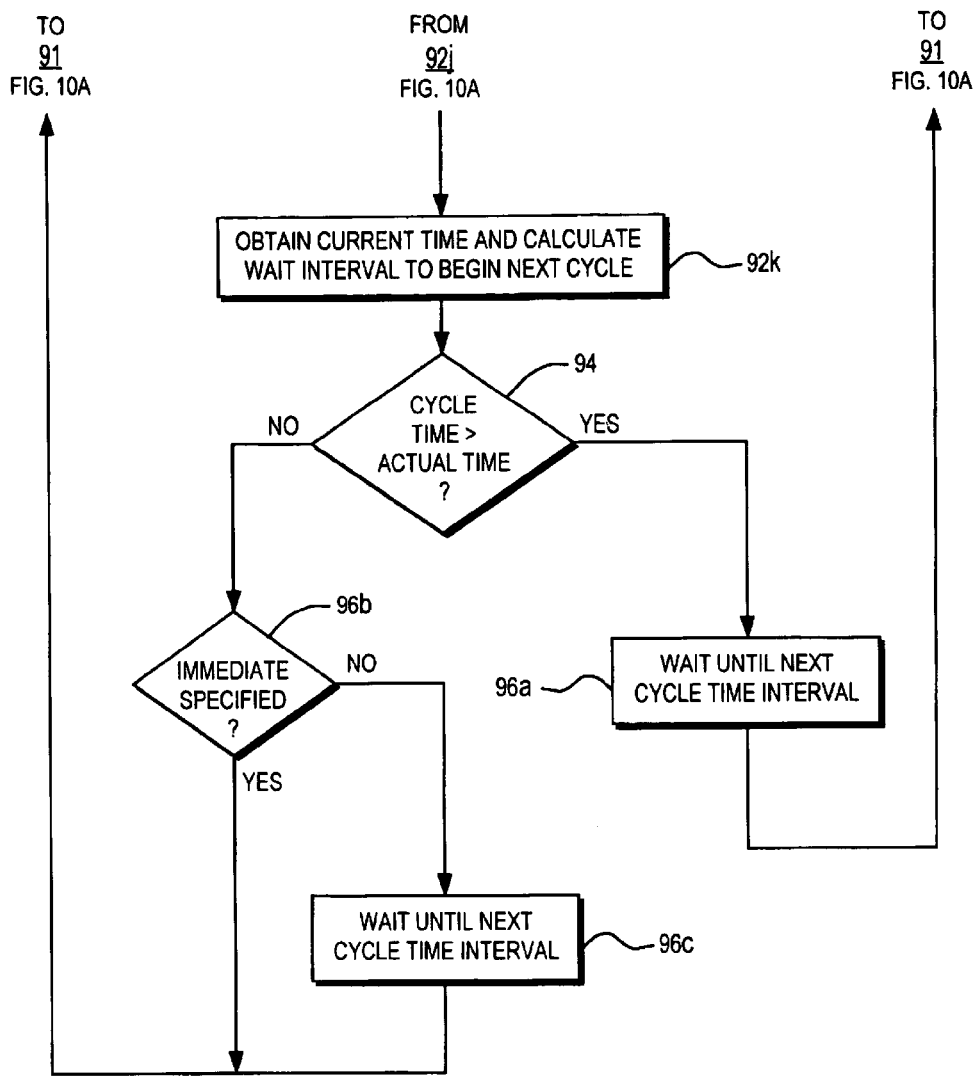

Referring now to FIG. 10, shown is a flowchart 90 of steps of the SAR process previously described herein. Generally, the steps of the flowchart 90 summarize the steps illustrated in connection with other figures in performing the SAR process. At step 91, a determination is made as to whether processing is complete. Processing may be determined as complete, for example, if a STOP command has been issued or if a predetermined number of cycles has elapsed. If so, control proceeds to step 93 to stop the SAR process. Otherwise, control proceeds to step 92a where source and target devices may be validated. This is described, for example, in connection with FIG. 4 in which all source and target BCV pairs are ESTABLISHed.

At step 92b, a CONSISTENT SPLIT is performed on the source BCVs. At step 92c, there is a wait for the R1BCV to synchronize with the R2 device. In other words, data is copied from the R1BCV device on the production or local storage system to the remote or secondary storage site having device R2. At step 92d, it has been determined that the source BCV is ready after the data resynchronization of step 92c has occurred. At step 92e, the source BCVs may be RE-ESTABLISHed. At step 92f, the target BCVs may also be RE-ESTABLISHed. At step 92g, there is a wait for the target R2 device to synchronize with the corresponding BCV in the remote target system. In other words, within the remote system such as 20b, there is a synchronization process that occurs between the R2 device and its corresponding BCV. Step 92g specifies that control does not proceed to the next subsequent step until these two devices have data synchronization.

At step 92h, the target BCVs may be split. At step 92i, it is ensured that source BCVs are synchronized. In other words, a time period may elapse to ensure that source BCVs are synchronized with the corresponding STD device within a production site or local data storage system such as 20a. At step 92j, there may be a wait for target BCV mirror synchronization to occur.

At step 92k the current time may be obtained and a wait interval may be calculated. The wait interval is the amount of time to elapse before the next SAR cycle processing may start. At step 94, a determination is made as to whether the cycle time is greater than the actual time that has elapsed in processing for the current cycle. If the cycle time is greater than the actual time, control proceeds to step 96a where processing waits until the next cycle time interval elapses. Subsequently, control proceeds from step 96a to step 91 where a determination is to whether processing is complete. If processing is not complete, control proceeds to set 92a to begin the next SAR cycle.

If a determination is made at step 94 that the cycle time is not greater than the actual time that has elapsed for the current cycle, control proceeds to step 96b where a determination is made as to whether the next SAR cycle should start immediately, or wait until occurrence of the next CYCLE TIME. If an indication has been made, such as with an IMMEDIATE command qualifier as described elsewhere herein, control proceeds to step 91. Otherwise, control proceeds from step 96b to step 96c where there is a wait until the next cycle time interval period. Subsequently, control proceeds to step 91.

The continuous processing of the steps of flowchart 90 provide for repeated cycles of consistent updates to provide a restartable image of data at a remote site that is as current as possible in the event of a disaster of the production site.

Although the SAR process described above included only a single BCV associated with a standard device, an embodiment may include and associate a plurality of BCVs with the standard device. Additionally, data that is on the remote site 20b may also be further propagated to another site, such as in a multi-hop configuration. Once data is copied from R2 to the second BCV on system 20b, the second BCV on the remote site may be used as a save point, for example, in the event of a failure on the production or local site 20a.

An embodiment may choose to perform step 92j to wait for a target BCV synchronization at the beginning of the next SAR cycle such as, for example, prior to completion of step 92e where the source BCVs are re-established. In other words, rather than stop the processing at step 92j to wait for the target BCV mirror synchronization, an embodiment may choose to perform the determination as to whether BCV mirror synchronization has occurred at the beginning of the next cycle rather than hold up the processing of the current SAR cycle such that the BCV mirror synchronization is determined as complete prior to re-establishing the source BCVs in connection with step 92e.

It should be noted that an embodiment may perform the steps of FIG. 10 in a different order. For example, an embodiment may choose to perform step 92g prior to step 92f. An embodiment may also choose to perform step 92i prior to step 92h.

Figure 11:
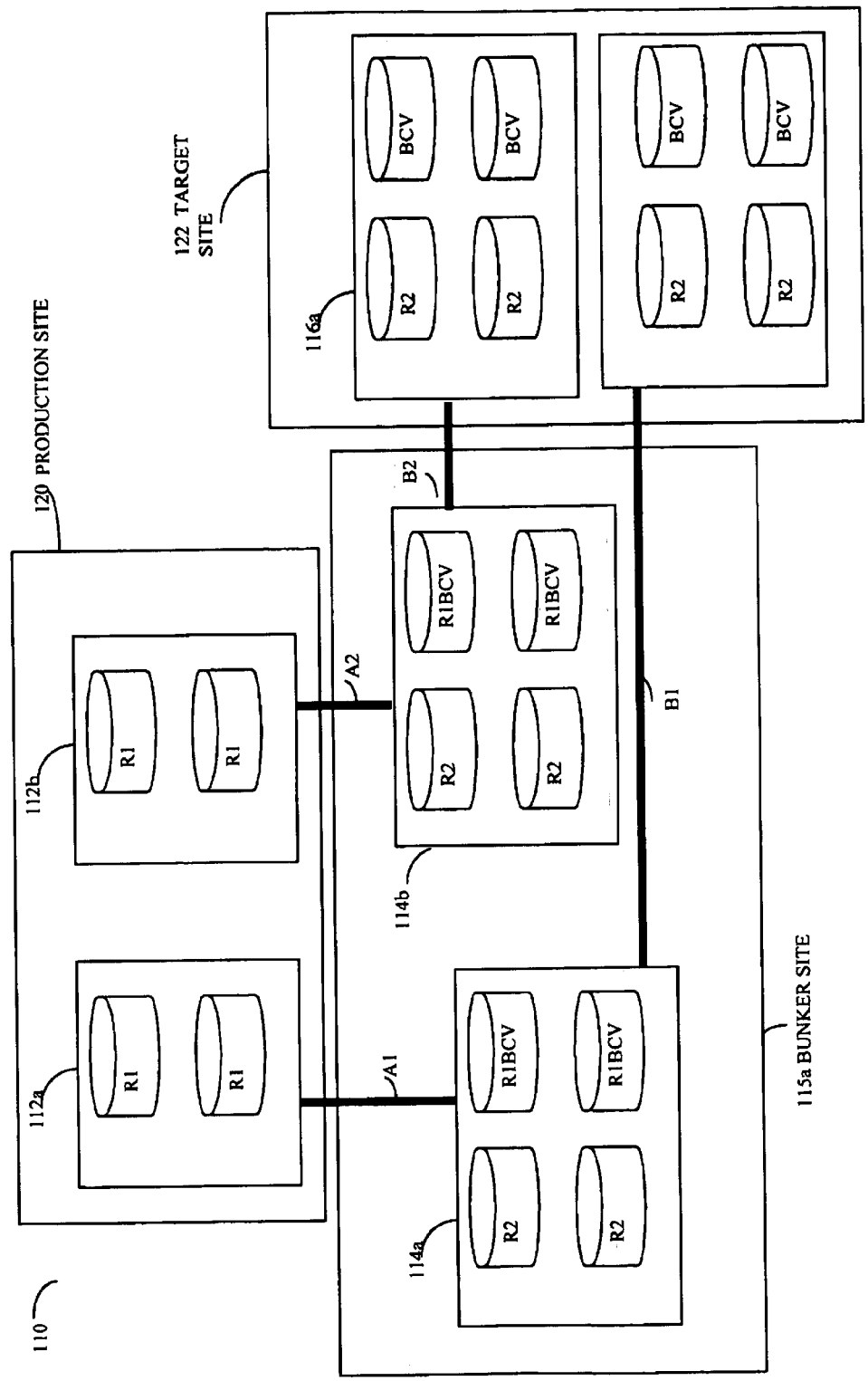
FIG. 11 is another example of an embodiment of a data storage system that may be included in the computer system of FIG. 1.

Referring now to FIG. 11, shown is an example of the system of a multi-hop configuration 110. FIG. 11 shows a multi-hop configuration that may use consistency group technology to provide protection of the production site in an offsite secondary site or "bunker site". This may be used to ensure the integrity of production data at the secondary or "bunker" site during a production site disaster. SAR processing may be configured, controlled and monitored by a host connected to the production site but is managing the SAR process operating between the secondary and target sites. This may be achieved using the multi-hop command support across links A1, A2, B1 and B2. This technique and configuration provides for consistent restartable copies at a remote restart site cyclically using RDF adaptive copy techniques and CONSISTENT SPLITs of the remote BCVs in the bunker site 115a. BCVs at the target site provide protection during the adaptive copy session between the secondary and restart site by ensuring preservation of restartable image of the data.

In the event of a consistency group trip event, the secondary or "bunker" site contains a consistent, restartable image of the production site on the R2s. A final split of the secondary site R1BCVs followed by their resynchronization to the R2s at the restart site produces a restartable environment at long distances with data current to the point of disaster. A consistency group trip event may be characterized as a result of a failure to remotely mirror an I/O operation on a consistency group protected volume marking the beginning, for example, of an unplanned outage.

The ability to produce consistent point in time copies of information spanning multiple volumes as well as multiple data storage systems, such as multiple Symmetrix™ data storage systems, is important to business continuance. This capability is provided through the CONSISTENT SPLIT command as described elsewhere herein. Creating a consistent copy of all the necessary data objects provides the restartable image on remote BCVs. In one embodiment, a batch interface may be included in the TimeFinder software and may be used to create consistent restartable images one at a time. It may be desirable for an embodiment to perform this process in an automated fashion to provide for the continual creation of consistent copies of data as may be achieved with automation support.

Accordingly, what will now be described are different commands that may be used in connection with performing the foregoing SAR process steps, for example, to define volumes to be managed, specified cycle characteristics, and provide for cycle control and querying. These commands may be included in an embodiment's job control language (JCL) using any one of a variety of different format and parameters. Although a particular embodiment and associated commands will now be described, it should be noted that an other embodiment may include different commands as well as different formats.

Referring now to FIG. 12, shown are three commands that may be used in implementing the SAR process described herein. The ADD command 200 defines the process name used to control the SAR processing amongst one or more devices. In one embodiment, for example, there may be a process name associated with single-hop mode processing and multi-hop mode processing. If the process name is already defined within an embodiment, the ADD request statement may be rejected. It should be noted that in one embodiment, the ADD command does not actually start the process, but rather only defines the name and processing type to the EMC Symmetrix™ Control Facility (SCF) address space that is shipped with the TimeFinder product set as described elsewhere herein.

What will now be described are various parameters that may be associated with the ADD command 200 as shown in FIG. 12. The process-name as specified sets forth the name of the process. In one embodiment, a maximum number of 20 characters may be used, however, another embodiment may include another maximum number of characters for the process name. HOP_type specifies the type of long running process to be defined to EMCSCF. The two options in one embodiment are SINGLE and MULTI to correspond to the single and multi-hop modes. MAXGRP specifies the maximum number of SAR processes. MAXDev specifies the maximum number of SAR devices for each controller and MAXMsg specifies the maximum SAR message buffers. It should be noted that these parameters as well as others described herein may have default values. For example, in one embodiment, MAXGRP may be a value between 1 and 9,999, having the default value of 64. MAXDev may be a value between 1 and 64,000, having the default value of 4,096. MAXMSG may be a value between 1 and 9,999, having the default value of 256.

The DELETE command 216 removes a particular process name from EMCSCF. The process name is in a stopped state for the command to function, otherwise it may be rejected in one embodiment.

The MODIFY command 210 includes the following parameters that will now be described: process_name, DEFINE, RESTART, START, STOP, and QUERY. The process_name specifies the name of the process to which this command applies. If the name is not defined, the statement fails. In one embodiment, only a single START, RESTART or STOP action is allowed on a single sequence level. Sequence level numbers may be used to control parallelization of command processing as may be included in the TimeFinder product by EMC Corporation.

The DEFINE parameter or action defines the devices and attributes of the process. As many DEFINE actions may occur for a process as required to define the total set of devices to be operated upon by the process. Device lists in one embodiment may not span data storage systems, such as Symmetrix™ data storage systems. If multiple data storage devices are used to create a restartable remote image, multiple DEFINE actions with device lists for each Symmetrix™ data storage system may be used. To change a configuration in one embodiment, the configuration may be deleted and then redefined to the desired configuration. The last setting for CYCLE, CYCLE Overflow and TIMEOUT on a DEFINE action are used. The DEVice_list parameter includes the SRCR1BCV specifying the source BCV devices. SRCSTD specifies the standard devices. TGTBCV specifies the target BCV data storage system devices. Cuus specifies a BCV device and cuus-cuus specifies a range of BCV devices where the first cuus is the starting BCV device and the second cuus specifies the last BCV in the range. It should be noted that in one embodiment, the entire range of BCV devices is included in the same physical control unit. or data storage system such as 20*a* with reference to FIG. 2. Cuup specifies a standard device and cuup-cuup specifies a range of standard devices similar to the cuus-cuus range described above. Cuug is an optional parameter that may be used to specify an alternate device to issue the commands against. Seq# specifies a sequence number that is a decimal number 1–128 that indicates in what order the specified command is executed. All actions having the same sequence level may be executed in parallel in one embodiment having this capability. Symdv# specifies the Symmetrix™ data storage system device number. In one embodiment, this is a 4-digit value. Symdv#-Symdv# specifies a range of Symmetrix™ system device numbers. CYCle may be used in defining the cycle time and optionally the number of cycles to perform. The cycle time specifies the time frequency for starting each cycle of a process, such as every four hours. If the actual cycle time exceeds the cycle time, the CYCle_Overflow action may be used to specify the desired behavior. If the number of cycles to be performed is specified as 0 or left unspecified, then the cycle process runs until a STOP command is issued. To run a SAR process indefinitely, for example, in one embodiment the following may be used: CYCLE (00:00:00, 0) CYCLE_OVERFLOW (IMMED). CYCle_Overflow specifies processing behavior when a cycle actually takes longer than the time specified in the cycle time. NEXT specifies a wait time until the next calculated cycle time to begin a new cycle. IMMED specifies that a new cycle is to be immediately started after conclusion of the current cycle. The start time of the new cycle is the basis for the next calculated start time. TIMEOUT specifies the maximum amount of time to hold I/O processing during consistent split processing. In one embodiment, the timeout may be specified in seconds. If the maximum timeout specified is exceeded, then the process is stopped and a message is issued. If this occurs, only the BCVs at the secondary or remote site contain consistent images of the last successfully completed cycle and intervention may be needed. RESTART may not be available under this condition. The process should have a new START action issued. In one embodiment, the default TIMEOUT is 15 seconds. MSGOPT specifies message handling options. BUFfered holds messages in the memory buffer. The messages may be displayed using the QUERY statement. WTO (nn) optionally issues the text as a Write to Operator with the optional route code nn. If WTO is specified without a route code, a default of 11 is used. In this particular embodiment, a routing code of 11 may be used to indicate that messages are routed to the master console. However, an embodiment may alter the assignment of routing codes, for example, in accordance with installation options providing a way to change the routing assignment.

The START action begins the process at the beginning of the cycle. In connection with the STOP action, NORMAL specifies that the cycle continue until it reaches the normal end of cycle. STEP specifies stopping the cycle when the current cycle step completes. FORCE specifies immediate stop regardless of the state of the cycle. The process is active for the STOP to take effect. RESTART restarts a stopped process. The RESTART point is determined by the STOP request. If the STOP action specified FORCE, restart may not be possible. In connection with the QUERY action, STATUS specifies to display the cycle step, cycles performed, changed track accumulation, current settings, etc. DEVices displays the list of devices defined to the process. MSG lists message buffers associated with the process. After an MSG display, the message queue may be emptied. The process specified may be active or stopped.

Referring now to FIG. 13, shown is an example of an embodiment of the STOP command 220. Jobname specifies the EMCSCF jobname, SAR specifies the SAR facility, and process-name the SAR process defined by the ADD command, described elsewhere herein. Also shown in 220 is the STOP parameter to indicate STOPping the specified process at the completion of the current cycle. STEP indicates that the process is to be stopped at the end of the current step. FORCE stops the specified process immediately.

What will now be described are some examples of the foregoing commands used in connection with the SAR process. Consider the following sequence of commands that may be used in connection with defining a SAR process in connection with the embodiment set forth in FIG. 14:

```
ADD 10, PROCESSONE, HOP_TYPE (SINGLE)
MODIFY 11, PROCESSONE, DEFINE,
DEVICE_LIST(SRCSTD (A000-A002),
    SRCR1BCV(A100-A102),
    TGTBCV(0001-0003))
MODIFY 11, PROCESSONE, DEFINE,
DEVICE_LIST(SRCSTD (B100-B102),
    SRCR1BCV(B180-B182),
    TGTBCV(0004-0006))
MODIFY 11, PROCESSONE, CYCLE(00:15:00,0), TIMEOUT (15)
MODIFY 12, START
```

Figure 14:
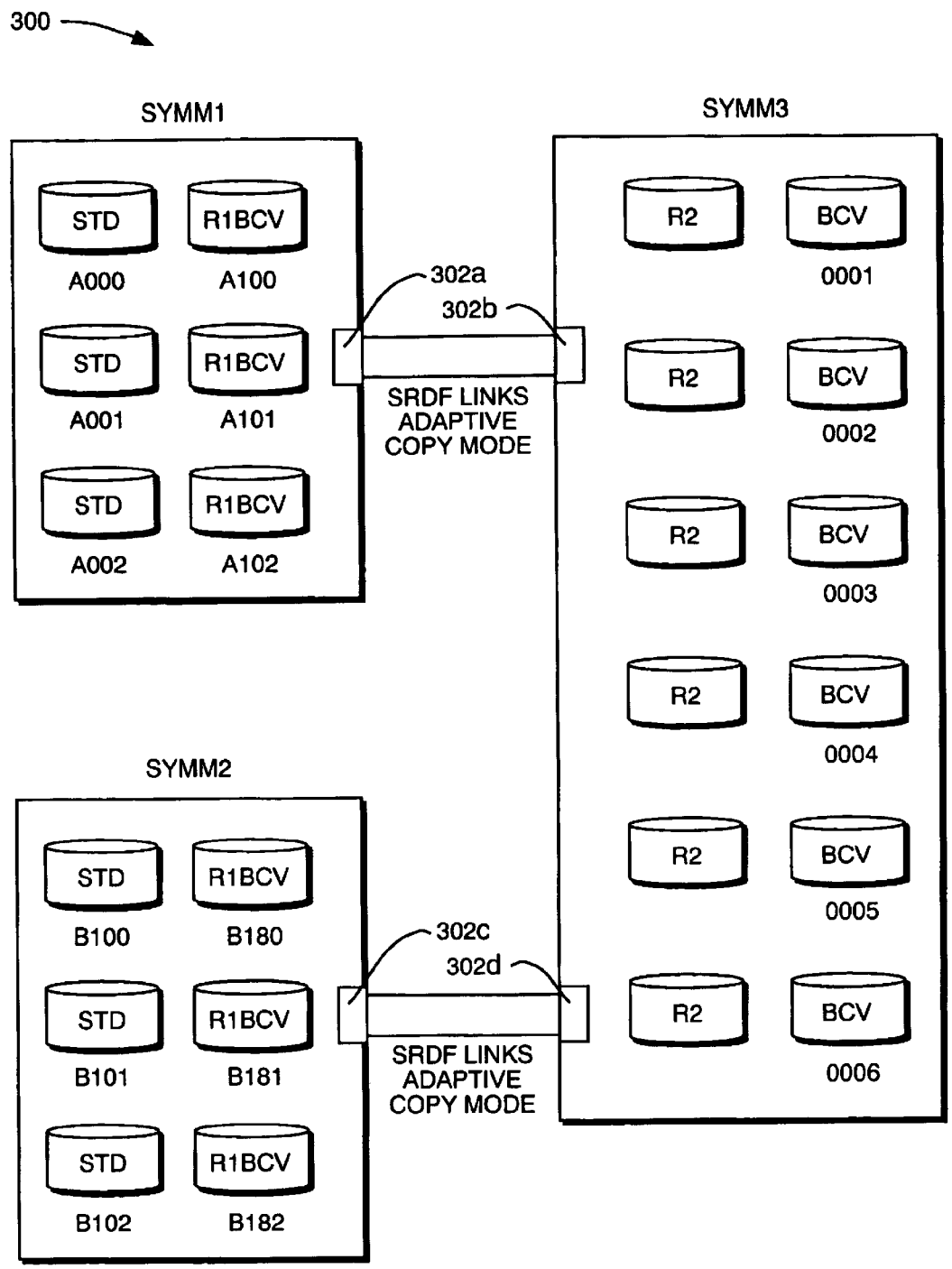

The ADD statement at sequence level 10 creates a new process named PROCESSONE. Devices in data storage system SYMM1 are specified in the device list of the first MODIFY statement at sequence level 11. The standard devices at addresses A000 through A002 and their respective R1BCVs on addresses A100 through A102 are "protected" on the BCVs in the remote data storage system SYMM3. The Symmetrix™ data storage system device numbers identify these BCVs. Similarly, the standard devices on the data storage system SYMM2 on addresses B1300 through B1102 and their respective R1BCVs on addresses B1380 through B1382 are also "protected" on the BCVs in the remote SYMM3. As described and used elsewhere herein, "protected" refers to having a replicated or backup copy of data. Since the SRCR1BCV specifies R1BCV devices, the RA group used to send remote commands is known. RAs are shown in FIG. 14 as 302*a*–302*d*. Additional elements that may be included in a data storage system, such as described previously in connection with FIG. 2, have been omitted for sake of clarity but may also be included. Cycle(0) specifies that the process will run until an explicit stop is issued for the process. Each subsequent cycle begins immediately after the previous one has completed. The timeout value of 15 seconds specifies that maximum time I/O is held waiting for the consistent split command to complete. The START statement at sequence level 12 begins the process PROCESSONE.

In the foregoing example, it should be noted that if the timeout value is exceeded, the process stops with an error. If this does occur, the consistent splits did not complete within the allotted time. The consistency of the local BCV data in this example cannot be determined without user intervention. Valid data is at the remote the BCVs from the previous successful SAR cycle.

Referring now to FIG. 14, shown is an embodiment of a system 300 that may be used in connection with the previous example command sequence in which one remote Symmetrix™ data storage system SYMM3 is used to protect standard devices in two local Symmetrix™ data storage systems SYMM1 and SYMM2.

In an embodiment using the foregoing commands, the following may be submitted in a job to issue: MODIFY 20, PROCESSONE, STOP To determine if the process PROCESSONE is stopped, one or more jobs may be run issuing the following: MODIFY 20, PROCESSONE, QUERY(STATUS)

Once the process is stopped, the following may be issued in a separate job:
MODIFY 20, PROCESSONE, RESTART.

Using the foregoing sequence of commands, the process is stopped and queried for its status and then the process is RESTARTED.

Consider yet another example:

```
JOB1:
MODIFY 30, PROCESSONE, STOP
JOB2:
MODIFY 31, PROCESSONE, DELETE
ADD 32, PROCESSONE HOP_TYPE (SINGLE)
MODIFY 33, PROCESSONE, DEFINE,
DEVICE_LIST (SRCSTD(A000-A002),
    SRCR1BCV (A100-A102),
    TGTBCV(0001-0003))
MODIFY 33, PROCESSONE, DEFINE,
DEVICE_LIST(SRCSTD(B100-B102),
    SRCR1BCV(B180-B182),
    TGTBCV(0004-0006))
MODIFY 33, PROCESSONE, CYCLE(00:15:00,0), TIMEOUT(15)
MODIFY 33, PROCESSONE, DEFINE,
DEVICE_LIST(SRCSTD(A003), SRCR1BCV(A103),
    TGTBCV(0007))
MODIFY 34, PROCESSONE, START
MODIFY 35, PROCESSONE, QUERY(MSG)
MODIFY 35, PROCESSONE, QUERY(STATUS)
```

The foregoing commands stop and delete the PROCESSONE process. PROCESSONE is redefined, as in another example described elsewhere herein in FIG. 15A, but with one additional volume on local SYMM1 identified as A003. After the process is started, queries are issued: one for any outstanding messages from the process and one for the status of the process.

Figure 15A:
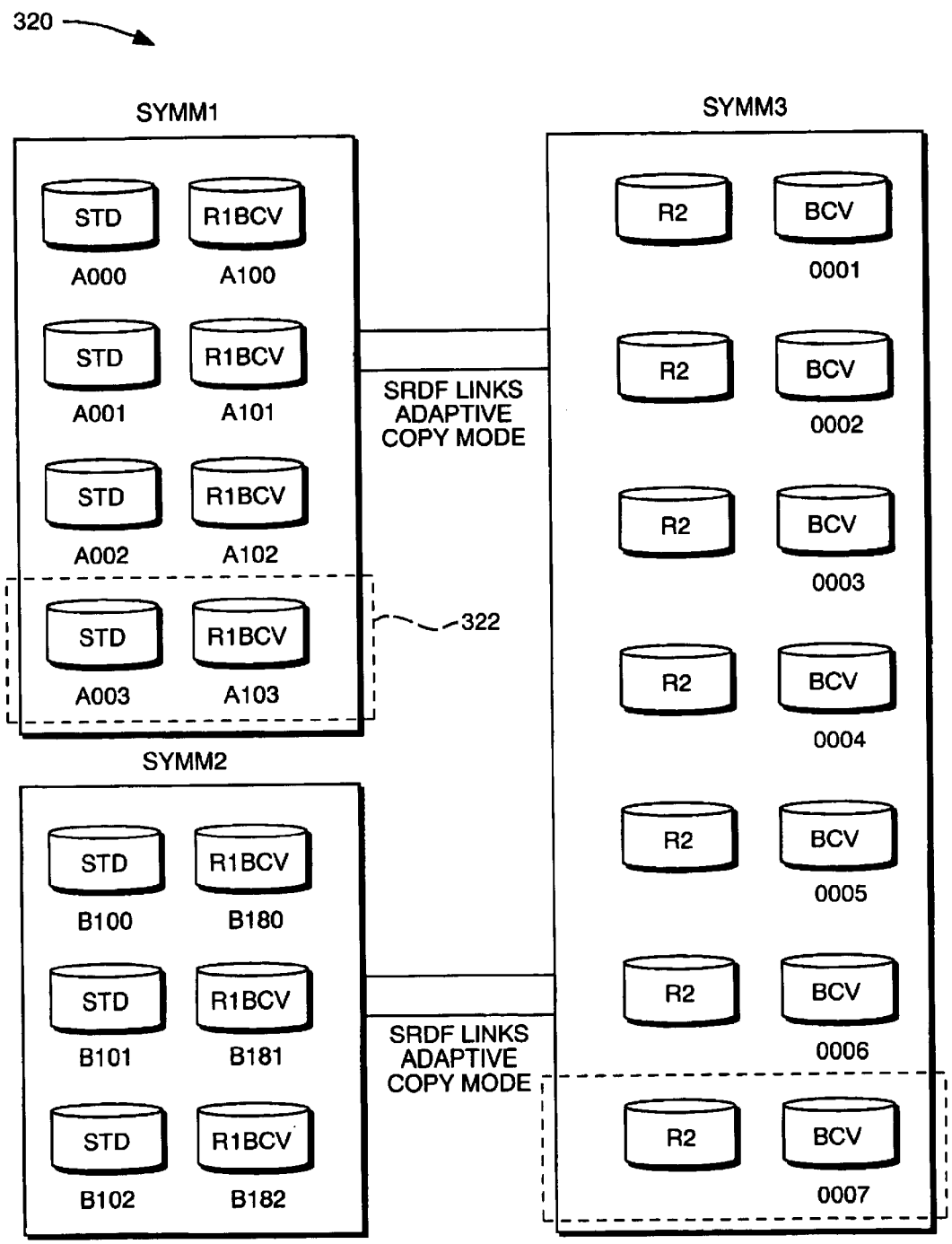

Referring now to FIG. 15A, shown is an embodiment of system 320 that may be used in connection with the foregoing sequence of commands. The system 320 is similar to that as set forth in 300 with the additional local STD volume noted as 322 in FIG. 15A of the system 320.

The SAR process provides for propagation of data changes from a local system, such as from device R1BCV in 20*a*, to a remote system, such as 20*b* on device R2. Subsequently, the data from the device R2 may be copied to another BCV, such as in system 20*b* to create a next save point for the data which may also be further propagated.

An embodiment may choose to execute the SAR process cycle steps causing a data replication to occur at various points in time, or in response to certain predefined conditions. For example, using the foregoing CYCLETIME, an embodiment may cause a SAR cycle at predetermined time periods. An embodiment may trigger a SAR cycle in response to a threshold level of data changes occurring such that the SAR cycle may be triggered in response to, for example, a number of write operations, the amount of changed data tracked by a data storage system such as 20*a*, and the like.

Figure 15B:
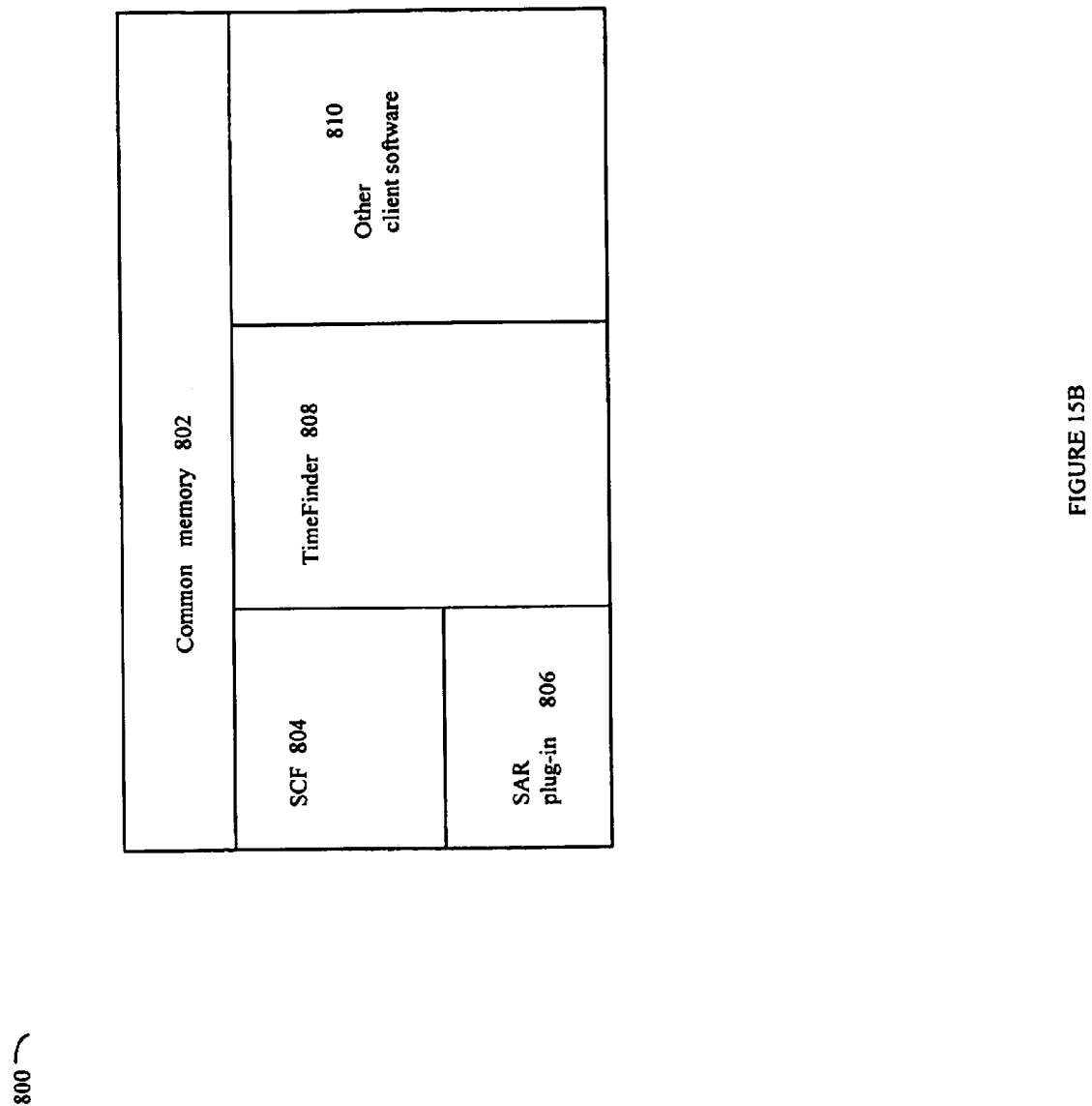
FIG. 15B is an example of components that may be included in a host system of FIG. 1.

Referring now to FIG. 15B, shown is an example of software 800 that may be included in a host computer system, such as one of the hosts 14*a*–14*n* included in the system 10 of FIG. 1 and FIG. 3A as described elsewhere herein.

Included in the example 800 is an area of common memory 802, an SCF or Symmetrix Control Facility 804, a SAR plug in 806 and TimeFinder software 808.

Additionally, residing on a host may be other client software 810. The other client software may vary in accordance with each particular embodiment. The common memory or storage area 802 may include memory storage of those data structures, such as control blocks, used in connection with executing the SAR processing described herein. In this particular embodiment, the SAR plug-in 806 runs in the SCF process address space 804. It should be noted that in this particular embodiment, the SAR plug-in 806 may include machine executable instructions that control the SAR processing as described elsewhere herein.

The SAR plug-in 806 may begin execution and invoke the TimeFinder software 808 to create and initialize data structures included in the common storage 802 in accordance with various commands to define the SAR processing steps. The TimeFinder software includes the machine executable code to define SAR processing commands, for example, START, RESTART and QUERY, as described in connection with FIGS. 12 and 13. Once the various commands as defined in accordance with the SAR plug-in have been set up by the TimeFinder software 808, the TimeFinder software may be unloaded and control may be passed to the SCF Software 804. The SCF Software 804 may execute the SAR processing steps as set up and initialized by the SAR plug-in and the TimeFinder software. In other words, the SAR plug-in 806 and the TimeFinder software 808 may be characterized as initializing and setting up the necessary commands for SAR processing. When control is transferred from TimeFinder software 808 to the SCF 804, the actual SAR processing steps described, for example in connection with FIG. 10, are executed.

An embodiment may also implement functionality described herein in connection with SAR processing using alternatives to the SAR plug-in 806. An embodiment may use automation tools, such as a scripting or job control language that may vary with the availability in each embodiment, and command functionality available for use with the TimeFinder product. Such tools and languages may include, for example, REXX as available on the MVS, OS/390, and z/OS operating systems by IBM Corporation, and the Perl programming language. The TimeFinder product by EMC Corporation includes commands such as, for example, SPLIT, RESTORE, ESTABLISH and RE-ESTABLISH. These TimeFinder commands and a command programming or scripting language may be used to implement the functionality described herein for SAR processing in an embodiment using the Symmetrix data storage systems.

It should be noted that in connection with SAR processing, data being copied from a local storage system such as 20a to the remote storage system 20b may be copied a first time such that all of the data is copied initially from the local storage system 20a to the remote storage system 20b. If there are other intervening nodes or data storage systems between the local system 20a and the remote system 20b, the first time data is copied to the remote system a complete set of data is copied. Additionally, other steps may also be performed, such as configuration checking and the like, the first time data is copied to the remote system 20b. The first or initial push of data to the remote storage system 20b may also be referred to as "initialization" or initializing the system as used in connection with a SAR process with data. In subsequent SAR processing steps, an embodiment may copy the data which has been changed or modified. This may be referred to as the continuous SAR processing cycle. The continuous SAR processing cycle may be characterized as a system in a steady state. All of the data may be copied at the "initialization" stage. Subsequently, a certain amount of data may be modified in accordance with a particular time period and this amount of data may then be propagated through the system rather than, for example, copying all of the data as in the initialization stage.

It should be noted that although a local and remote storage system have been described, the techniques described herein in connection with SAR processing may also be applied to the local storage system 20a and the remote storage system 20b with one or more intervening storage systems or nodes therebetween. In other words, data may be propagated from the local to the remote storage system through one or more intervening nodes within the data storage system 12 as described for example in connection with the system of FIG. 1. Thus, in propagating data from an initial local storage system 20a to disaster recovery site 20b, the SAR processing steps may be executed multiple times between different intervening nodes to propagate data to the remote storage system. In one embodiment, the host may control the SAR processing by issuing commands directly to both the local and the remote storage system as well as intervening nodes. The host may issue such commands, for example, using the multi-hop system call as described in U.S. patent application Ser. No. 09/591,827, filed on Jun. 12, 2000, entitled "Multihop System Calls", which is incorporated by reference herein.

When performing the system restart, for example, in connection with part of the "going home" processing to return to the primary or local site, an embodiment may select to run in protected or unprotected mode. An embodiment running in protected mode may be characterized as running with a back-up copy of data. In contrast, running in unprotected mode means running without a back-up copy of data. This distinction is described elsewhere herein.

As described in more detail elsewhere herein, an embodiment running in a multi-hop configuration may run in unprotected mode after restarting at the remote site. This is because running in protected mode requires an intermediate site near to the remote site so as to enable a new multi-hop configuration with the primary site acting as a new remote site. Such an additional fourth site may not be available. If such an additional fourth site is available, an embodiment may run in protected mode after restart at the remote site by defining a new SAR process.

The foregoing provides for data replication. If there exists a failure, for example, of the local system 14a, there may be a need to perform a system restart making the SAR restart volumes available for use.

Figure 15C:
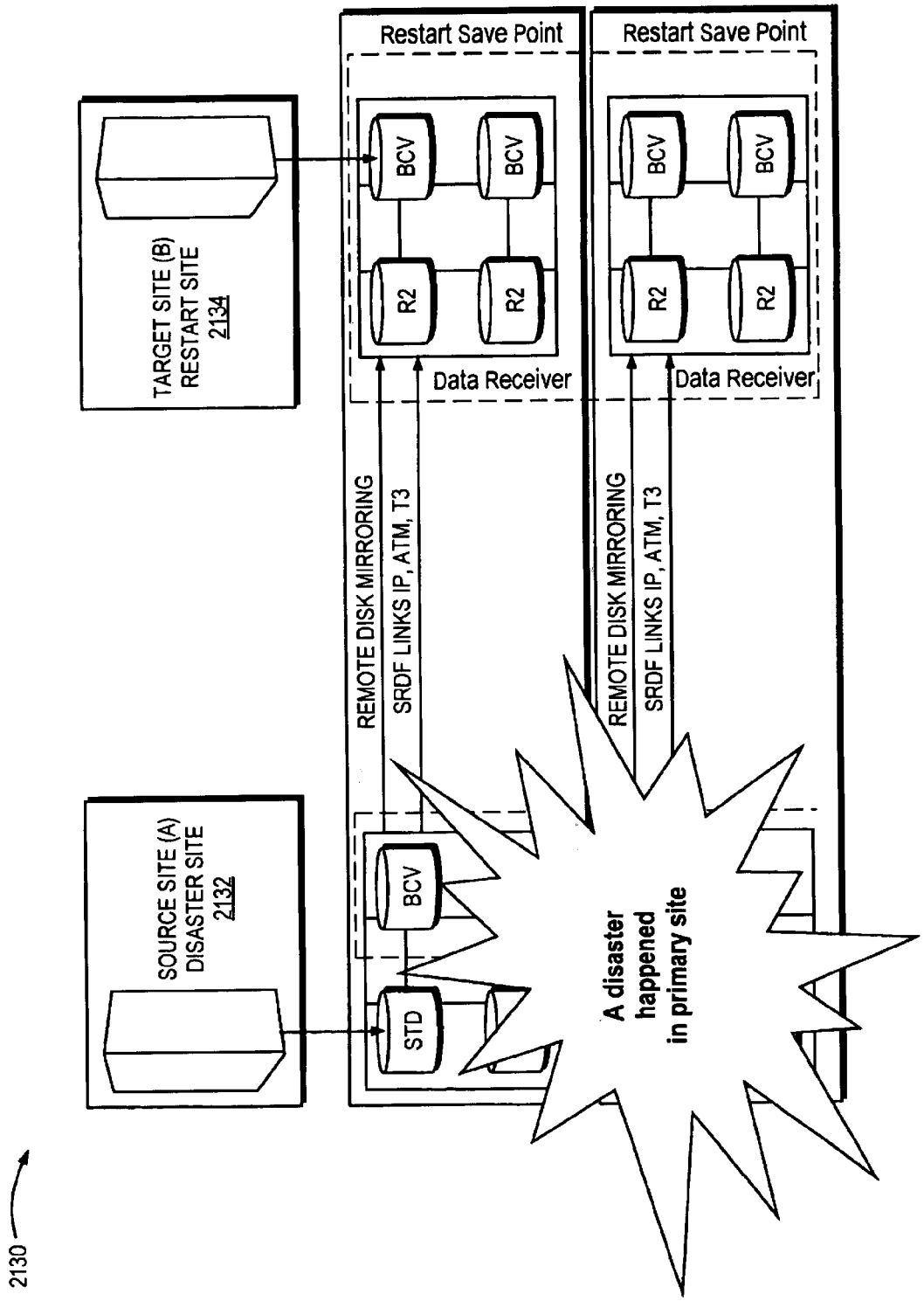
FIG. 15C is an illustration of a disaster at a production site.

Referring now to FIG. 15C, shown is an example of an embodiment 2130 illustrating a disaster as may occur on the primary or production site. In the event of a production site disaster, it is assumed that the host system has failed as well. A remote system, such as 2134, may be used in connection with performing the restart operations. The remote host 2134 may be connected to the target site and is able to communicate to data storage systems in performing the restart processing described elsewhere herein.

Software included in a host computer system, such the EMC SRDF™ Host Component, makes the restart site available by issuing commands to change the states of remote volumes. The foregoing SAR process, as may be included in the TimeFinder™ product, creates point in time consistent copies of volumes. First, it is decided as to whether the data recovery and subsequent restart operations use the R2 devices or their partner BCVs, as included in the system 20b for example. It may be necessary to determine the current state of the R2 and its partner BCVs. This may be determined, for example, by executing QUERY commands from a remote host using the TimeFinder™ product by EMC Corporation. An embodiment may select the device having the most current data. The "most current data" location may vary depending on whether there is a multi-hop or single-hop embodiment. In a multi-hop embodiment, as described elsewhere herein in more detail, the most current data is included in the "bunker" or secondary site.

If the device R2 in the remote site 20b is selected as the start point, data may be RESTOREd from the partner BCV to R2. In an embodiment, it may be preferred to use a particular one of the R2 and its partner BCV as the restart. For example, in one embodiment, it may be preferred that the R2 device be used as the restart device due to other ongoing operations in accordance with a particular embodiment. The BCV devices may be used in connection with performing other operations, such as in connection with other software that may be included in the host system. An embodiment may select to start off of the R2 devices, for example, since it may be easier to set up a reverse SAR.

Once the restart device (R2 or associated BCV) are determined, the SAR configuration may be in one of 3 possible states as a result of the SAR processing described herein. Each of the different states may utilize a different recovery procedure, as described elsewhere herein as PROCEDURES1–3. A first state is that all the target R2 devices are SPLIT from their partner BCV device(PROCEDURE1). A second state is that none of the target R2 devices are SPLIT from their partner BCV device (PROCEDURE 2). A third state is that some of the R2 devices are SPLIT from their partner BCV device (PROCEDURE 3).

It should be noted that the 3 SAR recovery procedures for each of the three states above may be tested by causing any one of the three states to occur by issuing commands as follows:

MODIFY STOP(NORMAL) issued to a SAR process results in an ALL SPLIT state on the target or remote data storage system since the SAR process continues to the start point for a new cycle.

MODIFY STOP(STEP) issued to a SAR process results in ALL or NONE SPLIT state depending on which step is executing at the time the command is issued.

To create the some SPLIT state on the target or remote data storage system, some RDF links may be taken offline, such as by executing a host component command during step 6 of the SAR process, such as at step 92f while target R2 volumes are being RE-ESTABLISHED with their BCV mirrors.

The following procedures utilize commands issued either at the host with access to the source STD device or at the host with access to the target R2 devices. An embodiment may also include an option for redirecting commands across an RDF link using the RMT command providing the benefit that all commands may be entered from the same host and redirected as appropriate to remote data storage systems.

Prior to executing any of PROCEDURES1–3, steps may be taken to determine the state of all BCV volumes as INUSE or AVAILable at the restart site, which in this example, is the remote site 20b. This may be performed using commands of the TimeFinder product running on a remote host. Additionally, any data storage system locks associated with SAR devices may be cleared. When an RDF link failure interrupts a SAR process, the devices at a RESTART site, such as 20b, may be marked as still belonging to the SAR process. Since the SAR process is no longer executing upon failure, TimeFinder located on the remote host may be notified and made aware of the SAR configuration. In one embodiment, this may be performed by having the host query all data storage system control units. Each data storage system, such as a Symmetrix data storage system 20a previously described in connection with FIG. 2, may include information about the SAR configuration. For example, the data storage system 20a may store SAR configuration information in a portion of its global memory, such as a cross system communication area. The configuration information may identify which particular devices for the data storage system 20a are involved in the SAR configuration as well as what additional data storage systems, such as 20b and 20n, are also involved. Using this information as may be stored in each data storage system, the SAR process executing on the remote host may be used to query each individual data storage system to determine the data storage systems and their devices and volumes used in the SAR configuration. Other embodiments may store this information in other locations and utilize other techniques to determine the SAR configuration using the remote site. It should be noted that this determination may be automated by having a process automatically generate the commands to query and retrieve data from each data storage system.

Depending on the value of the status bits for the BCV devices at the restart site, which may be 20b in this example, a different one of other procedures may be executed in accordance with the three states.

Figure 16:
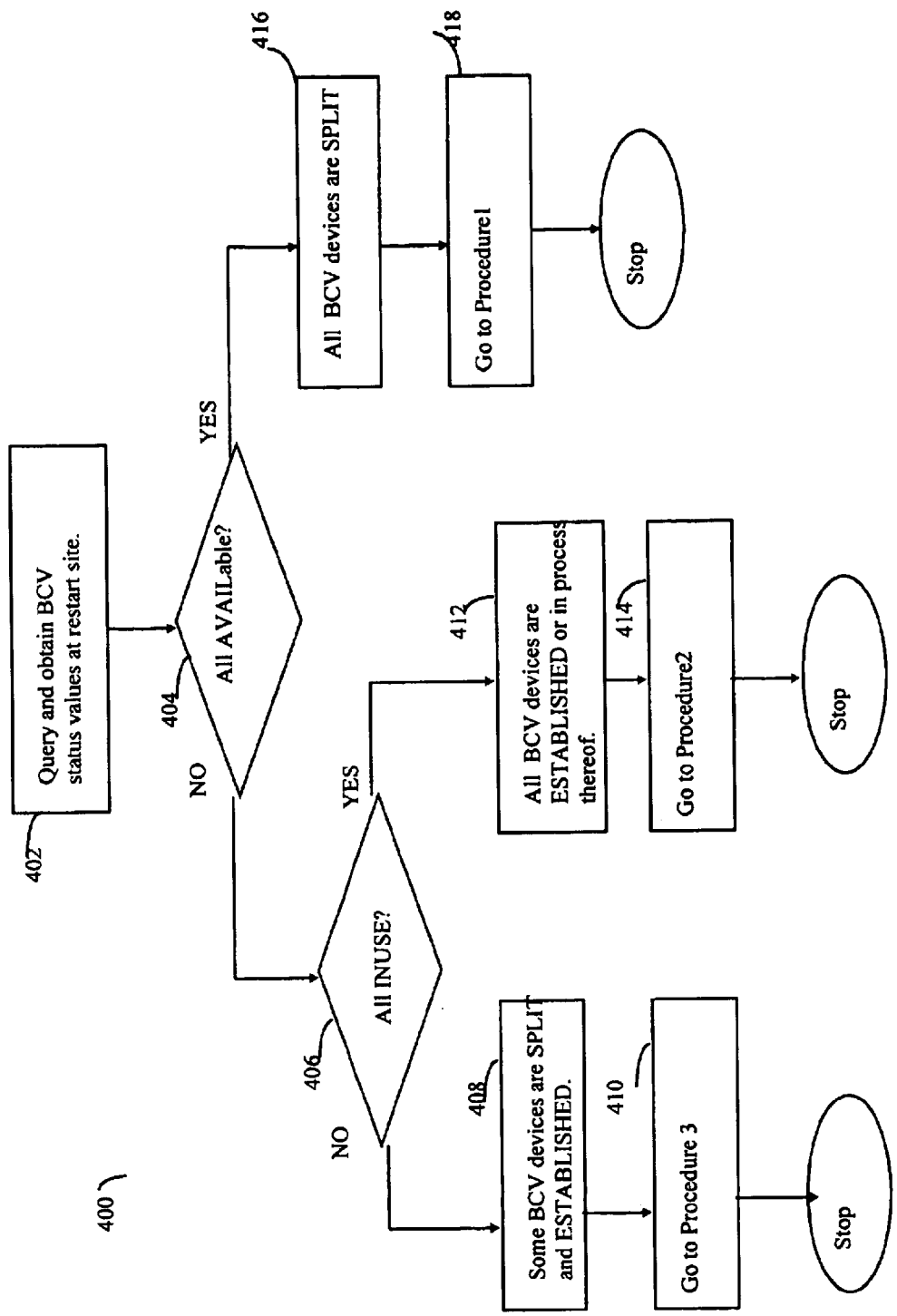
FIGS. 16–20 are flowcharts of steps of one embodiment of methods for using data at a save point in accordance with different device states of the storage automated replication (SAR) process.

Referring now to FIG. 16, shown is a flowchart 400 of steps of one embodiment for performing steps as described above where the BCV state determination is made of BCVs in the restart site. At step 402, status bits for all BCVs are obtained. At step 404, a determination is made as to whether all the bits indicate that the BCVs are all available. If so, control proceeds to step 416 where it is determined that all the BCVs are SPLIT in accordance with the BCV status bits. Control proceeds to step 417 where PROCEDURE 1 is called. Otherwise, if at step 414 all status bits do not indicate that all BCVs are available, control proceeds to step 406 where a determination made as to whether all the bits indicate that all the BCVs are INUSE. If so, control proceeds to step 412 since this indicates that all BCVs are ESTABLISHED or in the process of being ESTABLISHED. At step 414, PROCEDURE 2 is invoked. Otherwise, if at step 406 all status bits are not INUSE, control proceeds to step 416 since this indicates that the some BCVs are ESTABLISHED and some are also SPLIT. At step 418, PROCEDURE 3 is invoked. Additionally, it should be noted that links to the R2 volume may be offline to prevent the local system R1BCV from inadvertent resynchronization.

If PROCEDURE 1 is selected such that all target R2 devices are SPLIT from their BCVs, the SAR step being executed when failure occurred was synchronizing the local or production site's R1BCV with the restart site's R2. If the synchronization is complete, such as maybe determined where there are no invalid tracks on the R2 devices indicating that data is yet to copied to R2 from R1BCV, the R2 device holds the most recent point-in-time consistent copy. If any one of the R2 devices has an invalid track, then R2's partner BCV on 20b holds the most recent point-in-time consistent copy.

Figure 17:
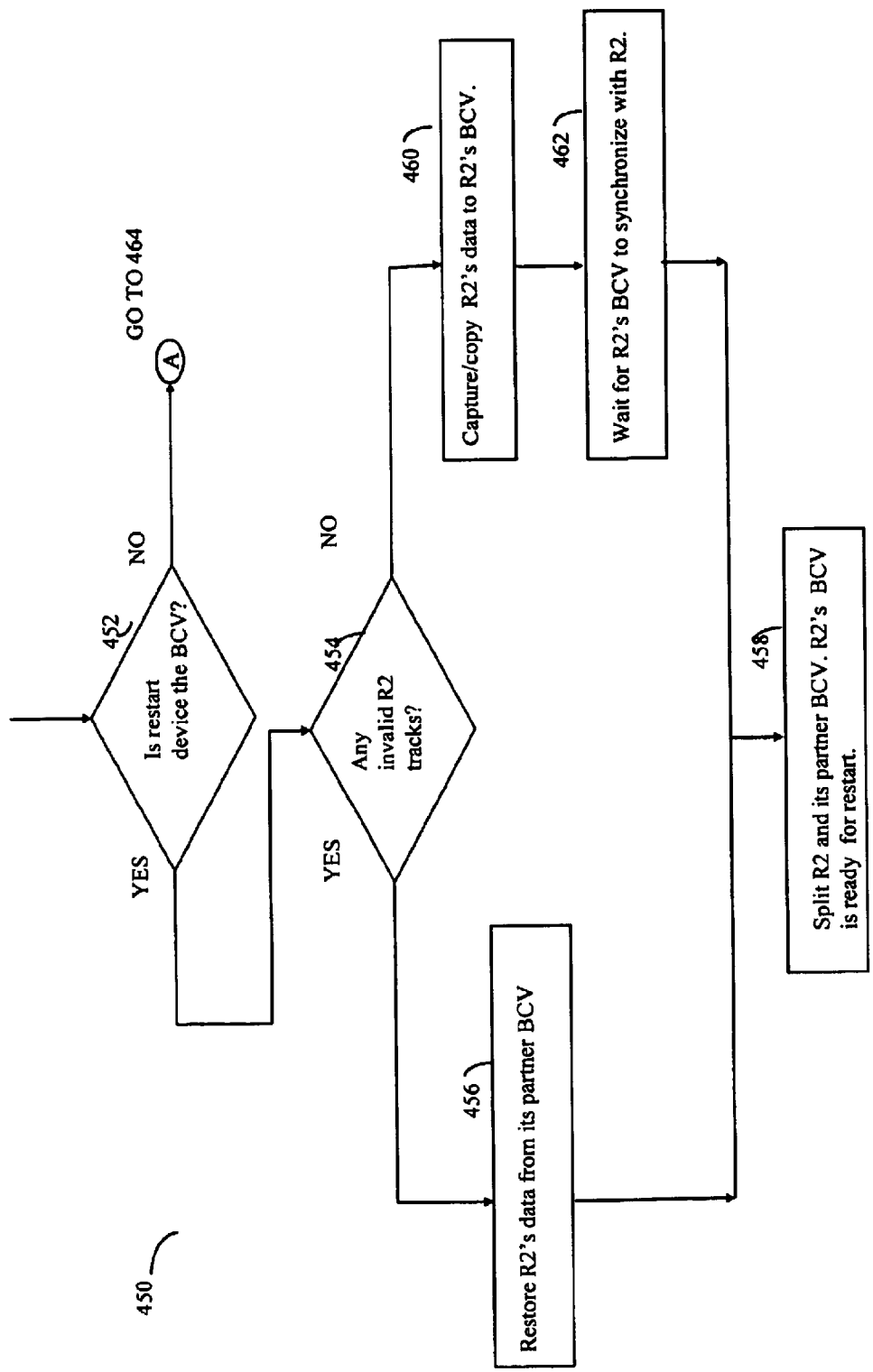
Figure 18:
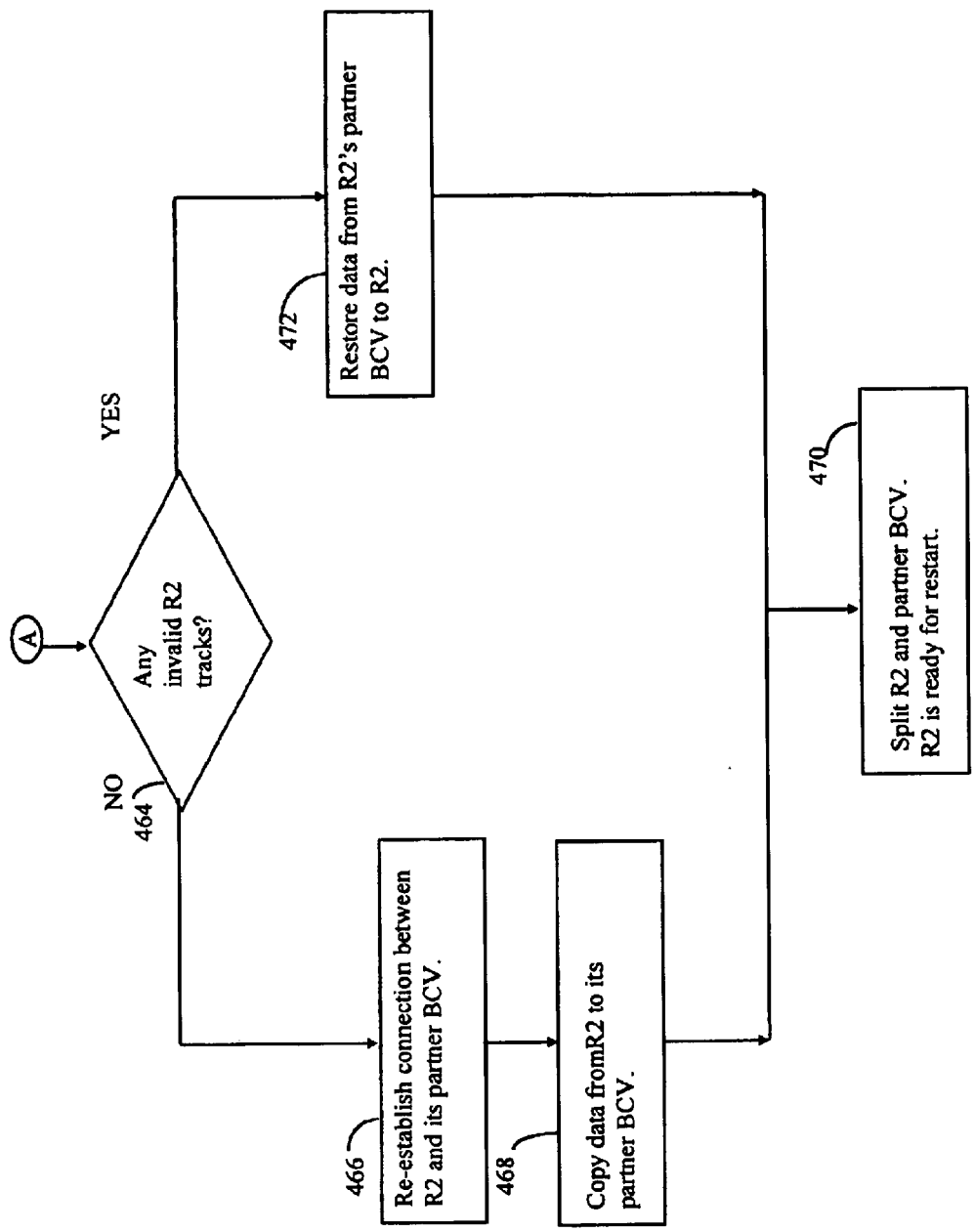

Referring now to FIGS. 17–18, shown is an example of an embodiment of a flowchart of steps of an embodiment of the PROCEDURE1 as may be executed from a host at the restart site. At step 452 a determination is made as to whether the restart device is the BCV or R2. If the restart device is the BCV, control proceeds to step 454 where a determination is made as to whether there are any invalid tracks on R2. If there are invalid tracks on R2, control proceeds to step 456 since R2's BCV has the most recent copy. At step 456, R2's data is restored from it's partner BCV, such as using the RESTORE command. There is a WAIT until R2 and its BCV are resynchronized. Control proceeds to step 458 where R2 and its partner BCV are SPLIT. Now, R2 and its BCV contain the same set of data and are SPLIT such that the BCV may be used for RESTART operations.

If, at step 454, it is determined that no R2 device has any invalid tracks, control proceeds to step 460. At this point, R2 has the most current copy of the data. At step 460, R2 and its BCV are RE-ESTABLISHED such that R2 data is copied to R2's BCV. At step 462, there is a wait for R2 and its BCV to synchronize. This state may be detected, for example, by using a QUERY command to examine track status information about the devices. In one embodiment, a QUERY command issued by a host may return track status information. The tracks of the devices may be synchronized when there is an invalid track count of 0 and a status of INUSE for R2's BCV. This information may be stored, for example, in an invalid track table which may be obtained using function calls in accordance with defined APIs (application programming interfaces). Control proceeds to step 458 where R2 and its partner BCV are split and the BCV is ready for RESTART.

If, at step 452, a determination is made that the restart device is R2, control proceeds to step 464 where a determination is made as to whether there are any invalid tracks on the R2 device. If there are invalid tracks, control proceeds to step 472 where data is RESTOREd from R2's partner BCV. Once the data has been RESTOREd to R2, control proceeds to step 470 where R2 is SPLIT from its partner BCV. Once R2 is read/write enabled with the SRDF Host Component, R2 devices are ready for RESTART.

If, at step 464, a determination is made that R2 has no invalid tracks, control proceeds to step 466 where the connection between R2 and its partner BCV are RE-ESTABLISHED. At step 468, data is copied from R2 to its BCV partner. Control proceeds to step 470 where R2 and its partner BCV are SPLIT. The R2 device is ready for RESTART.

PRODEDURE 2 is executed if none of the target R2 devices of the remote system 20b are SPLIT from their partner BCV, such as may be indicated, for example, by a status of MUSE, at the time of failure, the SAR step that was executing when failure occurred was synchronizing R2 and the partner BCV. Once the synchronization is complete between R2 and its partner BCV such that the devices are fully established, both R2 and the BCV hold the most recent point in time copy of data.

Figure 19:
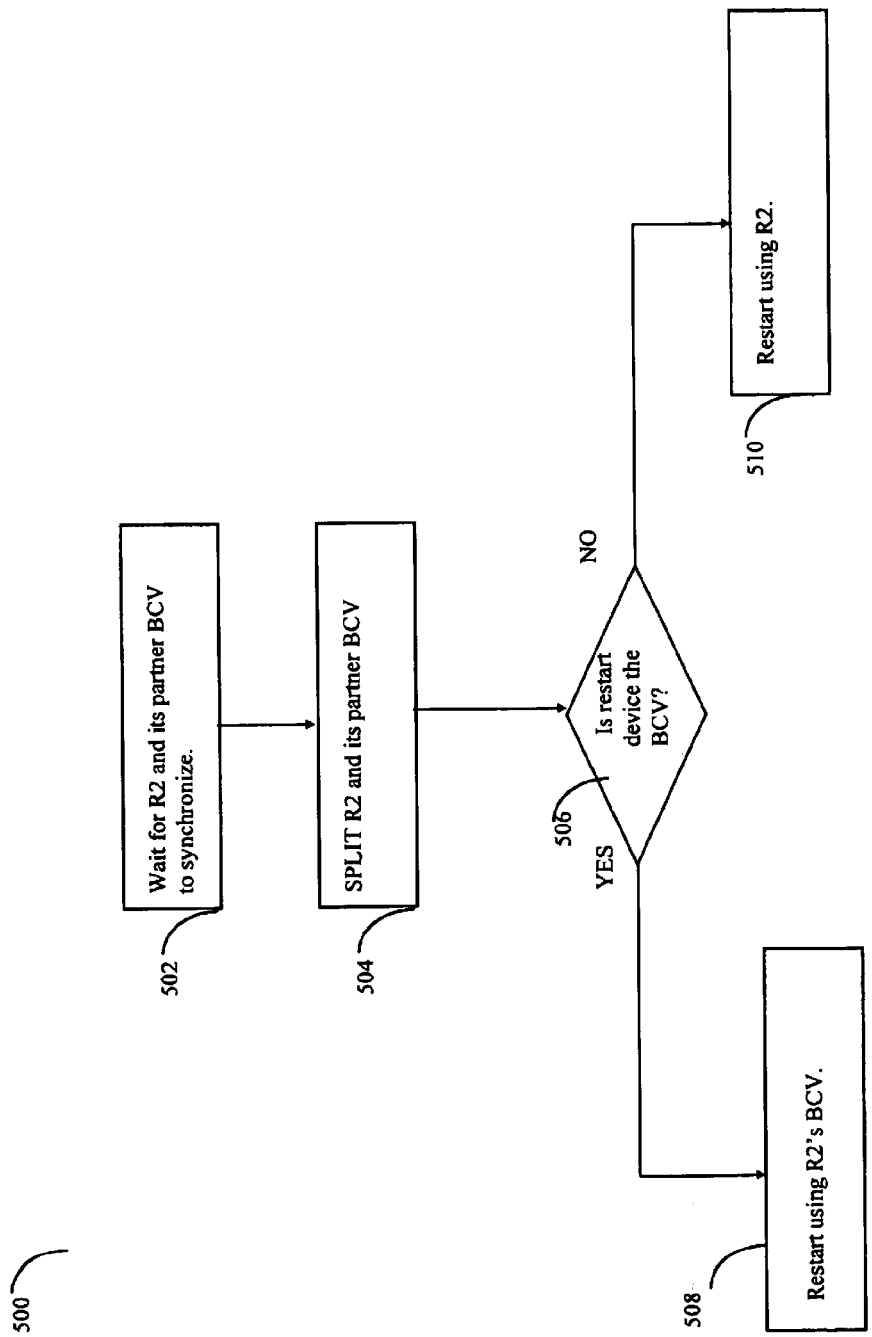

Referring now to FIG. 19, shown is a flowchart 500 of steps of an embodiment for PROCEDURE 2. At step 502, there is a wait for R2 and its BCV to synchronize. This may be determined in one embodiment using a QUERY command that may be issued from a host to receive device information, such as which tracks of the BCV are still invalid. When there is an invalid track count of 0 and a status of INUSE, the synchronization is complete. Other embodiments may use other techniques in performing this and other processing steps. At step 504, R2 and its partner BCV may be SPLIT. At step 504, a determination is made as to whether the restart device is R2 or its partner BCV. If it is the BCV, control proceeds to step 508 where the BCV is used in the RESTART. Otherwise, control proceeds to step 510 where the R2 device is used in the RESTART.

PROCEDURE 3 may be executed if it is determined that some of the target R2 devices are split from their partner BCVs indicating that when failure occurred, the SAR step executing was splitting or re-establishing R2 and its partner BCV. This command may have been issued to a subset of the control units. SPLIT commands are issued to the remote BCVs by the SAR process to preserve a restartable copy that has been successfully propagated to the R2 device. The most recent restartable copy of data in this instance is on R2 when only some of the BCVs are in an AVAIL status, such as when control is passed to PROCEDURE 3.

Figure 20:
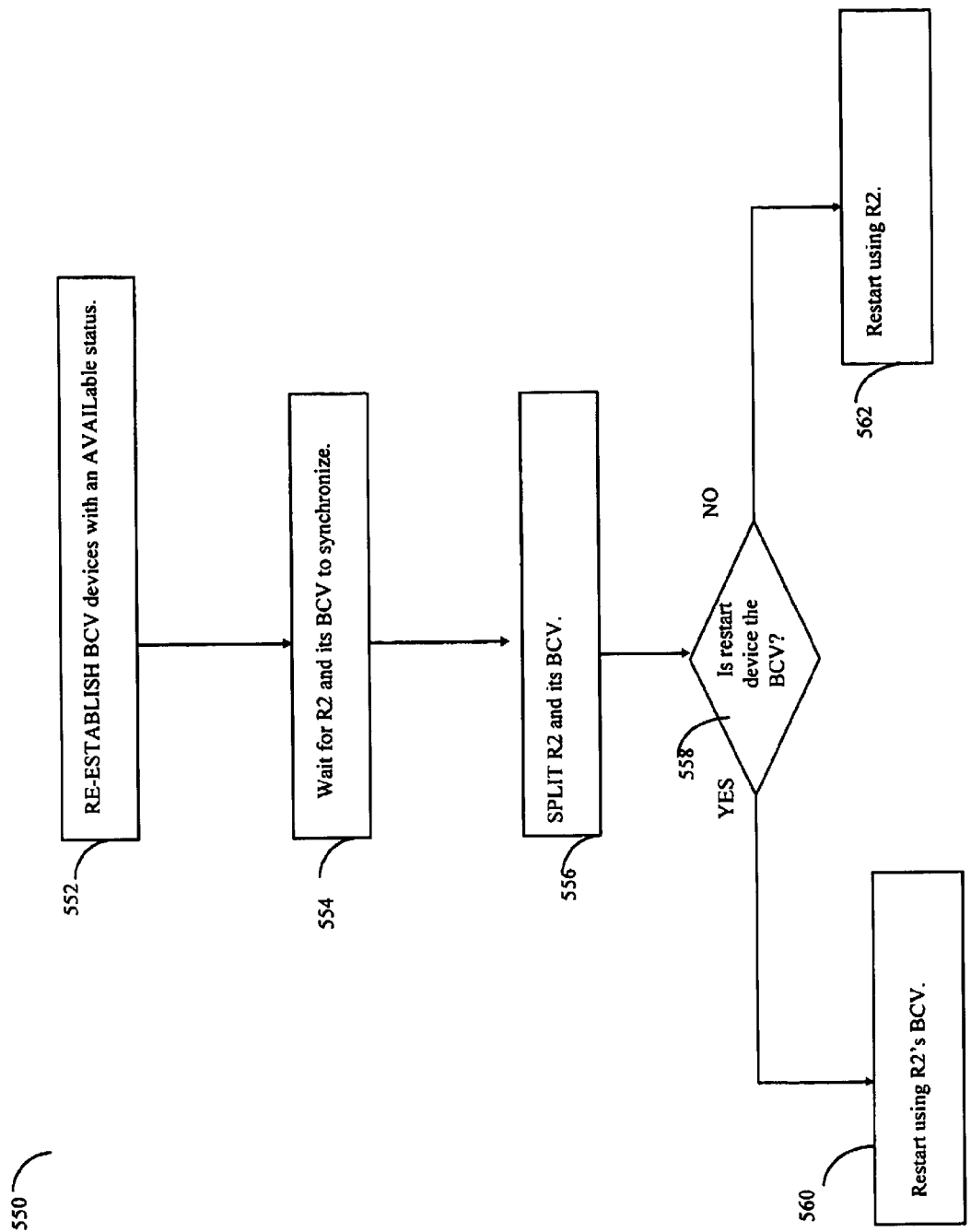

Referring now to FIG. 20, shown is a flowchart 550 of steps of one embodiment of PROCEDURE 3. At step 552, all BCVs having an AVAILable status are RE-ESTABLISHED with their R2 partners. At step 554, there is a wait for the data synchronization to complete with the BCVs having a status of INUSE. At step 556, R2 and its corresponding BCV are SPLIT. At step 558, a determination is made as to whether the RESTART device is the BCV. If so, control proceeds to step 560 where the BCV is used as the RESTART device. Otherwise, control proceeds to step 562 where the R2 device is used as the RESTART device. It should be noted that in the instance where the R2 device is selected for RESTART, step 556 may be omitted and performed if a copy of the data at this point in time is desired for future use.

The foregoing describes how to use the save point data in a remote or recovery site in the event of a failure of a production or local site for a system restart operation. In other words, while the SAR process steps are being executed, there may be a failure on the production site and the foregoing sets forth the steps that may be performed in an embodiment in connection with recovering a recent consistent set of data. The foregoing describes how to make the data available, for example, in connection with recovery operations.

An embodiment may also use the recovery site as its new or temporary primary site. In this instance, the recovery site effectively functions as the previously described primary site. For a single hop, the primary site may effectively function as the new or temporary recovery site. The primary and recovery sites may be reconfigured accordingly as described in following paragraphs and the SAR process may be performed once this reconfiguration is complete. At this point, the SAR processing may be characterized as a reverse SAR process with respect to the direction in which the data is propagated.

What will now be described are general processing steps that may be included in an embodiment when there has been a failure detected at a production site, such as the local system 20a described elsewhere herein in connection with other figures. What is described herein is a process that may be used in an embodiment for performing data replication such as may be included in a disaster or recovery site used when a production site becomes unavailable or goes off line, such as, for example, when a disaster occurs at the local system 20a. Once a disaster occurs such that the production site is off line or unavailable, a backup copy of replicated data may be made available in connection with restarting data operations in a computer system such as the system 10 of FIG. 1 described elsewhere herein. As part of the restart process, the state of the system may be assessed to determine where a most recent copy of data exists. This is described elsewhere herein based on the states of the different devices of the different data storage systems such as the remote storage system 20b. Once this has been determined, the replicated or backup data volumes formed through the SAR processing steps are used in restarting data operations in a system from a particular point.

In connection with performing a restart operation, data operations may be restarted off of either the R2 or the BCV device of the recovery site, such as the system 20*b*. Once the system restarts using either the R2 or BCV device of the recovery site, the techniques that will now be described may use data from the disaster recovery site to resume SAR processing with a goal of "returning home" to the local or production site. In other words, the techniques that will be described in following paragraphs restart data operations from a particular point using the disaster recovery point as our new or temporary production site. SAR operations may be resumed and processing may be continued with the intent of restoring a system configuration with the original production site running as the main or local system 20*a*.

Figure 21A:
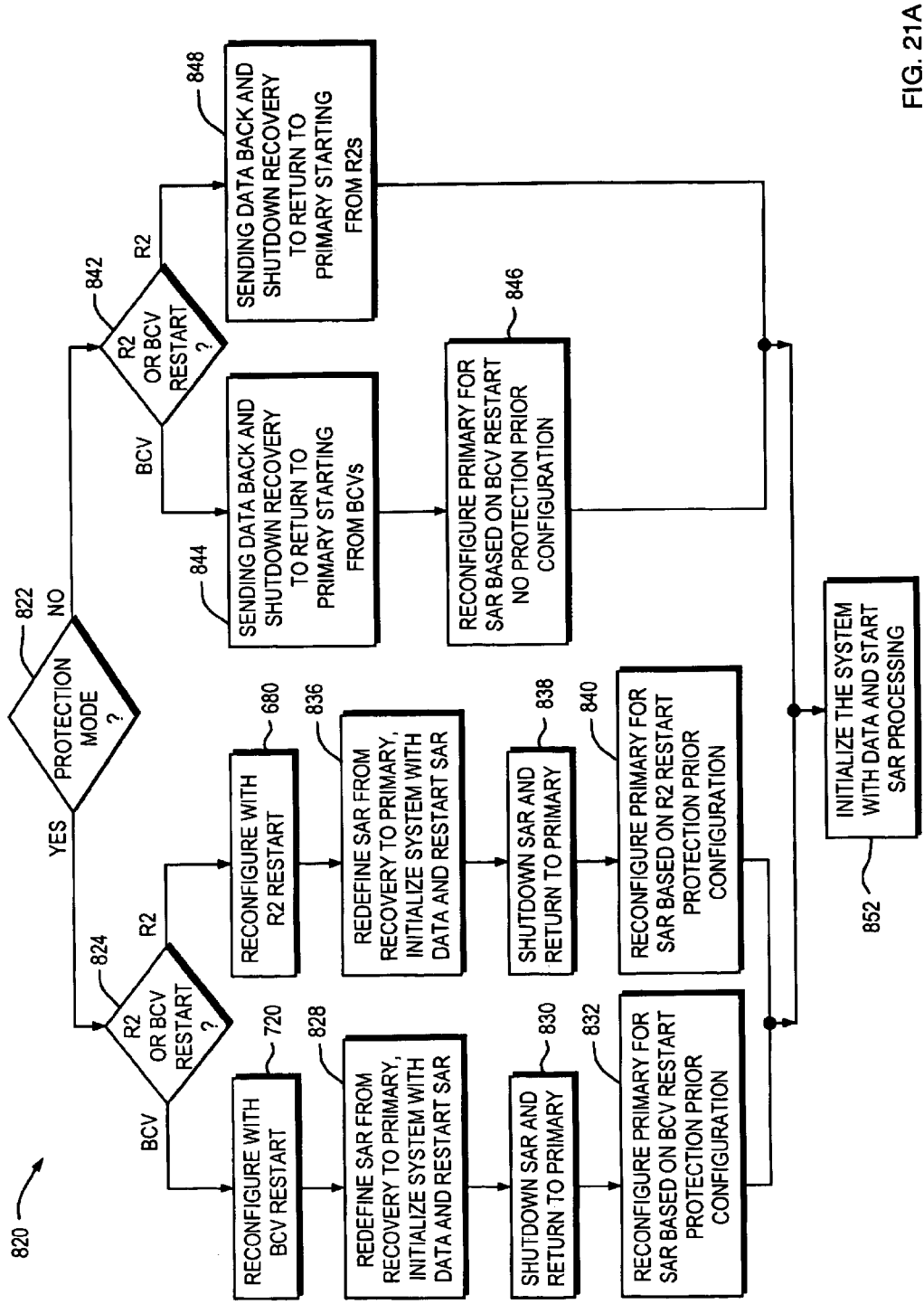
FIG. 21A is a flowchart of steps of one embodiment for performing restart operation processing, reverse SAR processing and going home to the production site.

Referring now to FIG. 21A, shown is a flowchart of steps of an embodiment where a restart operation is performed in connection with performing reverse SAR processing in a going home scenario such that the production site may resume operations.

At step 822, a determination is made as to whether an embodiment executes with a backup copy of data and hence be in a "protected" mode. If a determination is made at step 822 that there is a current protection mode desired, control proceeds to step 824 where a determination is made as to whether the restart operation is using the R2 or the BCV device as the restart device. If a determination is made at step 824 that the BCV device is being used as the restart device, control proceeds to step 720 to perform a reconfiguration of various devices included in the remote and local system are performed using the BCV as the restart device. The reconfiguration at step 720 may be characterized as reconfiguring devices in connections included in the remote and local system such as 20*a* and 20*b* such that reverse SAR processing may be performed using the remote system, such as 20*b*, as the starting point of the SAR processing reaching an end point, which in this instance may be the production site such as the local system 20*a*. Control proceeds to step 828 where the SAR process as may be included in a host system is redefined to execute using the recovery site as the starting point and the primary site or local storage device as the end point. An initialization procedure is performed to initially copy data from the starting point through the system beginning with the recovery site to the primary site as the target and restart the SAR processing steps to further propagate copies of data to the original production site while maintaining a protected copy. At step 830, SAR processing may be shut down and there is a return to using the primary site as the new start point in the SAR processing. At this point, control proceeds to step 832 where the various devices included in the system of data storage devices such as the local and remote data storage systems 20*a* and 20*b* respectively are reconfigured such that the system once again performs SAR processing originating from the production site. Subsequently, control proceeds to step 852 where the initialization procedure is performed again and the SAR processing is resumed using the primary site as the start point.

If, at step 824, a determination is made that the R2 device used on the recovery or remote system is to be used as the restart device, control proceeds to step 680 where a reconfiguration is performed of the various devices and connections therebetween. This reconfiguration at step 680 may be characterized as reconfiguring the various devices within the data storage system such as the remote and local data storage systems, respectively 20*b* and 20*a*, to use the disaster recovery site, such as the remote data storage system, as the start point with the production site or the local data storage system as described herein as the end point. Control proceeds to step 836 where the SAR process as may be included in a host-system is redefined to execute from the recovery to the primary system in accordance with the configuration performed at step 680. Subsequently, the initialization procedure is performed by initially propagating data through the system from the start point to the end point and SAR processing is restarted. Control proceeds to step 838 where there is a shutdown of the SAR processing and a return to the primary or production site. At step 840, the system is accordingly reconfigured such that the SAR processing may resume using the primary site or production site such as the local system 20*a* as the start point. Control subsequently proceeds to step 852.

If at step 822, a determination is made that there is no protection mode with no replicated data copy, control proceeds to step 842 where a determination is made as to whether the R2 or the BCV device is used as the restart device. If at step 842 a determination is made that the BCV device is used as the restart device, control proceeds to step 844 where data is sent back to the production or primary site. Subsequently, the recovery site or system such as 20*b* is shut down and a return is made to the primary system using the BCV as the starting point. Subsequently, control proceeds to step 846 where a reconfiguration of the primary site for SAR processing based on using the BCV as the restart device with the no protection may be performed. Control subsequently proceeds to step 852 to initialize and start SAR processing from the primary or production site such as the local system 20*a*.

At step 842, if a determination is made that the R2 device is used as the restart device, control proceeds to step 848 where data is sent or propagated to the primary site. Subsequently, the recovery site is shut down to return to the primary or production site. This is performed by using the R2 as the starting point. In this embodiment, no reconfiguration is needed when no protection is selected unless dynamic RDF is used to return to the primary site. Control proceeds to step 852 where the initialization procedure is performed and SAR processing is resumed beginning at the production site such as from the local system 20*a*.

In connection with shutting down the SAR process running in the reverse direction and returning to the primary site, such as in connection with the processing steps of 830 and 838, applications on a host system may be shut down, for example, such that data operations do not continue. Using various commands such as the STOP and START commands described elsewhere herein, the host may stop SAR processing which is running currently in the reverse direction. Any data which is "in the data pipe" running from the recovery site to the production site is propagate to the end point or to the production site to "empty or drain the data pipe". Subsequently, the STD and the R1BCV of the recovery site are now split.

Figure 21B:
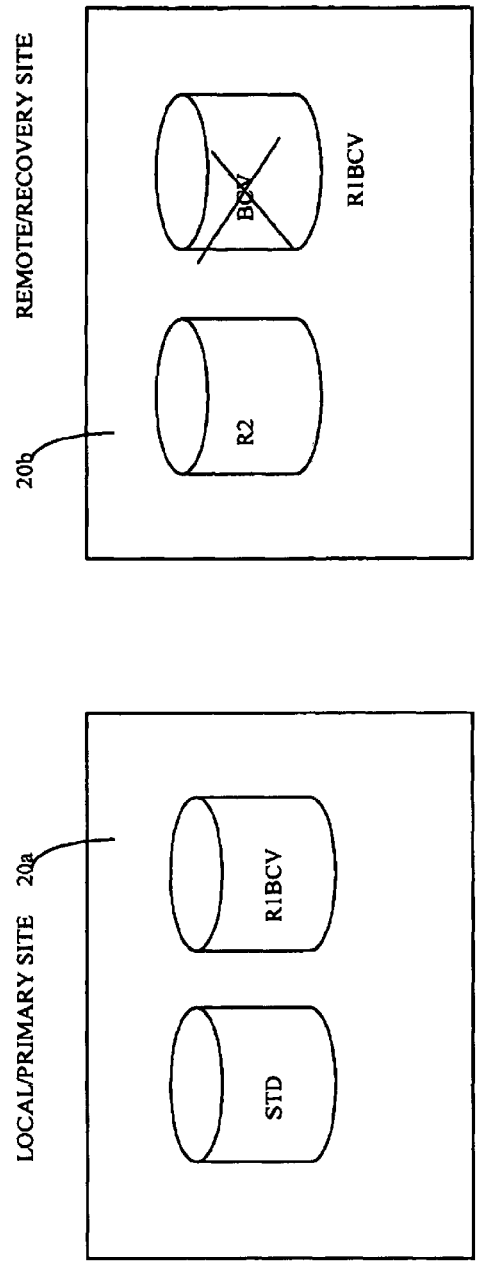

Referring now to FIG. 21B, shown is an example 600 illustrating a first step in reconfiguration for performing the reverse SAR. The recovery BCV is reconfigured as the R1BCV.

Figure 22:
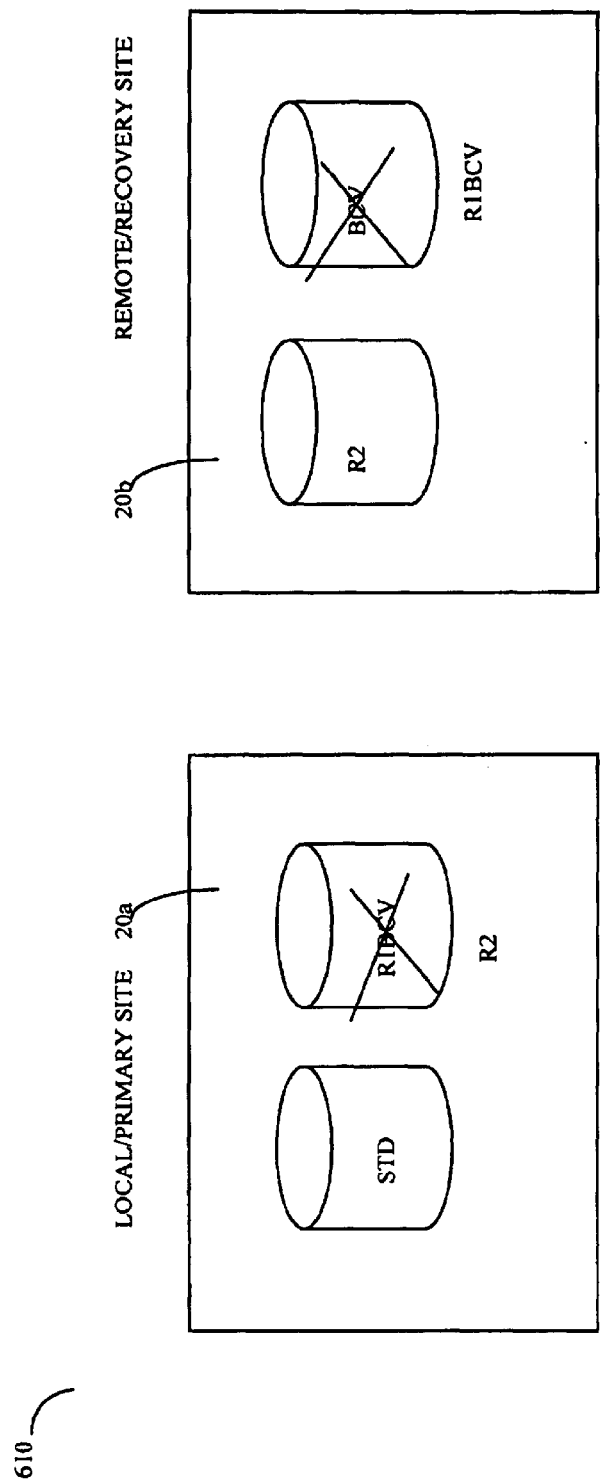

Referring now to FIG. 22, shown is an example 610 illustrating a second step in reconfiguration for performing the reverse SAR. The primary R1BCV is reconfigured as the remote or recovery R2 device.

Figure 23:
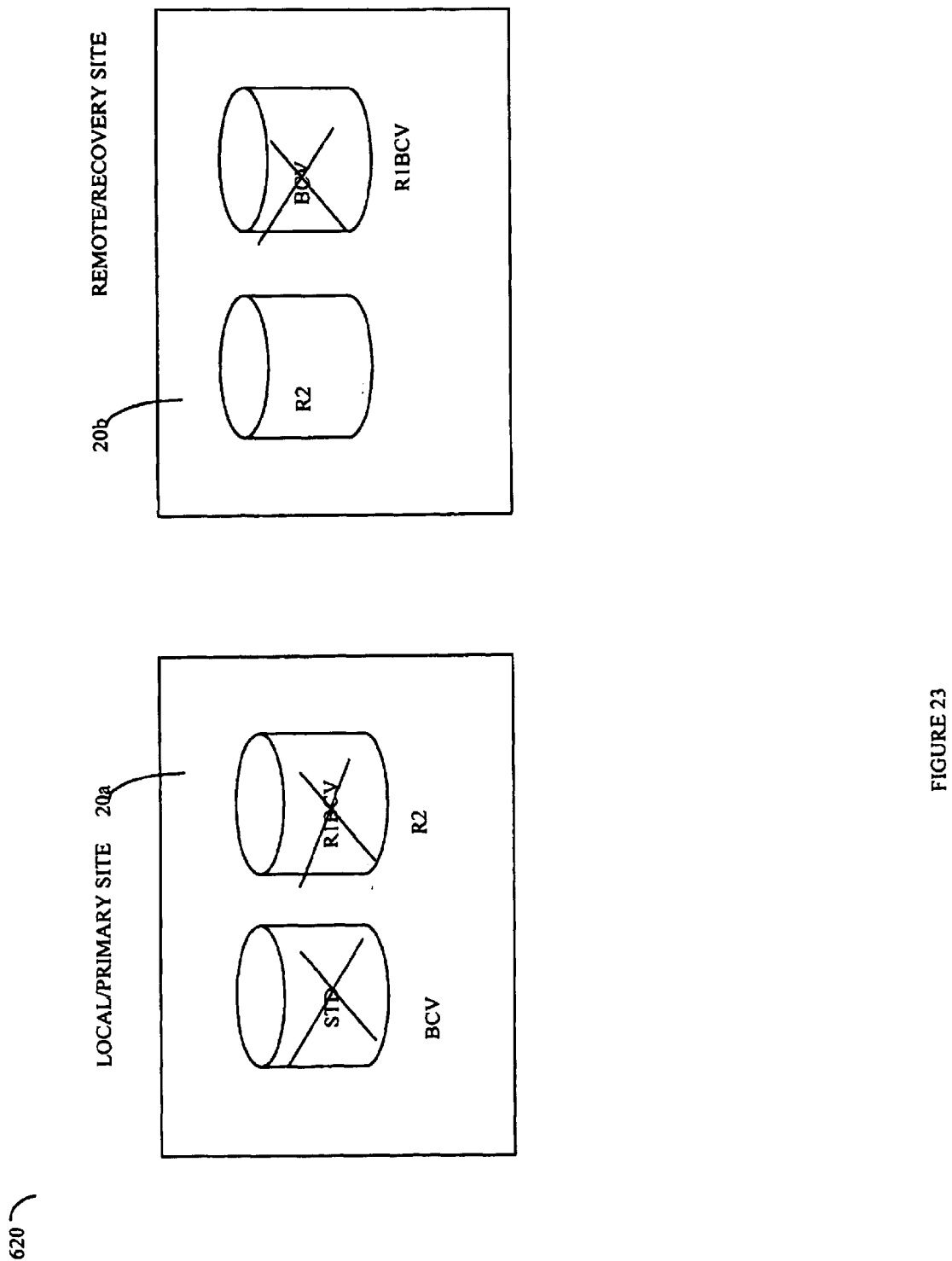

Referring now to FIG. 23, shown is an example 620 illustrating a third step in reconfiguration for performing the reverse SAR. The primary STD is reconfigured as the BCV for R2 in the new or temporary remote recovery site.

Referring now to FIG. 24, shown is an example 640 illustrating a fourth step in reconfiguration for performing the reverse SAR. The recovery R2 is reconfigured as the STD device.

Figure 25:
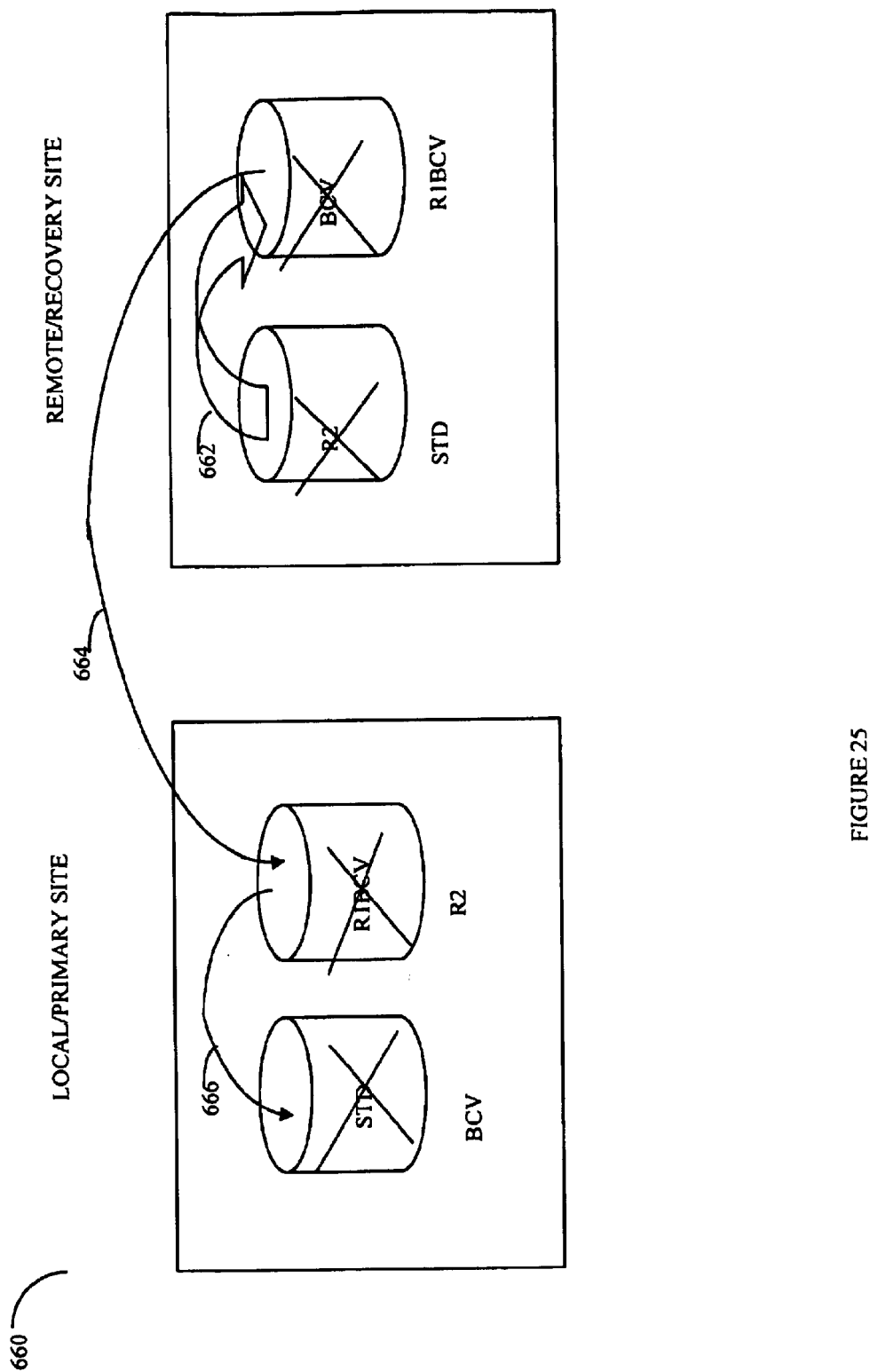

Referring now to FIG. 25, shown is an example 660 illustrating a fifth step in reconfiguration for performing the reverse SAR. The link configuration among the devices is altered. Farpoint configurations may require a director swap in addition to a device swap. This reconfiguration may be performed using technology included in the RDF product as available by EMC Corporation using a remote host system. Other embodiments may use other reconfiguration software, for example, that may be included on the remote host. The new STD device is configured to use its newly designated BCV as a mirror as indicated by arrow 662. The newly designated R1BCV is linked to the newly designated R2 as indicated by arrow 664. The newly designated R2 is linked to its newly designated BCV as indicated by arrow 666. At this point, the SAR process is redefined to perform the SAR processing steps from the previously designated recovery site 20b to the primary or local site 20a.

Figure 26:
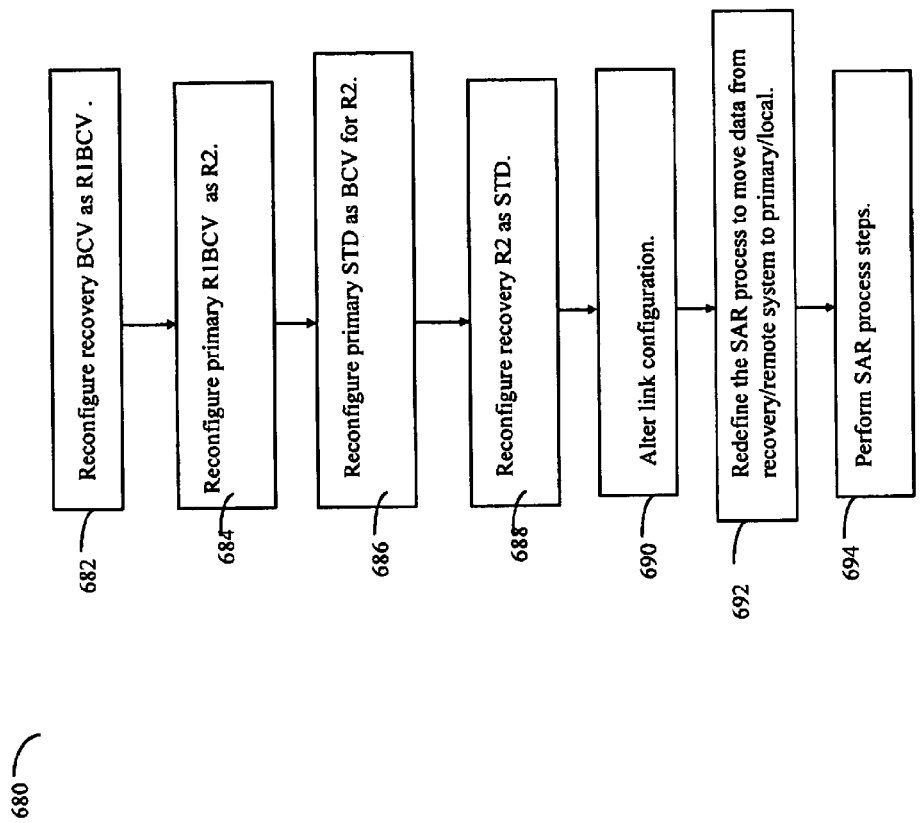
FIG. 26 is a flowchart of steps of one embodiment of reverse SAR processing using the recovery site BCV as the starting point.

Referring now to FIG. 26, shown is a flowchart of an embodiment of more detailed processing steps for previously described step 680 for reconfiguring and performing the reverse SAR process. This flowchart 680 summarizes steps just described. At step 682, the recovery BCV is reconfigured as the new R1BCV. At step 684 the primary R1BCV is reconfigured as the new R2. At step 686, the primary STD is reconfigured as the new BCV for the new R2. At step 688, the recovery R2 is reconfigured as the new STD device. At step 690, the device link configuration is altered. In one embodiment, this configuration may be altered, for example, by modifying a configuration file by a customer service agent. At step 692, the SAR process is redefined to execute propagating data from the previous recovery site to the previous primary site beginning with R2. At step 694, the SAR process steps are executed in the reverse direction.

It should be noted that the foregoing provides for reconfiguration and performing the reverse SAR processing using R2 as the starting point. The BCV in the recovery site may also be used as the starting point rather than R2. If using the BCV as the starting point for the reverse SAR, the reconfiguration just described is different.

Figure 27:
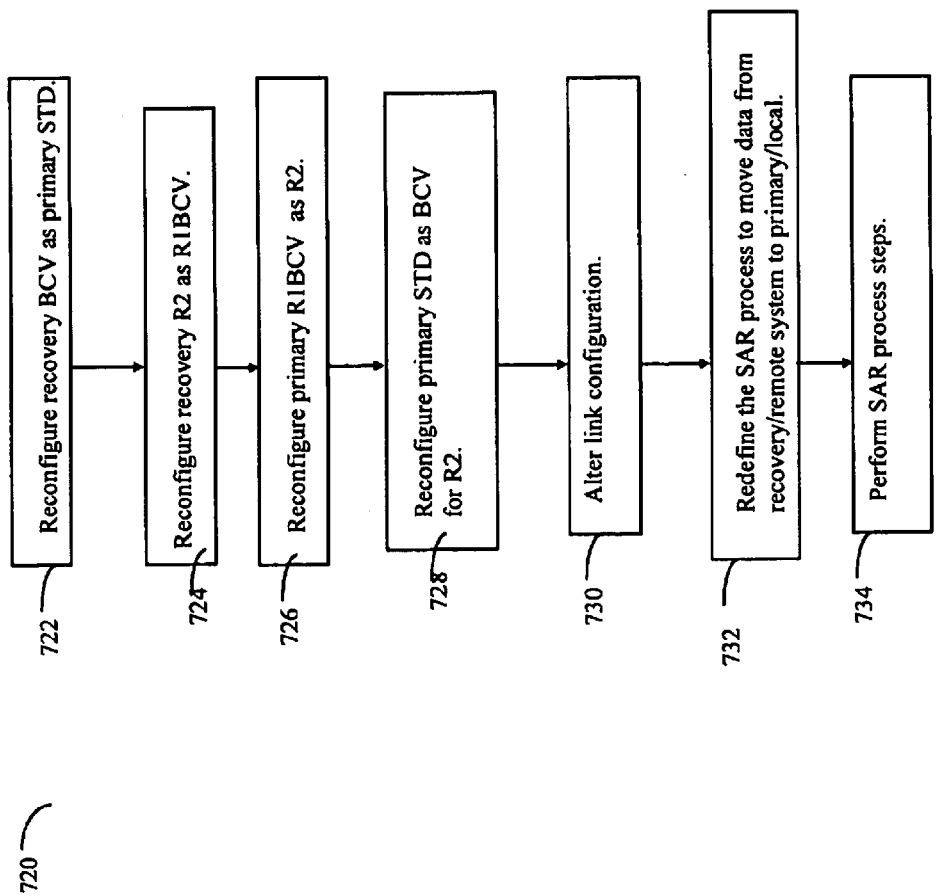
FIG. 27 is a flowchart of steps of one embodiment of reverse SAR processing using the recovery site R2 as the starting point.

Referring now to FIG. 27, shown is a flowchart of one embodiment of more detailed processing steps for step 720 for reconfiguration and performing reverse SAR processing. At step 722, the recovery BCV for R2 is reconfigured as the new STD. At step 724, the recovery R2 is reconfigured as the new R1BCV. At step 726, the primary R1BCV is reconfigured as the new R2. At step 728, the primary STD is reconfigured as the new BCV for R2. At step 730, the link configuration between devices is altered to provide data connections between devices to function in accordance with the new configuration. At step 732, the SAR process is redefined to propagate data from the recovery site to the primary site. At step 734, the reverse SAR process is started.

Figure 28:
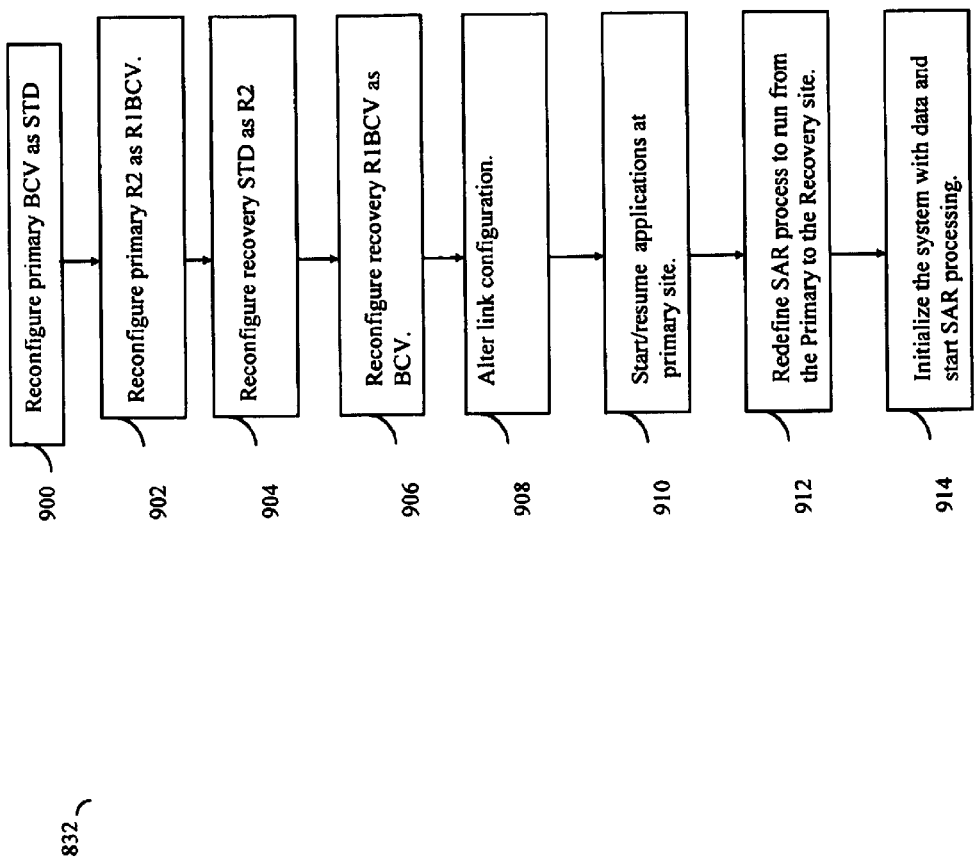
FIGS. 28–33 are flowcharts of more detailed processing steps of an embodiment for steps included in the flowchart of FIG. 21A.

Referring now to FIG. 28, shown are more detailed processing steps of step 832 previously described in connection with flowchart 820 of FIG. 21 A. At step 900, the primary BCV is reconfigured as the STD. At step 902, the primary R2 is reconfigured as the R1BCV. At step 904, the recovery STD is reconfigured to be the R2 device. At step 906, the recovery R1BCV is reconfigured as the BCV included in the remote or recovery site. At step 908, link configuration is altered such that the links between the various devices are accordingly established. This is described in more detail elsewhere herein. At step 910, applications at the primary site are started such that data operations may resume. At step 912, the SAR process is redefined to run from the primary site as the start point using the recovery site as the end point. This redefinition within the SAR process may be done using commands such as those described herein issued by the host. At step 914, the system is initialized with data such that data is propagated from the start to the end point, such as from the primary to the recovery site in this example and SAR processing is resumed.

Figure 29:
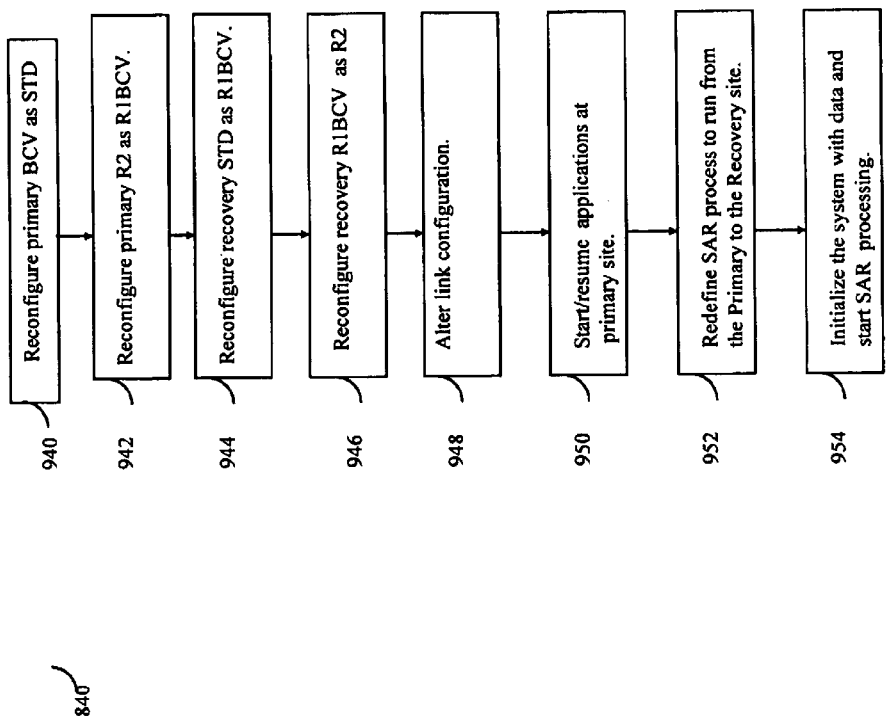

Referring now to FIG. 29, shown is a flowchart of more detailed processing steps in one embodiment for step 840 described in connection with flowchart 820 of FIG. 21A. At step 940, the primary BCV is reconfigured as the STD. At step 942, the primary R2 is reconfigured as the R1BCV of the primary site. At step 944, the recovery STD is reconfigured as the BCV of the recovery site. At step 946, the recovery R1BCV is reconfigured as the R2 device. The processing steps 948, 950 and 952 respectively are similar to processing described in connection with steps 908, 910, 912 and 914 of flowchart 832.

It should be noted that the reconfiguration of the different devices as described herein may be performed using a variety of different techniques that may vary in accordance with each embodiment in the hardware and software residing therein. For example, in one embodiment, the reconfiguration of the devices may be performed by modifying configuration data as may be included in a configuration file stored in global memory of each of the data storage systems. A reconfiguration such as this may be defined in accordance with a static reconfiguration file. Another embodiment may perform the reconfiguration of the various devices by using techniques as described in connection with dynamic RDF as described in pending U.S. patent application Ser. No. 09/997,810 filed on Nov. 30, 2001, entitled "Dynamic RDF", which is incorporated by reference herein. As described in the Dynamic RDF, devices may be deleted and created in pairs using the delete pair and create pair commands executed by a host. Additionally, using the Dynamic RDF techniques, a dynamic configuration file may also be used rather than require static reconfiguration such as by modifying a system configuration file. It should be noted that other systems may include other types of files and use different techniques that may be used in connection with system configuration and the reconfiguration thereof to perform the processing steps described herein.

Figure 30:
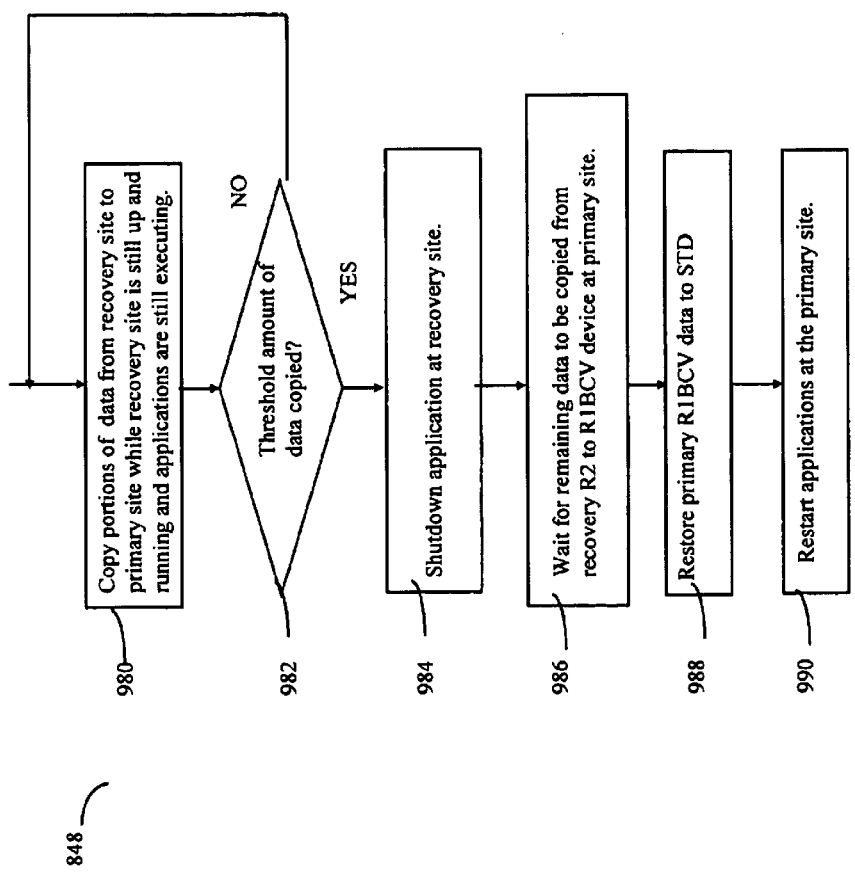

Referring now to FIG. 30, shown is a flowchart of steps of one embodiment providing more detail of the processing steps associated with 848 as described in connection with flowchart 820 of FIG. 21A. Generally, the flowchart 848 describes more detailed processing steps that may be included in an embodiment where there is no protection and the BCV has been selected in connection with performing the restart operation. The processing steps set forth in more detail sending data back to the primary site in order to return home to begin processing again from the initial primary or production site, such as the local system 20a. At step 980, portions of data may be copied from the recovery site to the primary site while the recovery site is still up and running and applications are still executing. In one embodiment, this may be performed, for example, as a background task without shutting down all operations of applications and data operations. At step 982, a determination is made as to whether a predetermined or threshold amount of data has been copied or propagated from the recovery site to the production site. If this threshold has not been reached, control proceeds to step 980 where the data portions are continually copied until a threshold amount of data has been copied to the production site from the recovery site. Once this predetermined amount of data has been copied, control proceeds to step 984 where applications at the recovery site may be shut down. In other words, applications performing data operations such as to the recovery site which is now acting as the temporary primary site may be halted in order to make the switchover to the primary site for going home. Control proceeds to step 986, where the remaining data is copied from the recovery R2 to the R1BCV device at the primary site. Subsequently, control proceeds to step 988 where data is restored from the primary R1BCV to the STD device at the primary site. Subsequently, at step 990, applications may be restarted on the primary site.

It should be noted that the foregoing steps described in connection with the flowchart detailing more processing steps for step 848 may be characterized as propagating data from the recovery site back to the production site while the recovery site is still up and running to process data operations. When the data propagation from the recovery site to the primary site reaches a predetermined level or threshold, data operations on the recovery site may be shut down such that the remainder of data currently in the pipe being propagated may be pushed over to the production site akin to a pipe or data pipeline being emptied. At this point, the primary site may resume its processing once data is synchronized. Alternatively, an embodiment may choose to propagate data from the recovery site to the primary site using different techniques. For example, and embodiment may choose to shut down the recovery site, propagate or copy all of the data from the recovery site to the primary site prior to bringing up applications on the primary site. In other words, data propagation from the recovery site back to the production site may not be performed piece meal while the recovery site is up and running. An embodiment may also determine that data is copied or synchronized between devices in accordance with an invalid track count table indicating any differences in data between devices. In accordance with the technique and steps described in connection with flowchart 848, for example, an invalid track table may be used to indicate which tracks or portions of a device differ from another device. An invalid track table may be used, for example, to indicate which portions of data have yet to be copied from one device to another device. This technique is described elsewhere herein in more detail. Other embodiments may use other techniques in connection with data propagation from one device to another as well as in propagating data from the recovery site to the primary site.

In connection with detailed processing of step 850, the defined SAR processing steps, for example, as may be defined by the host system using commands described elsewhere herein is reconfigured such that the SAR processing steps described elsewhere herein propagate data once again from the primary site or production site to the remote or disaster recovery site. After the data restoration to the primary site is complete, the system of the SAR processing may be initialized and again resume SAR processing from the production site to the disaster recovery site.

Figure 31:
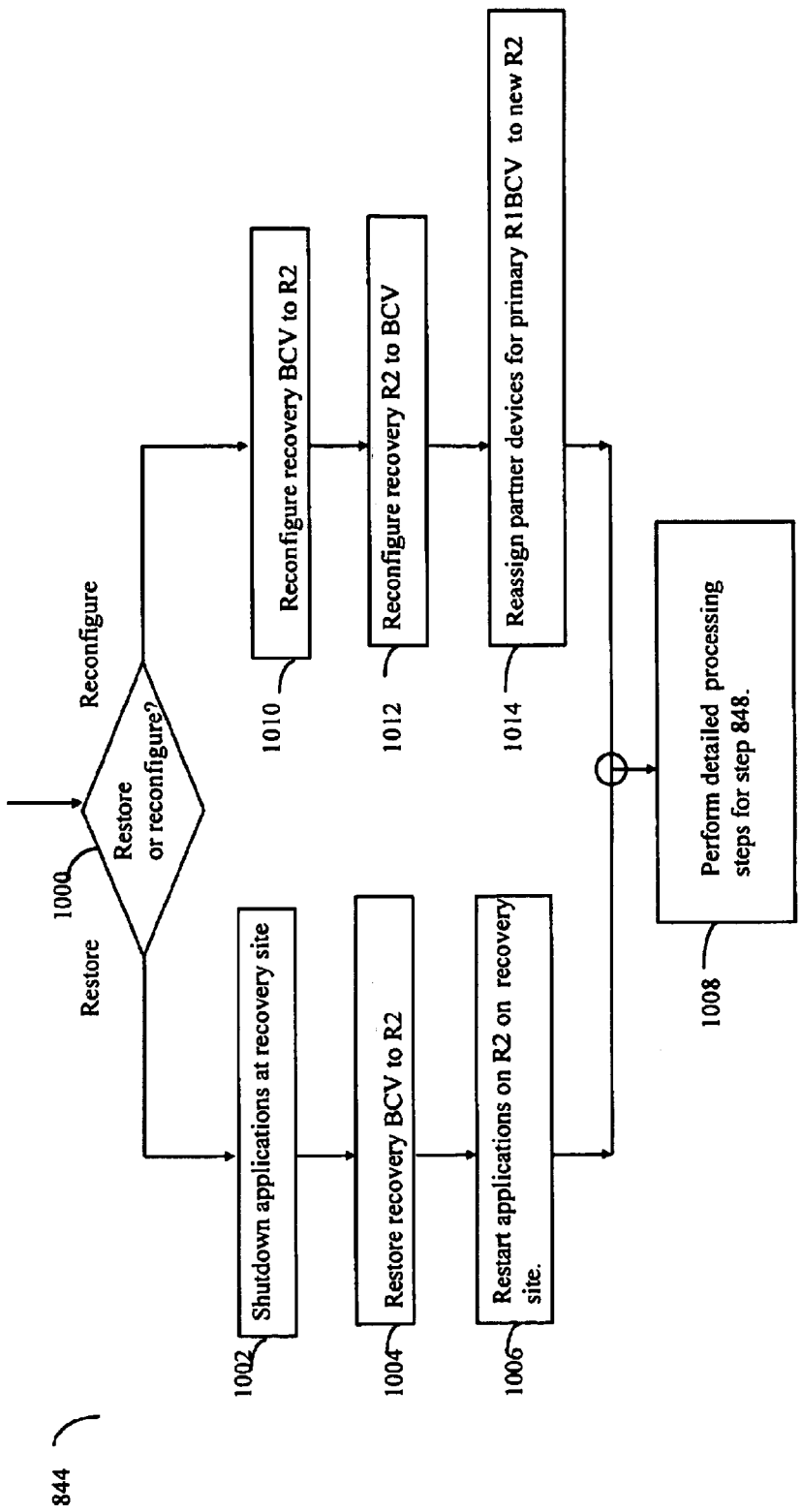

Referring now to FIG. 31, shown is a flowchart of more detail processing steps of step 844 previously described in connection with flowchart 820 of FIG. 21A. As previously described elsewhere herein, step 844 involves sending data back to the primary site from the recovery site subsequently shutting down the recovery site to return control to the primary site using the BCV as the starting point or device. At step 1000, a determination is made as to whether a restoration or reconfiguration technique is to be used. If a restoration technique is to be used, control proceeds to step 1002 where applications of the recovery site are shut down. At step 1004, the recovery BCV is restored to the R2 device and subsequently control proceeds to step 1006 where applications are restarted on the R2 device on the recovery site. Control then proceeds to step 1008 where the detail processing steps previously described in connection with step 848 as described in connection with FIG. 30 may be performed. It should be noted that as an alternative to the processing steps outlined in flowchart for step 848 of FIG. 30 as also described elsewhere herein, rather than propagate data from the remote system for the data recovery site to the primary site, an alternative technique that may be performed in connection with the processing of step 1008 may be to have an embodiment shutdown applications at the recovery site, copy changed data from the recovery site to the primary site, and resume operations at the primary site. This may be performed rather than propagating data while running at the recovery site for a predetermined time period as outlined in FIG. 30.

If a determination is made at step 1000 that a reconfiguration technique is to be used in an embodiment, control proceeds to step 1010 where the recovery BCV is reconfigured to be device R2. At step 1012 the recovery R2 is reconfigured to be the BCV included in the disaster recovery or remote site. At step 1014, partnering devices for the primary R1BCV are reassigned to the new R2. This establishes the relationships necessary for the processing in step 1008 to succeed in bringing the data back to the primary site, such as by performing necessary device pairing and partnering. Subsequently, control proceeds to step 1008 for further processing.

It should be noted that other embodiments may use other techniques to propagate or copy data from the BCV on the remote site to the R2 device. An embodiment may use a technique that may be characterized as a restore and swap operation at the recovery site between the BCV and the R2 device located at the recovery site such as in this example which is the remote data storage system 20b. I/O may be first redirected from the R2 device to the BCV device on the remote or recovery site.

Figure 32:
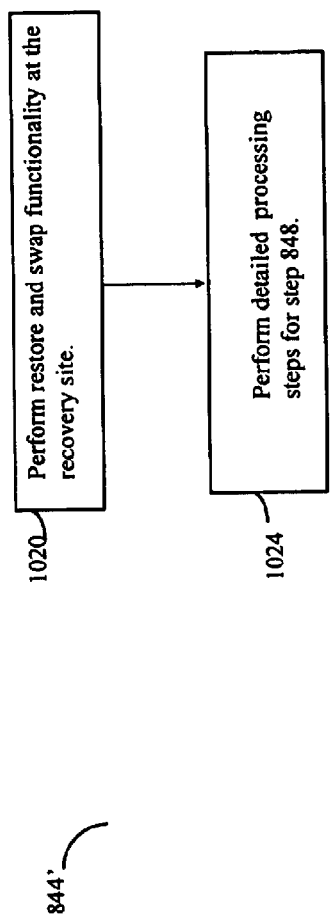

Referring now to FIG. 32, shown are more detailed processing steps that may also be included in an embodiment in connection with processing of step 844. In other words, an embodiment may include the processing steps of step 844 prime as outlined in FIG. 32 rather than the detailed processing steps outlined for step 844 in connection with FIG. 31. At step 1020, the restore and swap functionality at the recovery site between the R2 and the BCV device may be performed. Generally, the restore and swap functionality may be described as copying data from the BCV on the remote site to the R2 device and subsequently redirecting any I/O operations from the BCV device to the R2 device. Applications continue to run at the remote site. Control proceeds to step 1024 where additional processing steps are performed as described previously in connection with step 848. It should be noted that step 1024 is similar to the processing described in connection with step 1008 which includes step 848 detailed processing and any equivalents also described herein. In one embodiment using Symmetrix data storage systems, data may be propagated from the BCV device to the R2 device using the RESTORE functionality.

Figure 33:
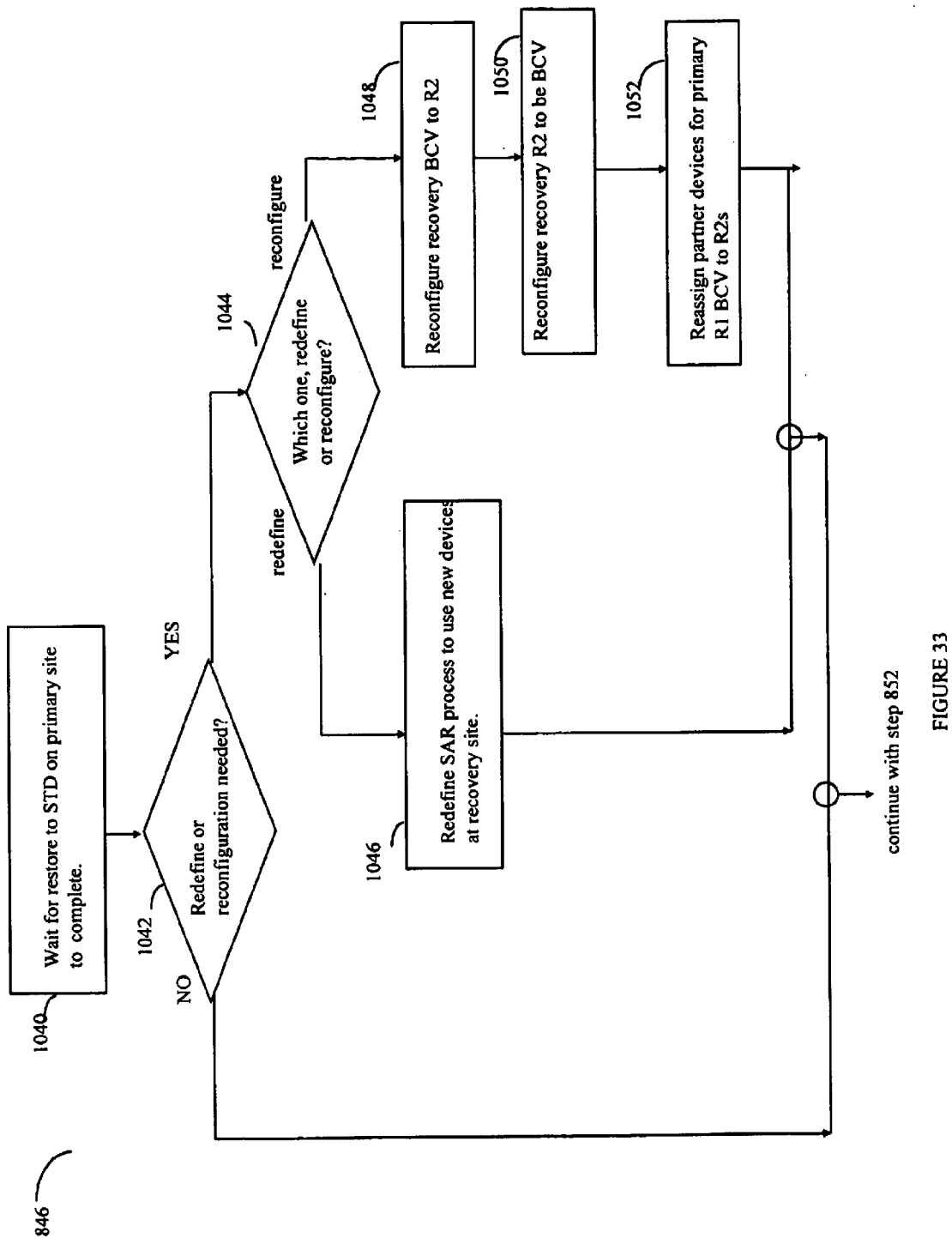

Referring now to FIG. 33, shown are more detailed processing steps in a flowchart for processing step 846 previously described in connection with flowchart 820 of FIG. 21A. As described elsewhere herein, step 846 involves reconfiguring the SAR process to begin using the primary site as the origination or starting point for SAR processing. At step 1040, there is a wait for the data to be restored onto the STD of the primary site.

Control proceeds to step 1042 where a determination is made as to whether a redefinition or a reconfiguration is needed. The circumstances when a redefinition or reconfiguration may be needed is dependent upon other processing steps or choices previously made. The redefinition applies to the SAR process at the primary site. If the BCV and the R2 at the restart site are reconfigured (their attributes are swapped), to execute the presynchronization process of going home as in step 844, then the SAR process needs to be redefined to reflect these changes. Alternatively, the SAR process does not have to be redefined, for example, if the attributes of the R2 and the BCV are swapped back after the presynchronization step in connection with the reconfiguration processing option. At step 1042, if it is determined that no redefinition or reconfiguration is needed, control proceeds to step 852 where processing continues, otherwise, if a determination is made at step 1042 that a redefinition or reconfiguration may be needed, control proceeds to step 1044 where a determination is made as to which of the redefinition or reconfiguration is to be used. If the redefinition or to be used at step 1044, control proceeds to step 1046 where the SAR process is redefined to use the new devices at the recovery site. Otherwise, at step 1044 a reconfiguration process may be performed by proceeding to step 1048 with recovery BCV is reconfigured to be the R2 and at step 1050 the recovery R2 is reconfigured to be the BCV. Subsequently, at step 1052, the partner devices for the primary site R1BCV is reassigned to the R2 device. Subsequently, processing continues with step 852 as described elsewhere herein.

Figure 34:
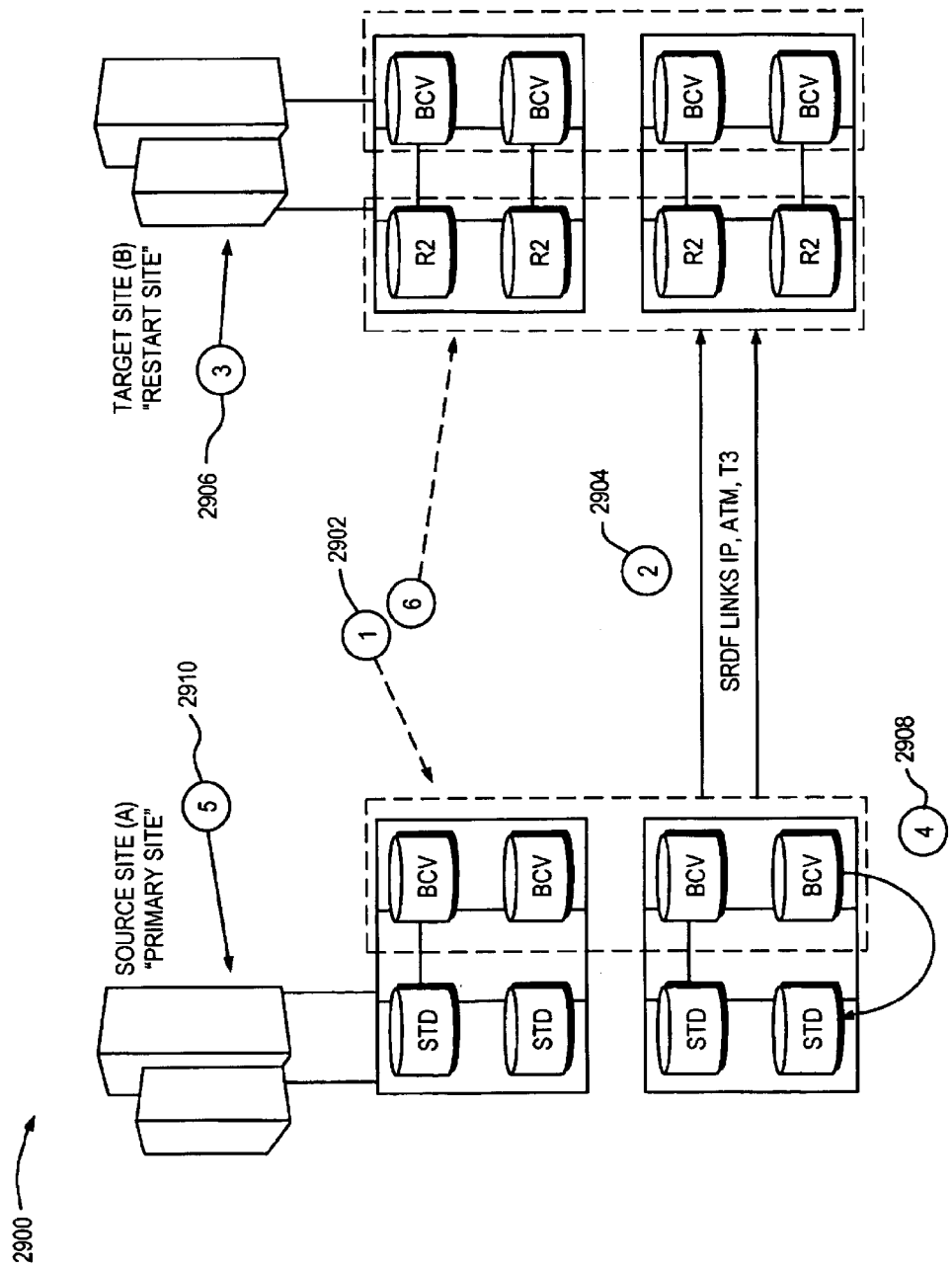
FIG. 34 is an example of an embodiment of a system using the R1–R2 swap option for performing returning home processing in a single-hop embodiment.

Referring now to FIG. 34, shown is an example of an embodiment of a single hop configuration 2900 that may be used in connection with performing an RDF R1–R2 swap option for returning home to the primary site. The returning home R1–R2 swap option processing that will be described may be used as an alternative to the presynchronization option and others described herein. One difference between the presynchronization option and the R1–R2 swap option that will now be described is that after using the swap command, the resynchronization is a continuous operation. In contrast, when using the presynchronization option, multiple resynchronization cycles are performed. An embodiment in which the R1–R2 swap option may be preferred is one having a relatively large number of invalid tracks that also generates a high number of invalid tracks for a predefined time interval. As described herein, the RDF extended distance configuration that uses the remote fiber adapter or RFA supports the R1–R2 swap command of the RDF host component, as described in pending U.S. patent application Ser. No. 09/998,683, filed on Nov. 30, 2001, entitled "Reversing a Communications Path Between Devices", which is herein incorporated by reference. An RDF extended distance configuration that uses the RA ESCON adapter supports only the director R1–R2 swap.

Figure 35:
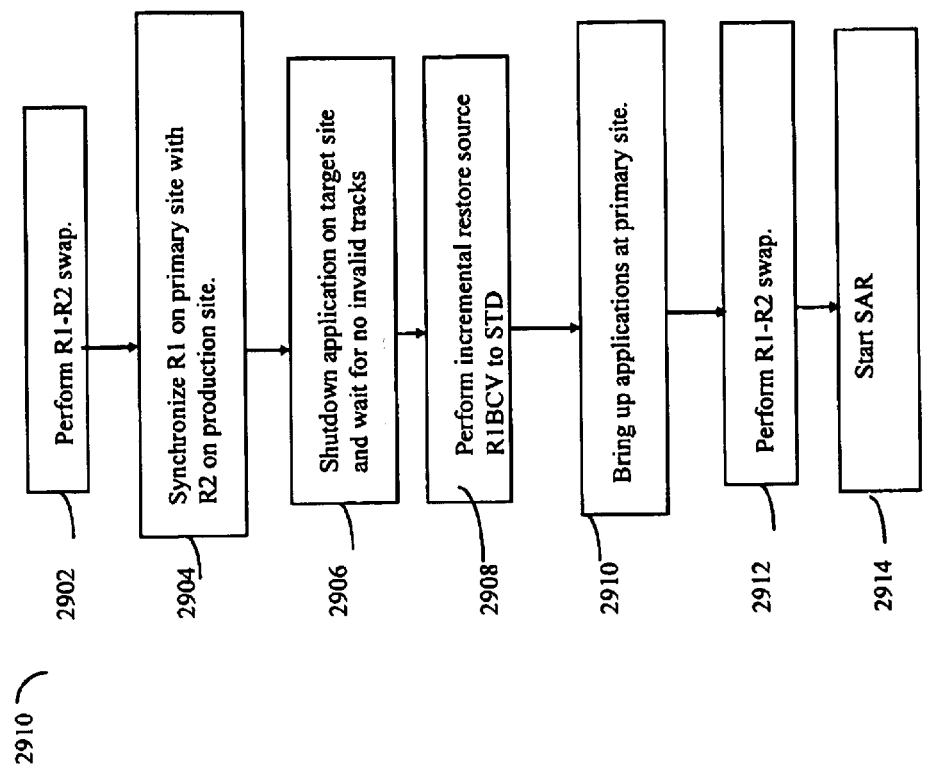
FIGS. 35–36 are flowcharts of the processing illustrated in FIG. 34.

Referring now to FIG. 35, shown is a flowchart 2910 of processing steps that may be performed in connection with the configuration 2900 of FIG. 34. It should be noted that FIG. 34 is annotated to illustrate processing steps that will now be described in connection with the flowchart 2910. At step 2902, the R1–R2 swap processing steps are performed. As will be described in more detail in paragraphs that follow, the R1–R2 swap is an option that uses an existing relationship between two devices and reverses the direction in which the data is propagated. This is in contrast to other techniques described herein, for example, using dynamic RDF processing in which relationships between devices are created and deleted rather than using an established or existing device relationship.

At step 2904, R1 on the primary site is synchronized with R2 on the production site such that the data copy of the R1BCV on the production site includes a copy of the data as it appears on the R2 of the target site. At step 2906, applications are shut down on the target site. There is a wait until there are no invalid tracks indicating that data has been propagated from the R2 at the target site to the production site device R1BCV. At step 2908, an incremental restore is performed such that any changed or different tracks are propagated from the R1BCV to the STD device at the primary or production site. At step 2910, applications are restarted and brought up at the primary site. At step 2912, an R1–R2 swap processing is again performed. At step 2914, the SAR process may be restarted as executing from the primary site now that returning home processing is complete.

Referring back to FIG. 34, each of the processing steps 2902 through 2912 of the flowchart 2910 are illustrated in FIG. 34 by having corresponding element numbers. It should be noted that the processing steps described in connection with the R1–R2 swap starts off of the R2s at the target or restart site. It should be noted that if an embodiment restarts from the target site BCV as described elsewhere herein in connection with other single hop configurations, data may be propagated to the BCV device and the system so configured to performed the processing described herein using that particular device.

Figure 36A:
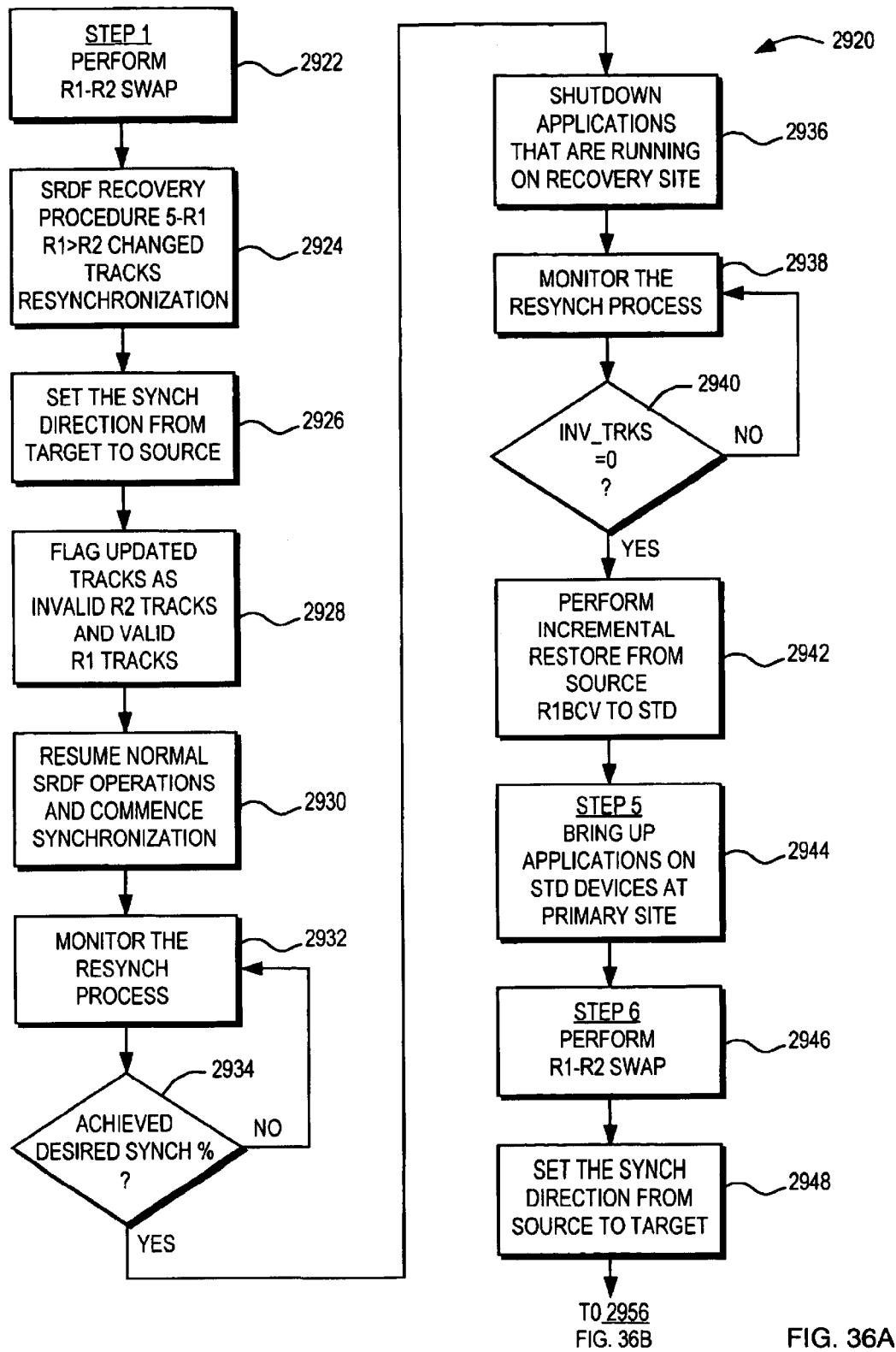
Figure 36B:
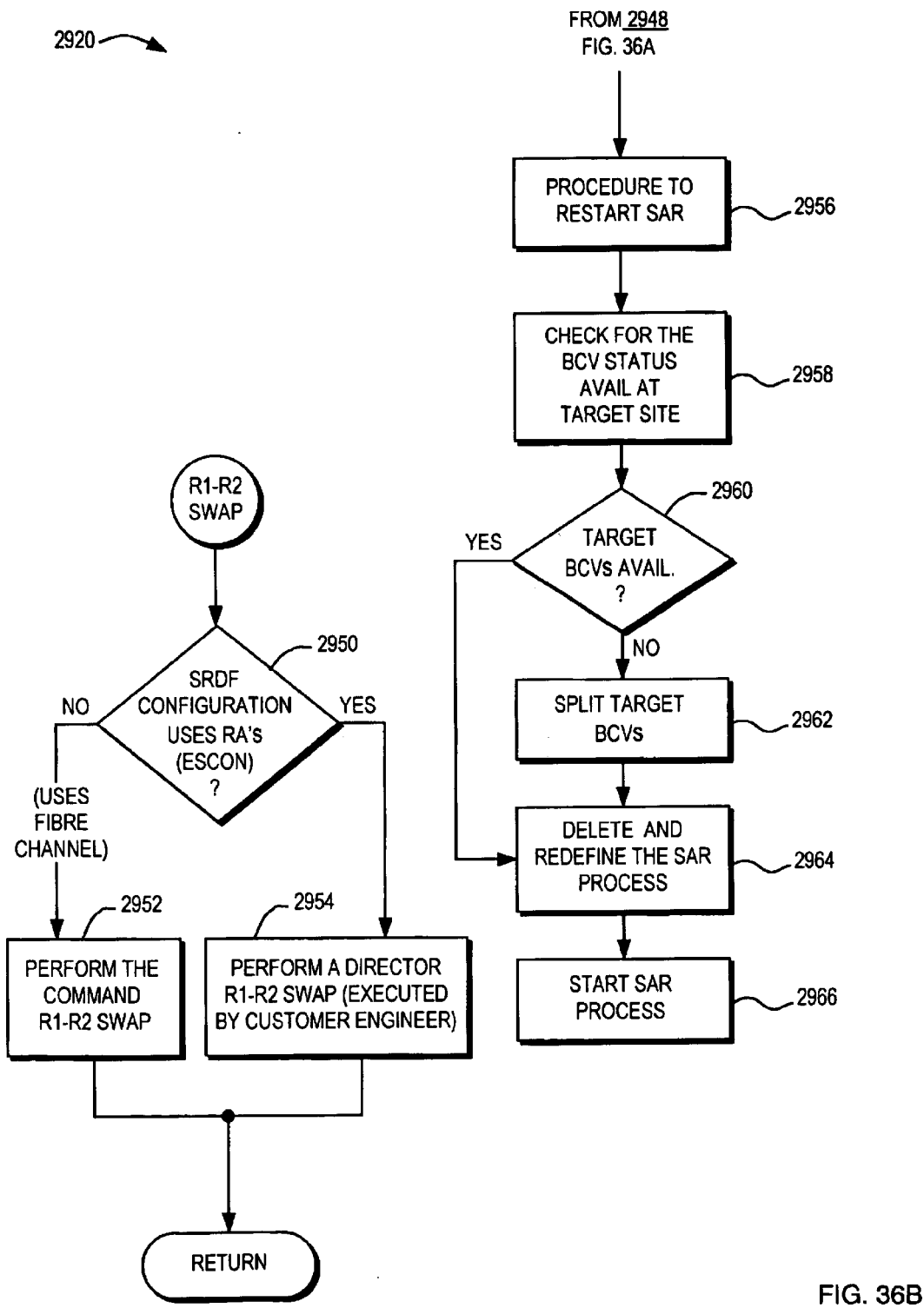

Referring now to FIG. 36, shown are more detailed processing steps in the flowchart 2920 that may be included in an embodiment for performing the processing described in flowchart 2910. At step 2922, the R1–R2 swap procedure or routine may be performed. Control proceeds to a routine defined at step 2950 where a determination is made as to whether the RDF configuration uses remote adapters or RAs. If ESCON RAs are not used, control proceeds to step 2952 where the R1–R2 swap maybe performed using a command. Processing at step 2952 may be performed, for example, if an embodiment uses a fibre channel. Otherwise, if the RDF configuration uses RAs, control proceeds to step 2954 where a director R1–R2 swap may be performed for example by contacting a customer engineer to modify the configuration file.

At this point control returns to step 2924 where additional processing steps may be performed in connection with synchronizing the device at the source or primary site. At step 2926, the synchronization direction is set to propagate data from the target system to the source system. At step 2928, updated tracks are flagged as invalid in accordance with differences between the R2 device at the target or restart site and corresponding tracks in the R1BCV at the primary site. At step 2930, normal RDF operations are resumed and synchronization between the target site and primary site device is commenced. Control proceeds to step 2932 where the resynchronization process is monitored. Control proceeds to step 2934 where a determination is made as to whether a desired synchronization level has been reached. If not, control proceeds to step 2932 where the process of monitoring continues until a desired synchronization level has been achieved. It should be noted that the synchronization between the devices goes on while the applications are running at the restart site.

Once the desired level of synchronization between the R2 of the restart or target site and the R1BCV at the primary site has been achieved, control proceeds to step 2936 where applications are shut down on the recovery site. Step 2938, resynchronization process between the target site and the primary site is performed to move over any remaining tracks that have been changed. Once the number of invalid tracks at step 2940 has been determined as zero indicating that the data copied at R1BCV is equivalent to that stored within the R2 device at the target site, control proceeds to step 2942 where an incremental restoration operation is performed from the source R1BCV to the source STD device. Control proceeds to step 2944 where applications executing on STD devices at the primary site are brought up for execution. Control proceeds to step 2946 where once again the R1–R2 swap is performed. Control proceeds to step 2948 where the synchronization direction is reset from the source to the target.

At step 2956, the procedure to restart SAR begins. At step 2958, a check is made of the BCV devices' status availability at the target site. Step 2960, if all of the target BCVs are available, control proceeds directly to step 2964. Otherwise, control proceeds to step 2962 where the target BCVs are split. Control proceeds to step 2964 where the current SAR process is deleted and redefined. At step 2966, the SAR process started originating with the primary site to propagate data once again to the target or restart site.

The foregoing description provides techniques that may be used in connection with automated data replication. Just described were techniques used in performing system restart and returning to the primary site or going home. Prior to a disaster occurring, SAR processing techniques may be used in connection with performing automated data replication that, as described herein, utilize RDF in the single-hop configuration to provide for asynchronous remote copy solutions for creating point-in-time copies of data, and propagation of these copies to long distance remote locations over dedicated network links. This, in connection with data consistency using the consistent SPLIT command, ensures that a restartable image of data is automatically replicated to the disaster recovery site or target site.

Figure 37:
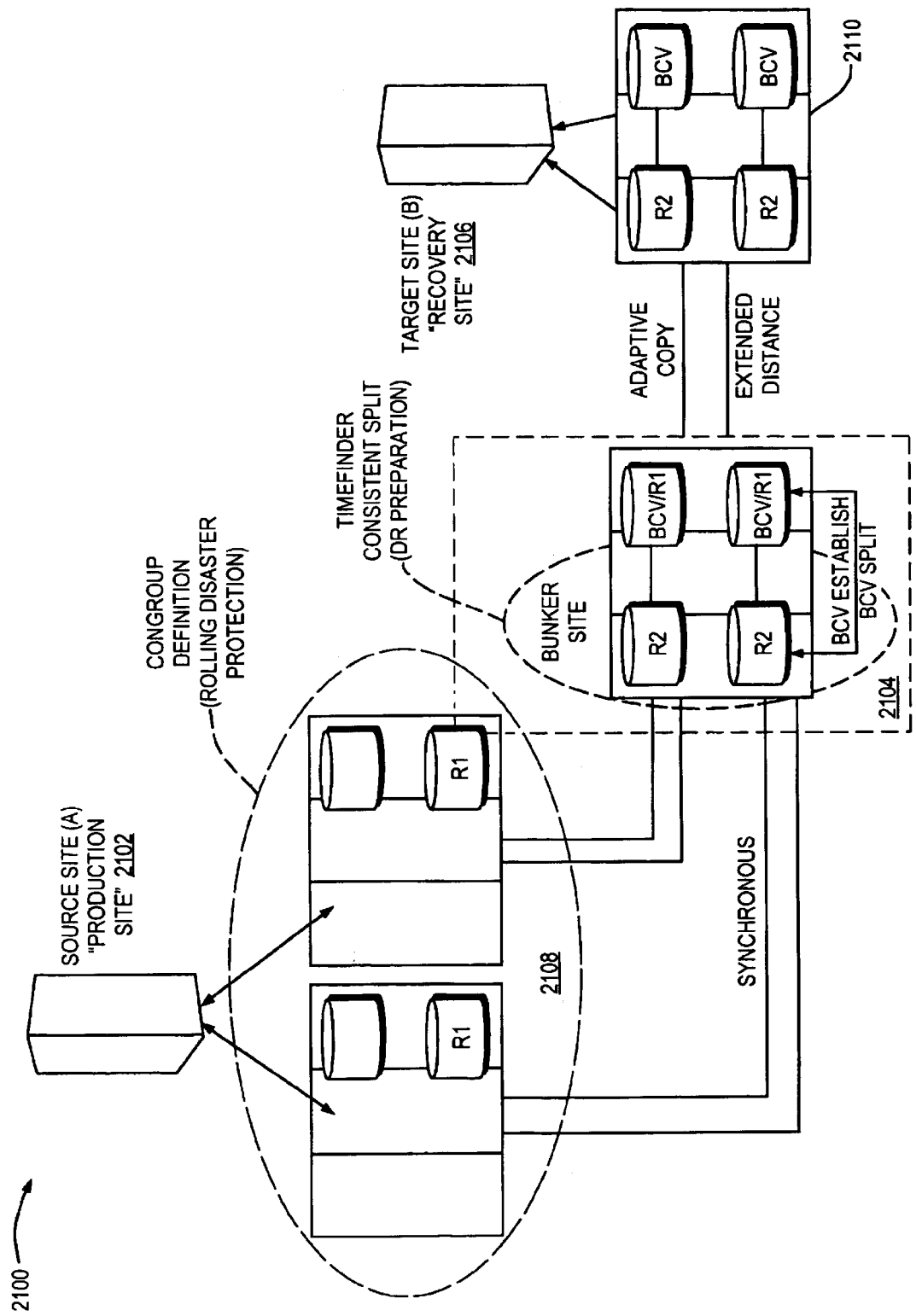
FIG. 37 is an example of a multi-hop configuration.

Referring now to FIG. 37, shown is an example of a multi-hop embodiment 2100 that may be used in connection with performing SAR processing as described herein. In one embodiment as will be described herein, the use of SAR processing in a multi-hop environment may use RDF synchronous mode configurations with an asynchronous remote copy solution to provide for data protection in connection with long distance remote sites without the impact of the distance, such as a propagation delay to the application response time.

Shown in the embodiment 2100 in the multi-hop configuration are three Symmetrix data storage systems. The SAR processing as described in connection with the single-hop may also be automated in connection with the multi-hop embodiment using these three data storage systems 2102, 2104 and 2106. At the source or production site 2102, a consistency group may be defined as 2108 as described elsewhere herein. The consistency group may provide for rolling disaster protection. A trigger event for this consistency group definition may signal, for example, a rolling disaster at the production site. Symmetrix data storage systems at the primary site may be connected to a bunker site 2104. Data may further be propagated from the bunker site to the target site 2106 for storage of the device as 2110.

As shown in the example 2100, the primary site or production site devices included in 2108 may be connected to the bunker site using synchronous remote mirroring. In this example, the R2 devices at the bunker site 2104 contain an exact copy or image of the primary site data as stored in the device as 2108. To propagate data from the bunker site 2104 to the target site, SAR multi-hop configuration may use the remote consistent split command as may be included and used in connection with the TimeFinder product to create consistent point in time copies of the production data that reside in the R2 devices at the bunker site. These copies of data may be propagated on the R1BCV devices of the bunker site to the R2 devices in the target site. When this remote copy is concluded, the data on the target R2s is synchronized with the target BCVs via incremental synchronization to preserve a point of consistency during the next cycle.

It should be noted that this resynchronization and operations between and at the target site do not affect the synchronous copy from the source or production site to the bunker site. The TimeFinder remote consistent split commands and the SAR automation processing may be controlled from the source site. This may be performed by host computer 2102 that may be connected to the devices such as 2108.

Figure 38:
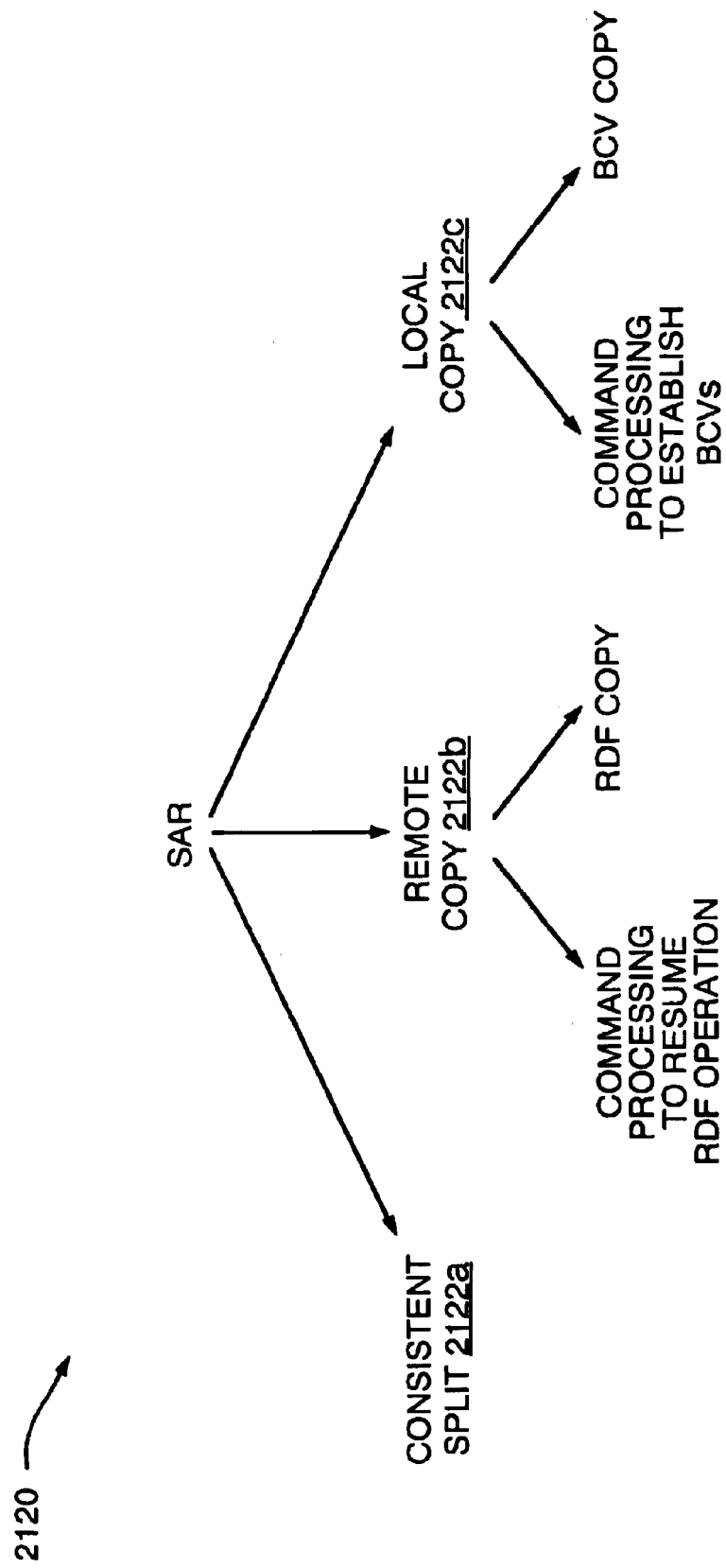
FIG. 38 is an example of a representation of the techniques used in SAR processing.

Referring now to FIG. 38, shown is an example of a representation of the different processes that may be included in the SAR processing cycle that may be performed in the multi-hop and single-hop environment. Generally, the SAR cycle may be partitioned into three basic components involving a consistent split 2122*a*, a remote copy 2122*b* and a local copy 2122*c*. Further, as described in more detail elsewhere herein, the remote copy may be divided into two further components including command processing to resume the RDF operations that facilitate communication between data storage systems, and secondly an RDF copy command. A local copy, for example, within a data storage system, may be further partitioned into two components such as command processing to establish BCVs using the established command, as well as performing a BCV copy. The commands used to establish the BCVs to the STDs and additionally copy changed tracks from STDs to BCVs are examples of the local copy branch. In connection with the remote copy branch, the command processing to resume the RDF operation may occur in connection with the R1BCV-R2 pairs in copying of changed tracks from R1 to R2 as may be associated with the RDF copy command.

It should be noted that the Establish command and the RDF Resume operation may be executed in parallel.

In connection with an unplanned outage or disaster occurring in the primary site, the target site may contain a consistent and restartable copy of data in the BCV devices and the bunker site contains the last image of the production data from the production or source site.

Referring back to FIG. 37, the use of consistency groups as described and illustrated ensures the integrity of data between the source system and the middle or "bunker" storage system. Upon the occurrence of an unplanned or rolling disaster, the consistency group failure is detected. A dependent write consistent copy or a restartable image of the data at the point of the beginning of the rolling disaster is captured on the R2s in the bunker system 2104. Subsequently, one more SAR cycle propagates the point of disaster image from the bunker site to the target system 2110. It should be noted that this additional SAR cycle may be controlled from a target site such as 2106 in the event that the source site or production site 2102 and associated data storage system 2108 have a disaster occur.

Figure 39:
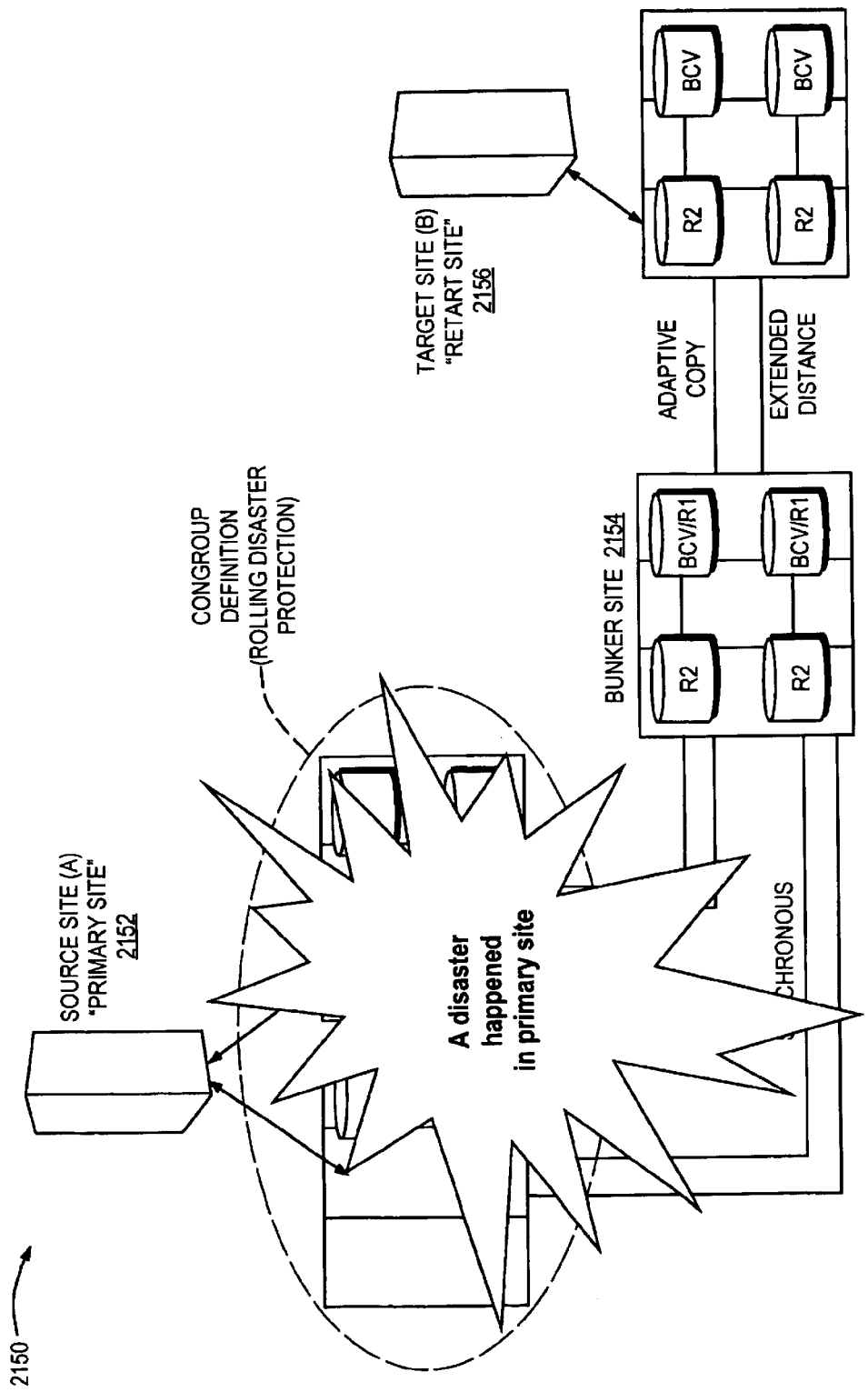
FIG. 39 is an example of a multi-hop configuration of FIG. 37 in which a primary site disaster occurs.

Referring now to FIG. 39, shown is an illustration 2150 of a disaster occurrence at a primary or source site 2152. In the case of a disaster happening at the primary site as illustrated in 2150, the target site contains a consistent and restartable copy of the data and the BCV devices and the bunker site contains the last image of the production site data.

Figure 40:
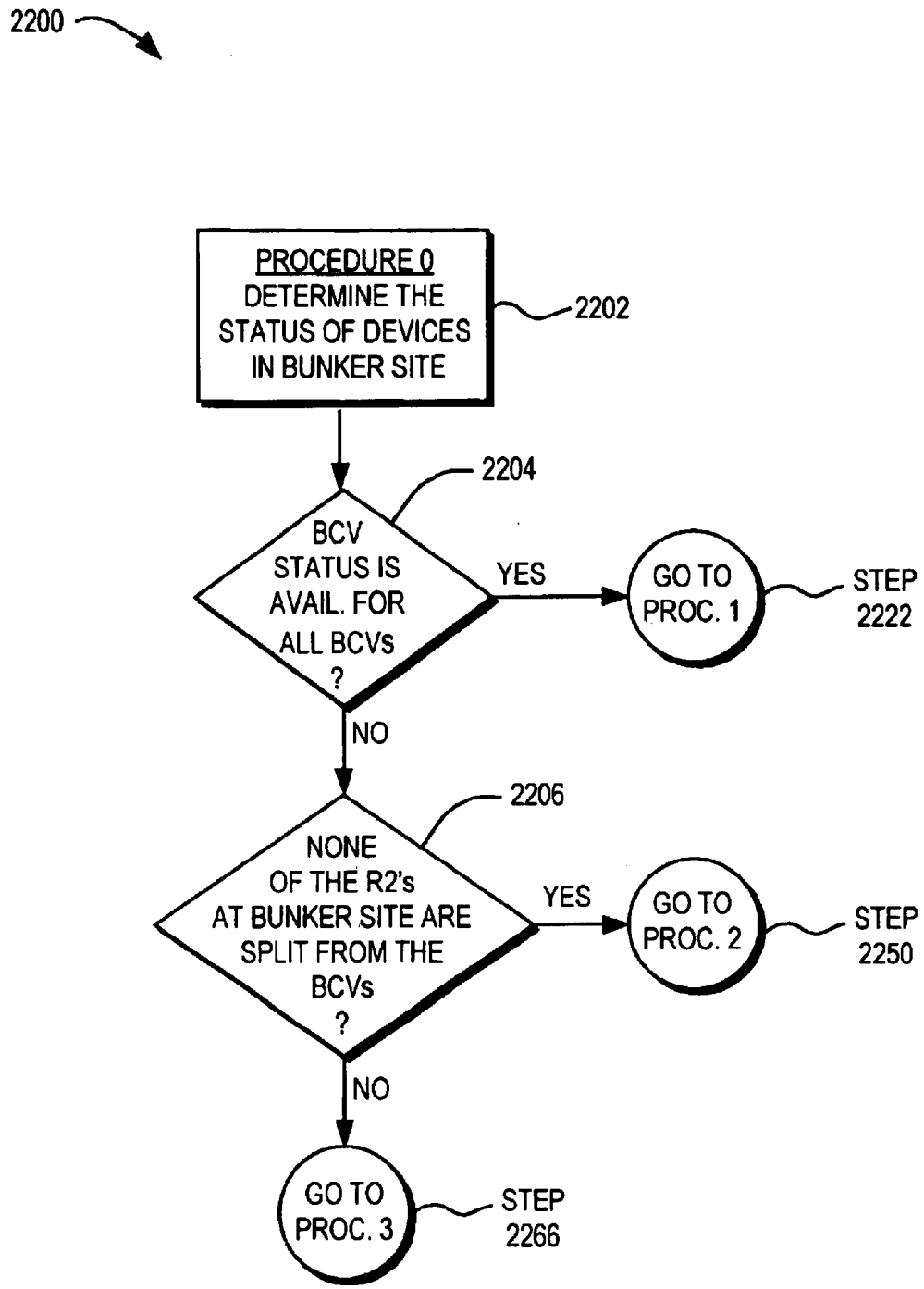
FIGS. 40–41 are flowcharts of steps of an embodiment for determining the status of the multi-hop configuration in the event of a primary site disaster.

Referring now to FIG. 40, shown is a flowchart 2200 of steps that may be executed in an embodiment for determining the most current consistent copy of data and restarting applications in the event of a disaster happening at the primary site as illustrated in connection with FIG. 39 in a multi-hop environment. At step 2202, the status of devices in the bunker site are determined. The status may be one of available or split as described also in connection with processing of the single-hop environment. At step 2204, a determination is made as to whether the BCV status is available for all of the BCVs. If so, control proceeds to procedure 1 as defined in connection with step 2222 processing. Otherwise, if all of the BCV statuses are not available, control proceeds to step 2206 where a determination is made as to whether none of the R2s at the bunker site are split from the BCVs. If so, control proceeds to procedure 2 at step 2250. Otherwise, control proceeds to step 2266.

Figure 41A:
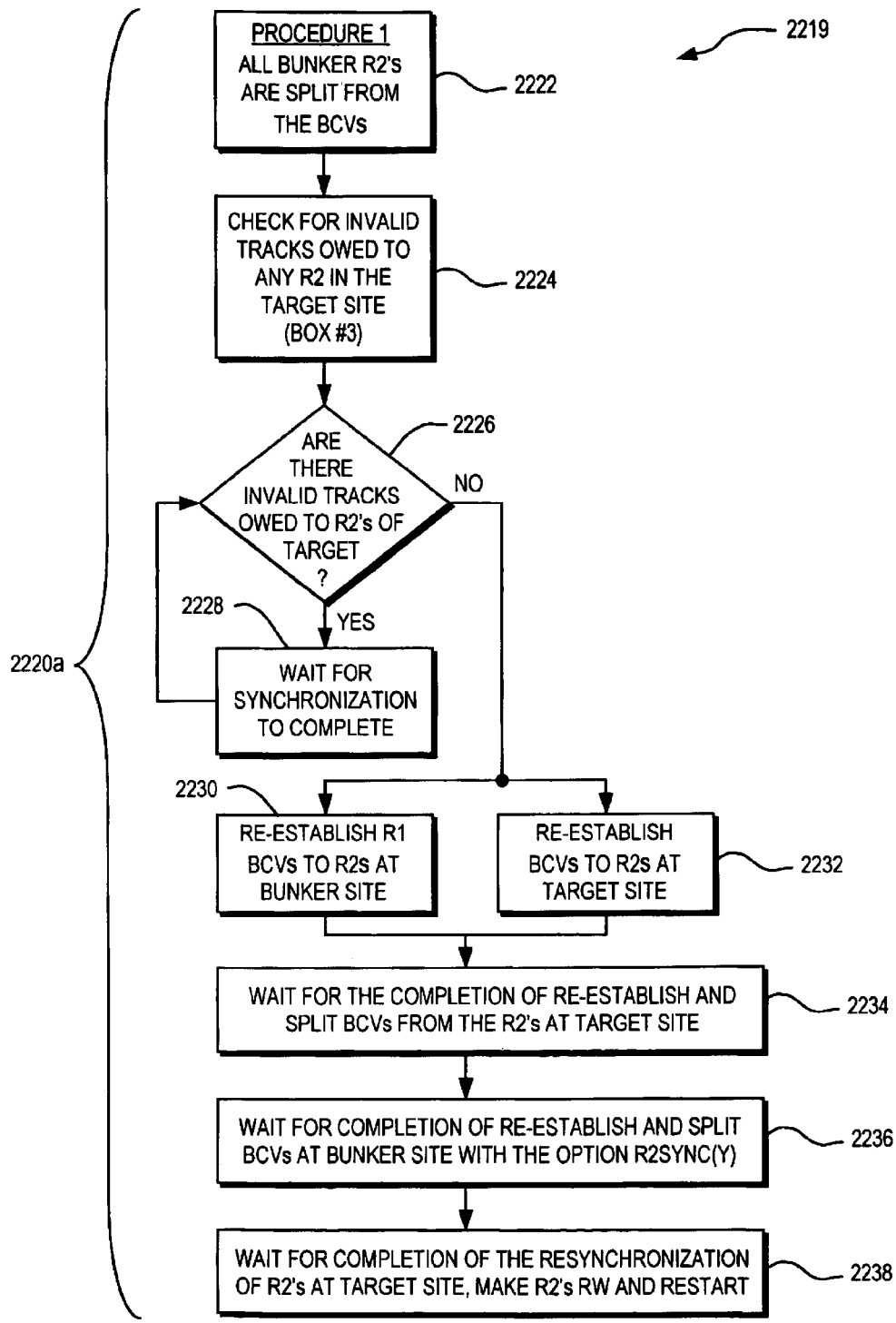
Figure 41B:
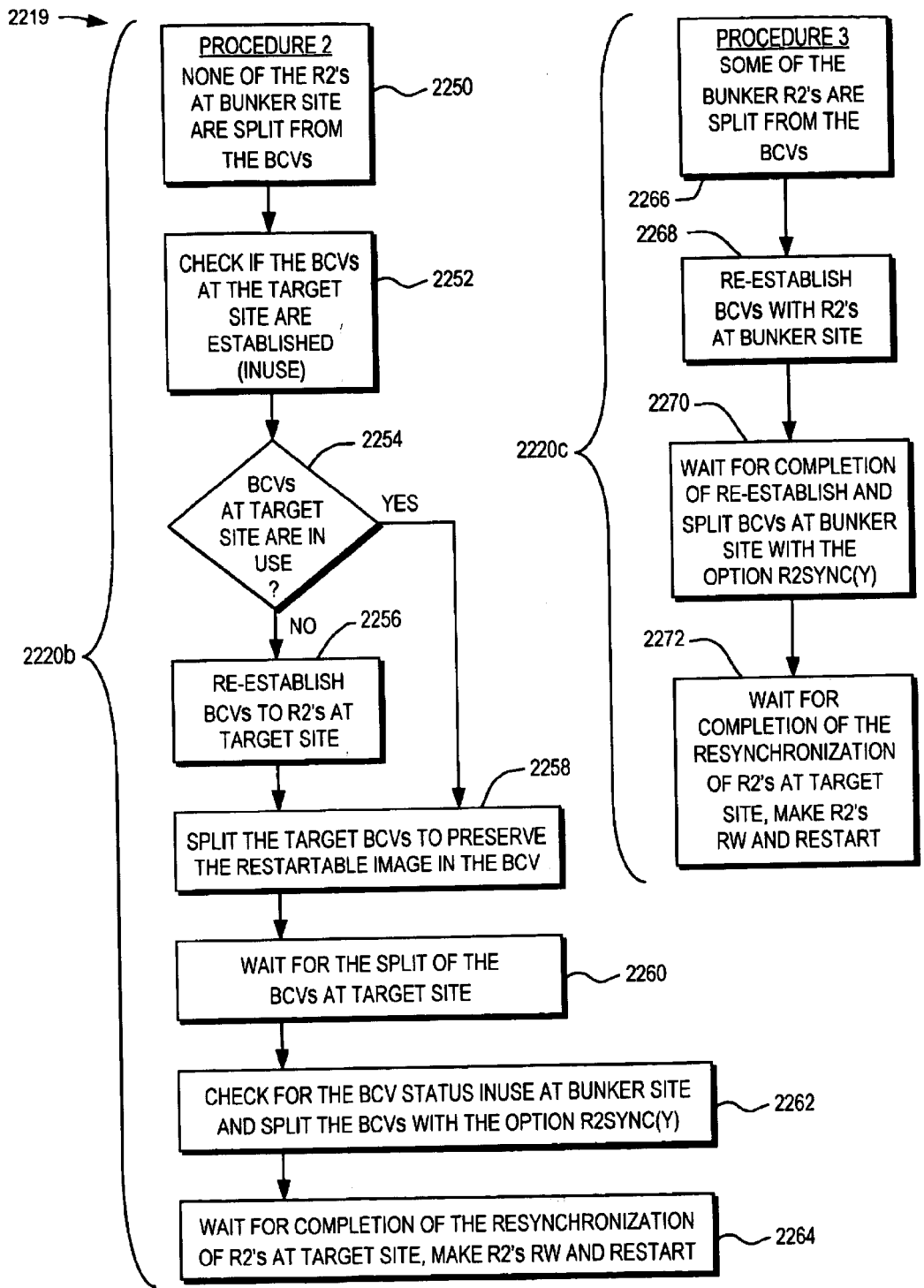

Referring now to FIG. 41, shown are more detailed processing steps in the flowchart 2219 in connection with the previously described procedure 1 through procedure 3. Procedure 1 has more detailed processing steps as outlined in flowchart 2220a. Procedure 2 has more detailed processing steps as outlined in the flowchart 2220b. Procedure 3 has more detailed processing steps as outlined in the flowchart indicated by 2220c.

Referring now to the processing steps 2220a in connection with procedure 1, a determination has been made that all bunker site R2s are split from the BCVs indicating that the SAR process was copying data from the bunker to the target site. Control proceeds to step 2224 where there is a check for any invalid tracks owed to any R2 in the target site. At step 2226, a determination is made as to whether there are invalid tracks owed to R2s of the target system. If so, control proceeds to step 2228 where there is a wait for the synchronization to complete. The process remains in the loop formed by steps 2226 and 2228 until there is a determination that there are no invalid tracks owed to R2s of the target system. Upon proceeding to step 2228, the remaining tracks are copied to the R2s in the target system from the bunker site, control proceeds to steps 2230 and 2232 which may be performed in parallel in this example to reestablish R1BCVs to R2s at the bunker site, as well as reestablish the BCVs to the R2s at the target site.

Subsequently, control proceeds to step 2234 where the target system devices are resynchronized and then split. In particular at step 2234, there is a wait for the completion of the reestablish and split of the BCVs from the R2s at the target site. Control proceeds to step 2236 where there is a wait for the completion of the reestablish and subsequently, the BCVs at the bunker site are split with the option of R2SYNC(Y). The R2SYNC(Y) option causes the data from the R1BCV at the bunker site to be propagated to the R2 device at the target site. Control proceeds to step 2238 where there is a wait for the completion of the resynchronization of R2s at the target site. Subsequently, the R2s are made read and write enabled. The R2 device is available for restarting.

In connection with executing more detailed processing steps as outlined in the embodiment of flowchart 2220b for procedure 2, control proceeds to step 2250 if none of the R2s at the bunker site are split from the BCVs. Control then proceeds to step 2252 where there is a check to see if the BCVs at the target site are established or in use. At step 2254, a determination is made as to whether the BCVs at the target site are in use. If not, control proceeds to step 2256 where the BCVs are reestablished to the R2s at the target site and then control proceeds to step 2258 where the target BCVs are split to preserve the restartable image in the BCV. If at step 2254 it is determined that the BCVs at the target site are in use, control proceeds directly to step 2258 bypassing the processing of step 2256.

Subsequently, from step 2258 control proceeds to step 2260 where there is a wait for the split of the BCVs at the target site. At step 2262, there is a check for the BCV status in use at the bunker site and the BCVs are split with the option R2SYNCH(Y) providing for synchronization of the R2 on the target site as described elsewhere herein. Control proceeds to step 2264 where there is a wait for the completion of the resynchronization of R2s at the target site. The R2s are then made read/write and the R2 is available for restarting.

In connection with performing procedure 3, an embodiment may execute the more detailed processing steps as outlined in connection with 2220c. At step 2266, procedure 3 may be executed if it has been determined that some of the bunker site R2s are split from the BCVs. Control proceeds to step 2268 where there is a reestablish of the BCVs with the R2s at the bunker site. Control then proceeds to step 2270 where there is a wait for the completion of the reestablish and the split of the BCVs at the bunker site with the option of R2SYNC. At step 2272, there is a wait for completion of the resynchronization of the R2s at the target site. Subsequently, the R2s are enabled for read and write operations and I/O operations and the R2 device is available for restarting.

A SAR processing session may be interrupted because of a situation that prevents the flow of data to the target site. This may be any one of a variety of different situations such as, for example, a software failure, a network failure, a hardware failure and the like. This is to be distinguished from the other more serious event occurrence discussed herein of a primary site disaster. In connection with the interruption, the primary site SAR process is able to be started or recovered. In the event of an interrupt, the SAR process interrupts the SAR cycle and may, for example, stop sending messages to the console that may be displayed to a user. Once problem diagnostics and corrections are performed, restart procedures may be executed.

Figure 42:
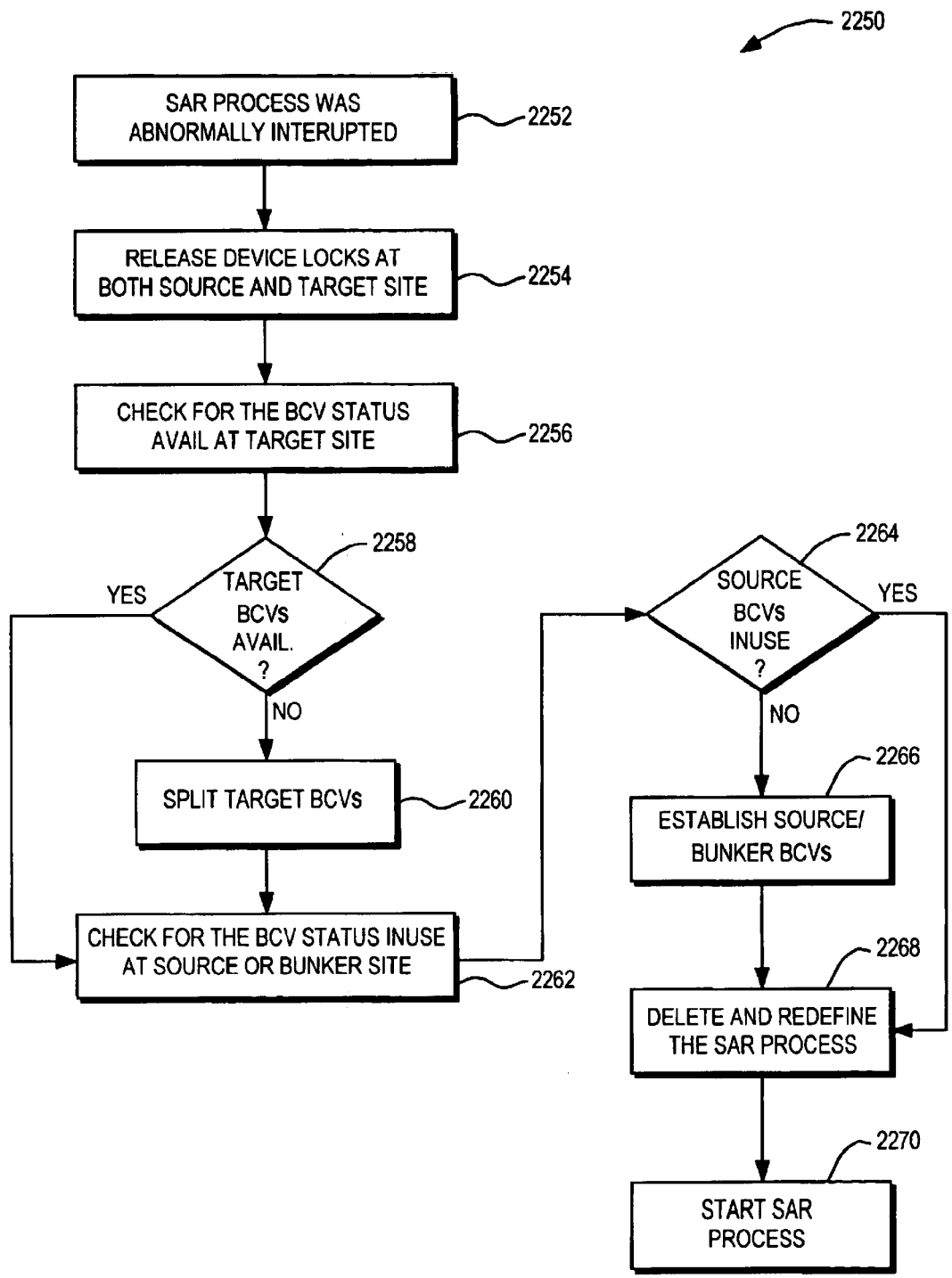
FIG. 42 is an example of a flowchart of steps of an embodiment for performing SAR interrupt processing.

Referring now to FIG. 42, in connection with a multi-hop embodiment, detailed processing steps included in a flowchart 2250 will be described for performing a restart in a multi-hop embodiment in the event of an interruption. At step 2252, a determination is made that the SAR process was abnormally terminated. At step 2254, device locks at both the source and target site may be released. This may be performed by executing commands from the remote system. Similarly, as described in following steps, other commands may also be executed from the remote system to perform processing steps described herein.

Control proceeds to step 2256 where there is a check for the BCV status of available at the target site. A determination is made at step 2258 as to whether all of the target BCVs are available. If so, control proceeds to step 2262. Otherwise, control proceeds to step 2260 where the target BCVs are split and then control proceeds to step 2262. At step 2262, a check for the BCV status in use at the source or bunker site is determined. Control proceeds to step 2264 where a determination is made as to whether the source BCVs are in use. If so, control proceeds to step 2268. Otherwise, control proceeds to step 2266 where the source and bunker BCVs are established. Control then proceeds to step 2268 where there is a delete and a redefine of the SAR process. At step 2270 the SAR process may be started.

It should be noted that similar processing steps may be performed in a single-hop embodiment in connection with an interruption.

What will now be described in connection with the following figures is the use of the SAR process in connection with the multi-hop configuration. It should be noted that much of the processing as described herein is similar and uses techniques that are described elsewhere in connection with a single hop configuration.

Figure 43:
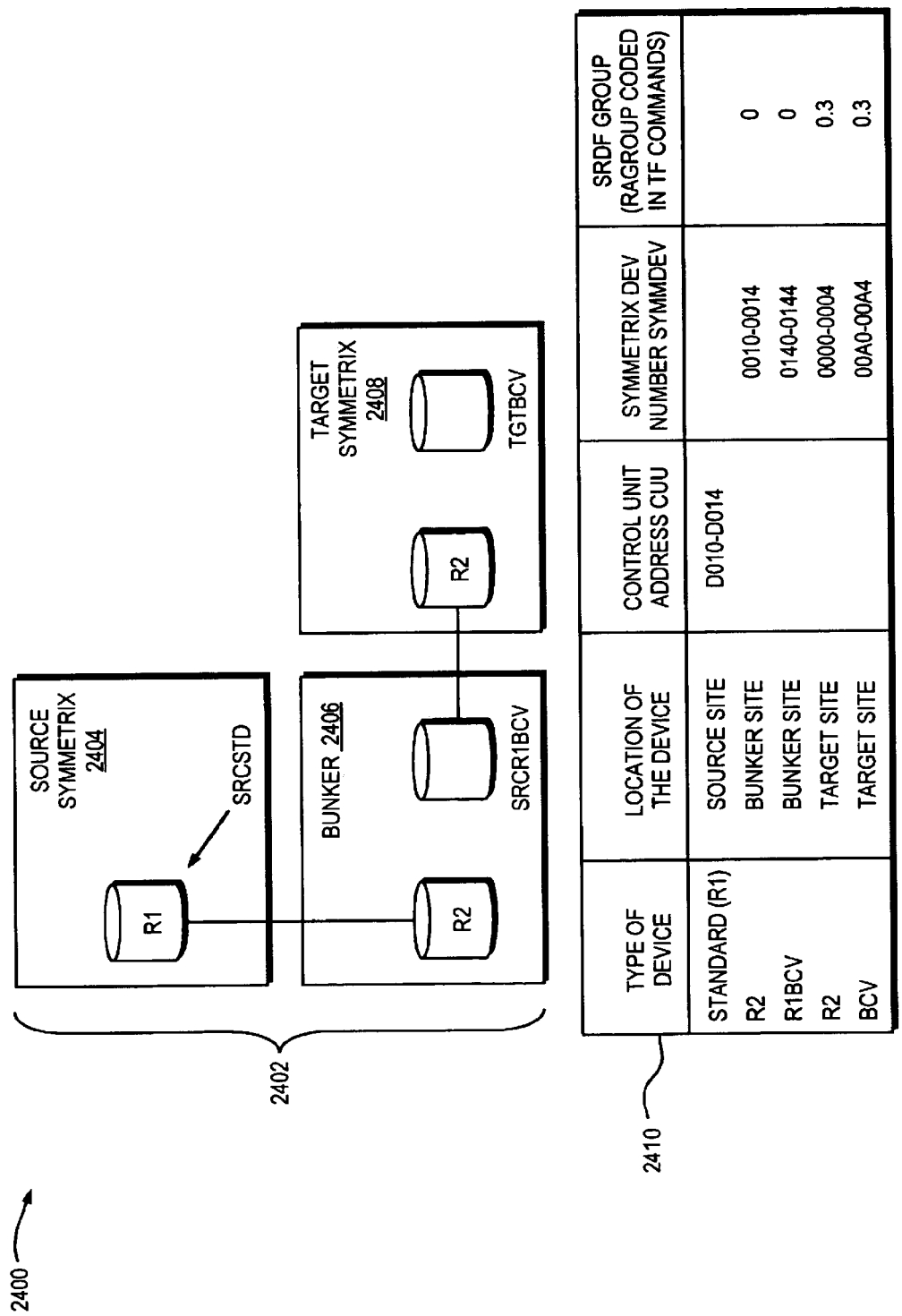
FIG. 43 is an example of a multi-hop configuration and chart used in SAR processing.

Referring now to FIG. 43, shown is a multi-hop configuration of a system 2402 that may be used with SAR processing. Also included in the example 2400 is a table 2410 containing some definitions that may be used in connection with the configuration defined in 2402. The configuration 2402 includes a source of primary site 2404 or bunker site 2406, and a target system 2408. In this particular example, when building device lists for multi-hop configuration, those devices included in the target system 2408 may be considered remote devices with respect to the source system 2404. The is in contrast to the relationship between 2404 and 2406 which are in close geographic proximity.

In a multi-hop configuration, all TimeFinder commands executed by a source or host system connected to the source devices in 2404 may be considered remote commands. To access target BCVs from the source location, in this example, two RDF groups are used. In sample commands explained in following figures and paragraphs, SAR automatically identifies the RA groups used in both the source and the bunker Symmetrix data storage systems. When initializing, the RA groups are specified in this particular embodiment.

It should be noted that the table 2410 includes some example names of groups and device numbers that may be used in connection with following examples of commands used in connection with the multi-hop configuration.

Figure 44A:
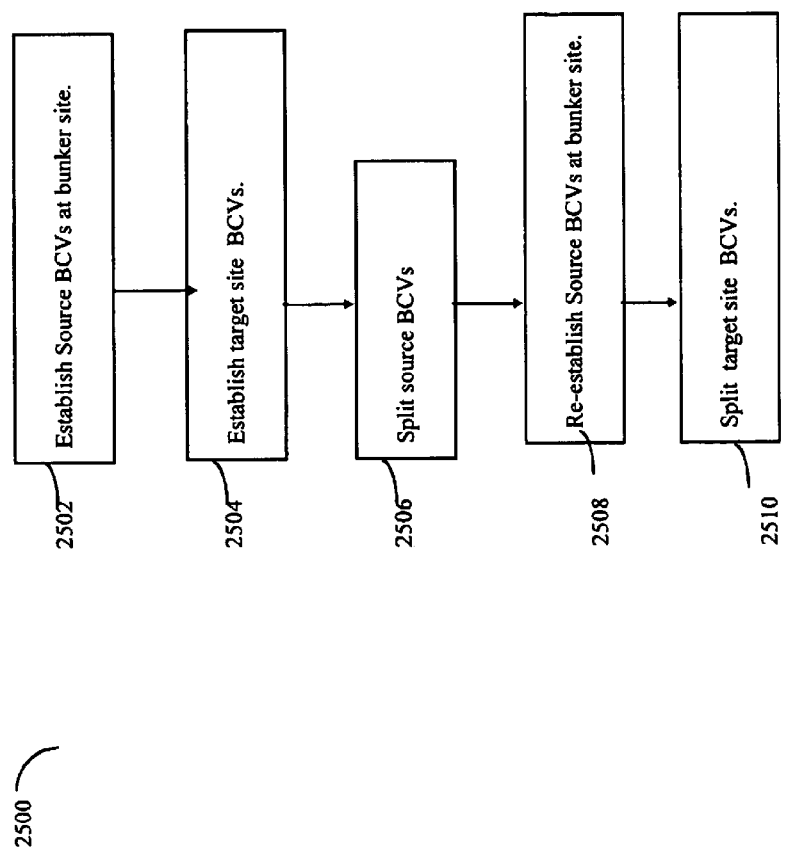
FIGS. 44A is a flowchart of processing steps in a multi-hop embodiment for initializing the system of FIG. 43 with data for SAR processing.

Referring now to FIG. 44A, shown are processing steps in a flowchart 2500 that may be used in connection with initializing the system with data in connection with the SAR process in a multi-hop configuration. It should be noted that these steps are similar to those described in connection with the single-hop embodiment except that the SAR process operates with respect to the bunker and target sites. At step 2502, the source BCVs are established at the bunker site. At step 2504, target site BCVs may be established. At step 2506, source BCVs may be split and are synchronized with the R2s in the target site. At step 2508, source BCVs may be re-established at the bunker site. At step 2510, target site BCVs may be split.

Subsequent to performing the processing steps of flowchart 2500, the SAR processing steps, as described elsewhere herein in connection with the single-hop embodiment, may be performed to propagate date from the bunker site to the target site.

Referring now to FIG. 44B, shown are commands that may be executed from a host at the source site such as 2102 of FIG. 35 in connection with priming the pump or initializing the system with data in connection with using the SAR processing techniques. It should be noted that each of the series of commands corresponds to one of the processing steps of flowchart 2500 previously described. The commands 2452 may be used in connection with performing processing of step 2502. The commands of portion 2454 may be used in performing the processing of steps 2504. Similarly, the commands of 2456, 2458 and 2460, respectively, are more detailed processing steps of commands that may be used in implementing steps 2506, 2508 and 2510 previously described in flowchart 2500. These commands are examples that may be used in an embodiment to perform the foregoing steps. Other embodiments may use different commands and techniques that may vary with each embodiment.

Figure 45:
FIG. 45 are examples of commands that may be executed to define and start SAR processing in FIG. 43 configuration.

Referring now to FIG. 45, shown are commands 2600 that may be executed from the host system at the source or production site to define the SAR process. It should be noted that the automation process of the SAR single-hop and multi-hop configurations are similar. However, the devices defined in connection with, for example, the device list command vary in connection with the multi-hop versus a single hop configuration since data is being propagated from the bunker site to the target site in the multi-hop embodiment. As described elsewhere herein in connection with a single hop configuration, the SAR process may be controlled using actions such as the START, STOP, RESTART, CLEAR, and DELETE commands described elsewhere herein. These commands may be executed from a host computer at the source of production site. The SAR processing steps which provides for data replication are such that the production site and the bunker site are connected in synchronous mode and the data replication from the second to the third are the bunker site to the target or recovery site may be performed using RDF adaptive copy mode. Information is propagated from the bunker site to the target site using the remote consistent split command to split the R2 and the R1BCV devices at the bunker site. This creates consistent point in time copies of the production data residing in the R2 devices of the bunker site and propagates these copies on the R1BCV devices of the bunker site to the R2 devices in the target site.

What will now be described are various procedures that may be used in returning home in a multi-hop configuration. In particular, an RDF presynchronization option procedure, R1–R2 swap procedure and a returning home procedure for a multi-hop configuration using dynamic RDF are described.

Figure 46A:
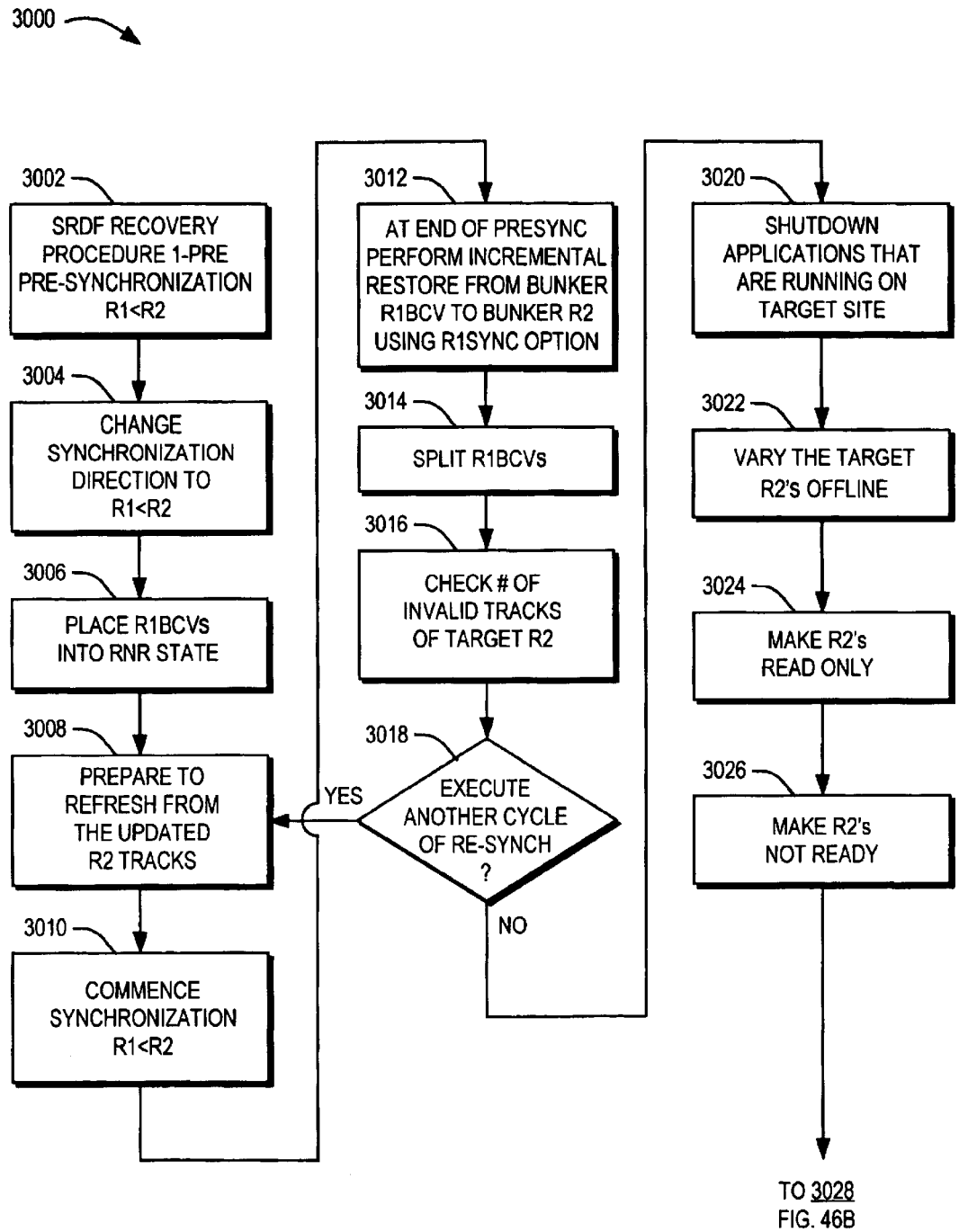
FIG. 46–49 are flowcharts of steps that may be executed in a multi-hop configuration in returning home to the primary site in the event of a disaster at the primary site.
Figure 46B:
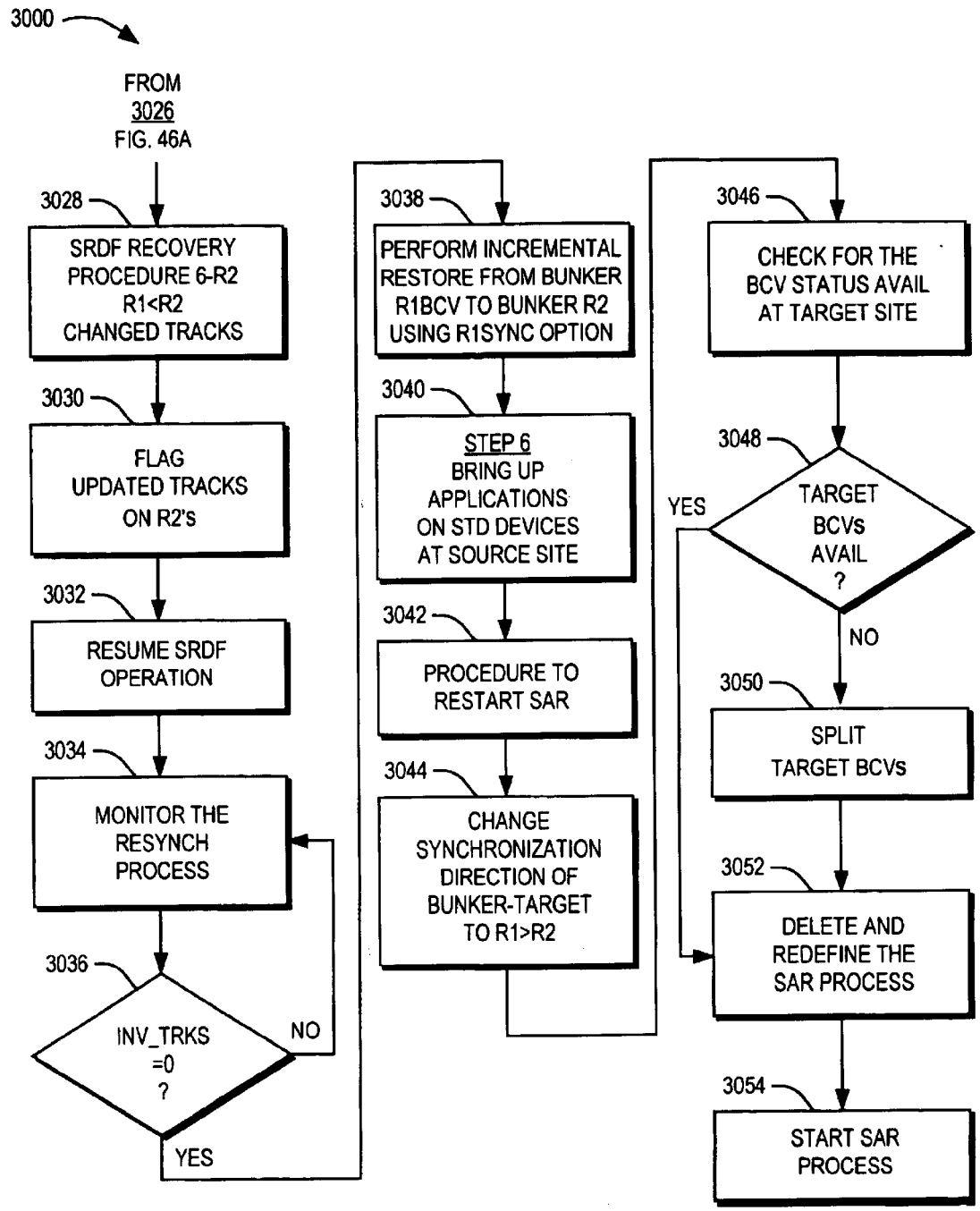

Referring now to FIG. 46, shown is a flowchart 3000 of processing steps that may be used in a multi-hop embodiment when performing an RDF presynchronization option to return home from a target site to a source or primary site. It should be noted that the processing steps that described for this multi-hop environment are similar to those described for use with a single-hop embodiment except, for the multi-hop embodiment, there is an additional step of synchronization of the source R1 device. In particular, as will be described in following paragraphs, the source R1 is synchronized with the bunker site R2 during the restoration of the bunker site BCV-R1 to the R2 device.

At step 3002, the presynchronization process is initialized and begun to propagate data from the target site to the source site where applications are still executing at the target site. At step 3004, the synchronization direction is changed such that data is propagated from the target R2 to the bunker site R1BCV device. In other words, the R1BCV device is synchronized to be the same as the data included in the R2 device at the target site. At step 3006, the R1BCV at the bunker site is placed in an "RDF Not Ready" state making it unavailable to host input or RDF data flow. At step 3008, preparations are made at the R1BCV device to refresh the R1BCV device at the bunker site from the updated R2 tracks. At step 3010, synchronization between the R2 device at the target site and the R1BCV bunker site begins. Control proceeds to step 3012 where, at the end of the presynchronization, an incremental restore is performed from the bunker site R1BCV to the bunker R2 device.

At step 3014, the R1BCV device is split from the R2 device at the bunker site. At step 3016, the number of invalid tracks of the target R2 device is determined. If a threshold amount of data has not be propagated from the R2 device to the R1BCV device, another cycle of resynchronization is performed at step 318 by having control proceed to step

3008. If another resynchronization cycle is not needed, control proceeds to step 3020 where applications that are executing on the target site are shut down. The target R2 devices are placed off line (step 3022), made read only (step 3024) and have flags and status bits set to indicate that the R2s are not ready (step 3026).

At step 3028, changed tracks on the R2 device are flagged. At step 3032, RDF operation is resumed. At step 3034, a monitoring process is started in connection with the resynchronization of the R1BCV device at the bunker site such that it is synchronized with the R2 device at the target site. At step 3036, a determination is made as to whether the number of invalid tracks denoting the differences between the R2 device and the R1BCV device is equal to zero. If not, control proceeds to step 3034 where the process of monitoring the resynchronization of the devices continues while data is copied from the R2 target system to the R1BCV of the bunker system.

When the synchronization is complete, control proceeds to step 3038 where an incremental restoration operation is performed from the bunker site R1BCV device to the bunker site R2 device using the R1 synchronization option. The R1 synchronization option in this example further propagates the data to the source site. At step 3040, applications are brought up for execution on the STD devices at the source site.

At step 3042, procedure for restarting SARs begins. At step 3044, the synchronization direction is changed to propagate data from the bunker site to the target site. Control proceeds to step 3046 where a check is made of all of the BCV status available flags at the target site. A determination is made at step 3048 as to whether all of the target BCVs are available. If so, control proceeds to step 3052. Otherwise, control proceeds to step 3050 where the target BCVs are split. Control then proceeds to step 3052 where the SAR process is deleted and then redefined. At step 3054, the SAR process may again be started with origination at the source site.

It should be noted that as described herein in connection with the multi-hop and the single-hop embodiments, the presynchronization process may be performed by executing a configuration command from the RDF host component that may be included in a computer system connected to the target site. In one embodiment, this presynchronization command may be found in an RDF Host Component version 5.0 or above using the PRE-FRESH and PRE-RSUM options that provide a way to begin the synchronization of data of an R1 device from an R2 device that is still read write accessible to a host. Other embodiments may provide other techniques in connection with providing similar functionality to perform the processing steps described herein.

The foregoing processing propagates data from the target site to the source site while applications are still executing at the target site producing more invalid tracks on the R2 target system. While the group of invalid tracks is moving, new invalid tracks are accumulating on the R2 devices. Each time the sequence of commands is executed to propagate data from the target system to the bunker site, the number of invalid tracks is decreased. This cycle may be periodically repeated until the number of invalid tracks reaches a minimum or threshold level for example that may be used in connection with performing the determination at step 3018. It should be noted that the invalid tracks account does not reach zero in this embodiment until the write activity on the R2 device stops.

Figure 47A:
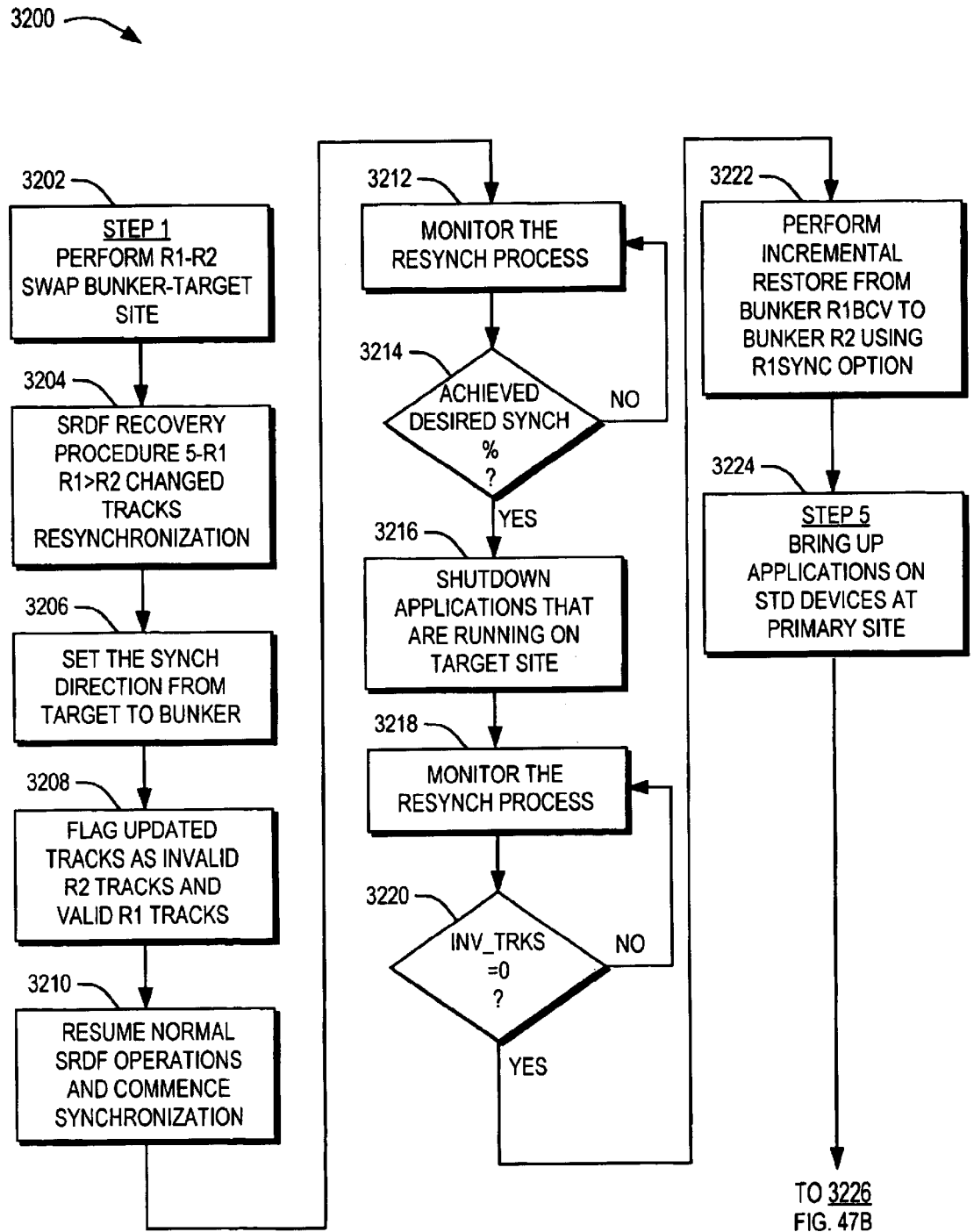
Figure 47B:
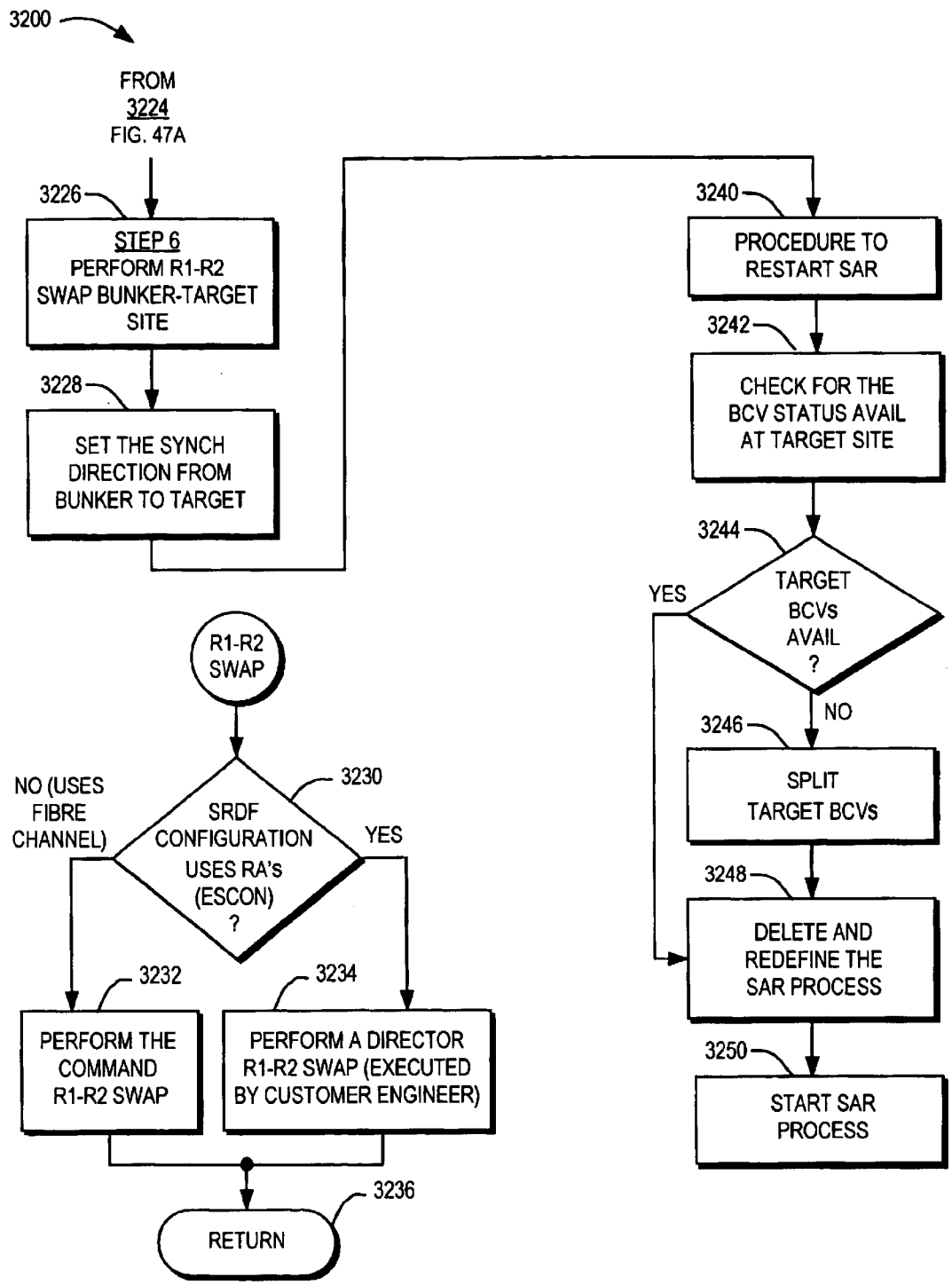

Referring now to FIG. 47, shown is a flowchart 3200 of processing steps that may be used in performing a returning home procedure using the R1–R2 swap option in a multi-hop configuration. It should be noted that these processing steps are similar to those described elsewhere herein in connection with a single-hop configuration with the additional processing to synchronize the source R1 with the bunker site R2 during the restoration of the bunker site R1BCV to the R2 device.

At step 3202, R1–R2 swap processing is performed. These processing steps transfer control and execute processing steps 3230 and optionally either 3232 or 3234. The R1–R2 swap option is similar to that as described in connection with the single-hop configuration. Control proceeds to step 3204, where there is a resynchronization of the RDF pair R2 on the target site and the R1BCV at the bunker site to flag any tracks that were updated on the target R2 volume. At step 3206, the synchronization direction is set from the target site to the bunker site. At step 3208, updated tracks are flagged as invalid with respect to R2 tracks and valid R1 tracks to detect differences between the R2 device at the target site and the R1BCV at the bunker site. At step 3210, normal RDF operations are resumed and synchronization of the bunker site R1BCV with that of the R2 at the target site are commenced.

At step 3212, the monitoring process for the resynchronization is performed to determine, at step 3214 whether an achieved desired level of synchronization has been reached. In other words, data is propagated into the system beginning with the target device without shutting down the applications on the target site and moved in incremental amounts until a desired level of synchronization between the R2 at the target site and the R1BCV on the bunker site has been achieved. Once this desired level of synchronization has been achieved, control proceeds to step 3216 where applications running on the target site are shut down. At step 3218, the resynchronization process is monitored to move over any remaining invalid tracks from the target site R2 to the R1BCV on the bunker site. Once this additional data has been moved to the bunker site, control proceeds to step 3222 where an incremental restoration is performed from the bunker site R1BCV to the bunker site R2 device using the R1 synchronization option. At step 3225, applications on the STD devices at the primary site are brought up. It should be noted that at step 3222 the R1 synchronization option further propagates data from the bunker site R2 to the STD device at the primary or source site. Control proceeds to step 3226 where an R1–R2 swap is performed between the bunker and the target site devices. At step 3228, the synchronization direction is reset from the bunker to the target and control proceeds to step 3240 where the procedure is executed for restarting SAR processing.

At step 3242, a check is made of all of the BCV statuses regarding the availability of the devices at the target site. A determination at step 3233 as to whether all of the target site BCVs are available. If so, control proceeds to step 3248. Otherwise, control proceeds to step 3246 where the target site BCVs are split and control proceeds to step 3248 where the SAR process is deleted and then redefined. At step 3250, the SAR process is then started.

As described herein in connection with performing the R1–R2 swap option, when applications are running off of the R2s, the R2 devices are ready and read write enabled. RDF operations cannot be resumed for data protection reasons when the system is in this state. The swap command on the RDF host component may be used in connection with swapping the RDF relationships between two RDF devices such as R1 and R2 where R1 becomes R2 and the R2 device becomes or operates as the R1 device. After this swap, the RDF operation may be resumed without interrupting the applications.

Figure 48A:
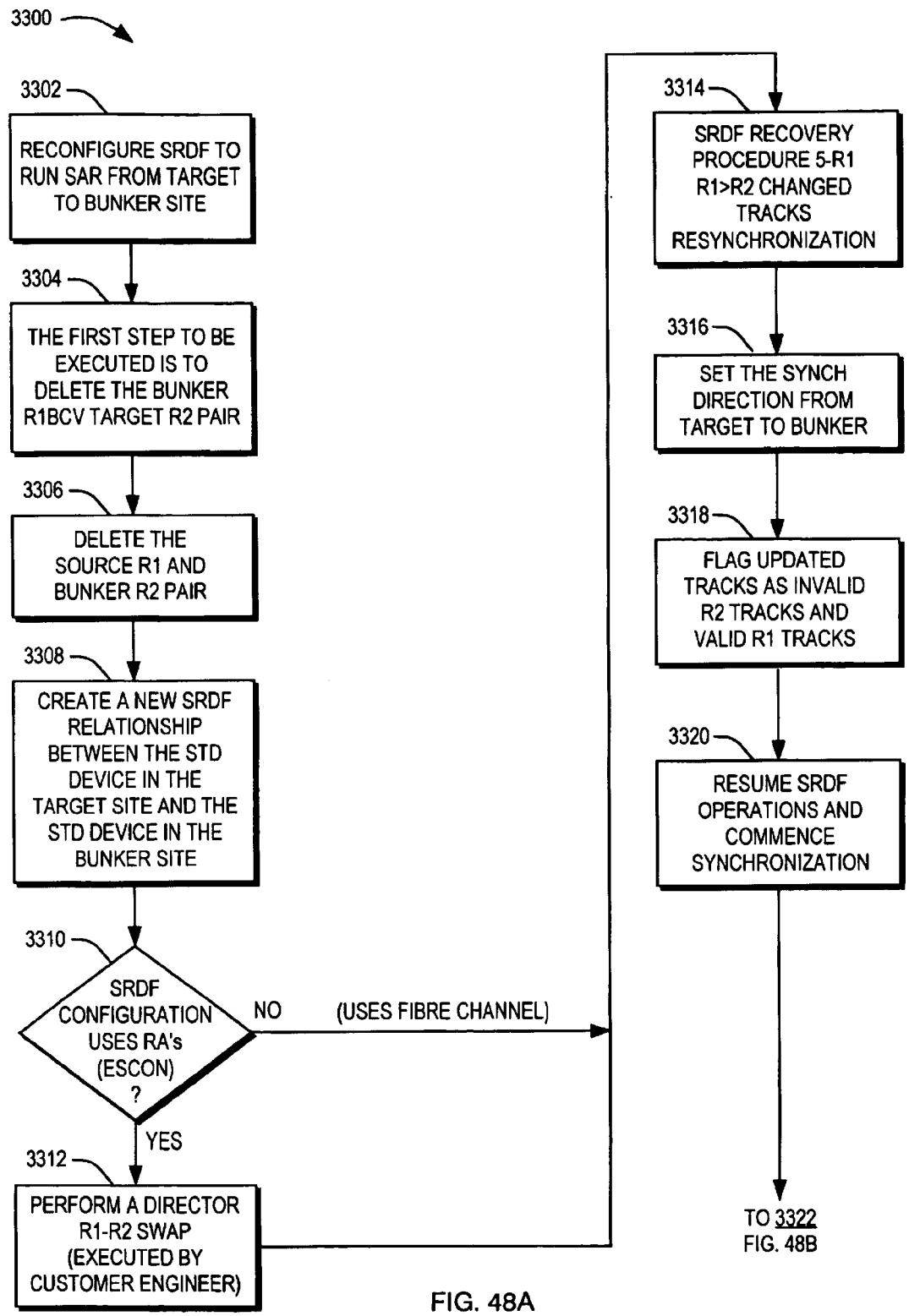
Figure 48B:
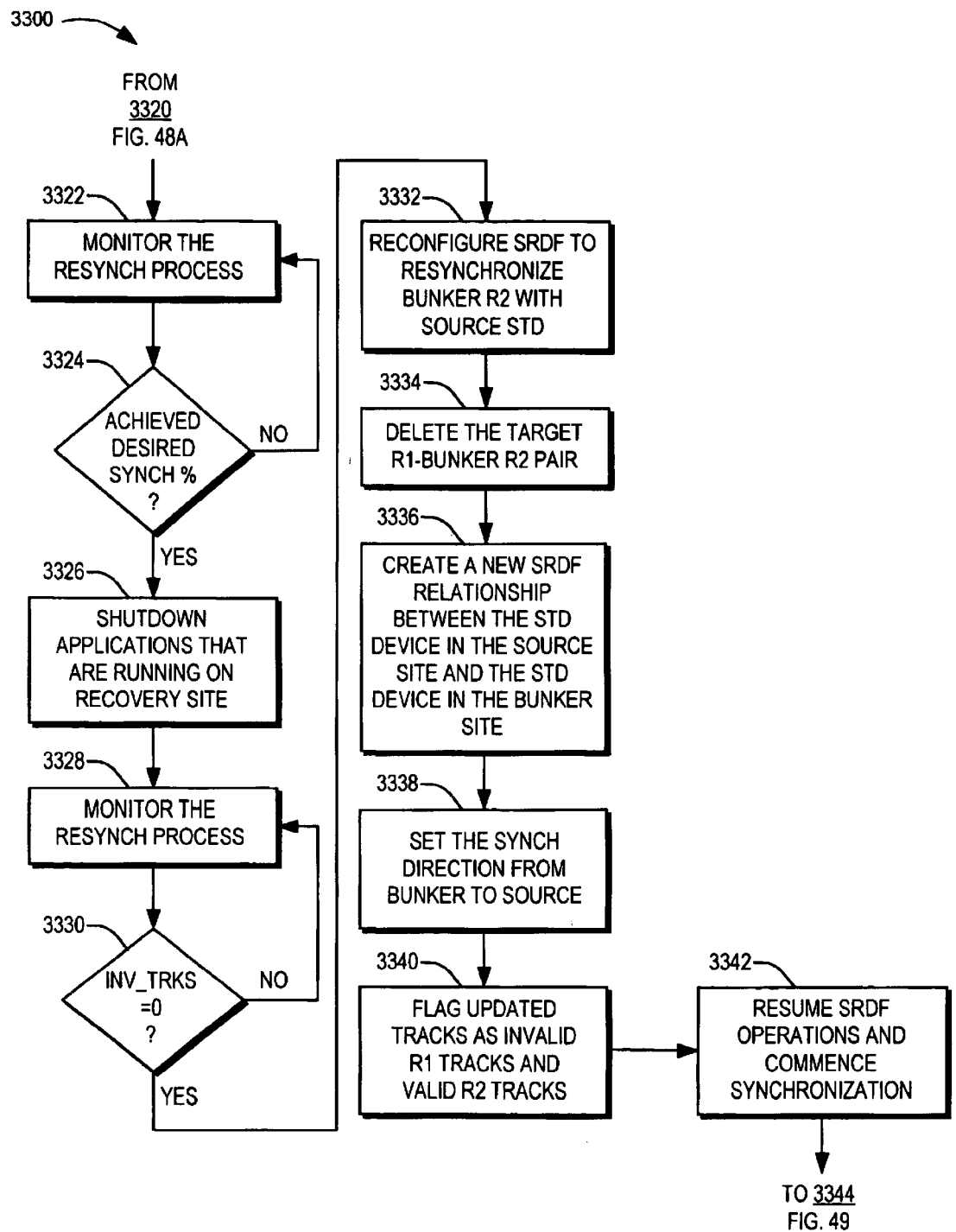

Referring now to FIG. 48, shown is a flowchart 3300 of steps of an embodiment that may be used in connection with using dynamic RDF to perform the returning home procedure in a multi-hop configuration. It should be noted that in the following description and flowcharts, the returning home network configuration is the same as that prior to the disaster.

At step 3302, steps are performed in connection with reconfiguring RDF to run SAR from the target to the bunker site. In other words, in connection with the dynamic RDF processing, the SAR process may be used in connection with propagating data back to or returning home to the source site. This is in contrast to using other options and techniques described herein in connection with a multi-hop configuration that do not rely on the SAR process for propagating data from the target back to the source or primary site.

At step 3304, the bunker site R1BCV and the target site R2 pair are deleted using the DELETE PAIR Dynamic RDF command. After the execution of the delete command at step 3304, the bunker site R1BCV becomes a BCV and the target R2 becomes an STD device. At step 3306, the source R1 and the bunker site R2 pair are deleted such that the source R1 now becomes an STD and a bunker site STD and the bunker site R2 becomes an STD as well or functions as a standard device. At step 3308, a new RDF relationship using a CREATE PAIR command, for example, is created between the STD device in the target site and the STD device in the bunker site. At step 3310, a determination is made as to whether the RDF configuration uses RAs or fiber channels. If fiber channels are used, control proceeds to step 3314. Otherwise, control proceeds to step 3312 where a director R1–R2 swap may be performed, for example, by a customer engineer editing the configuration file. At step 3314, resynchronization processing is begun to synchronize the bunker site to that of the target site device. At step 3316, the synchronization direction is changed from the target to the bunker site. At step 3318, updated tracks are flagged as invalid R2 tracks and valid R1 tracks in connection with determining data differences between the target site and the bunker site device. At step 3320, RDF operations are resumed and the synchronization between the target and bunker site device is commenced. At step 3322, the resynchronization process is monitored until a desired level of synchronization determined at step 3324 has been achieved. Once this achieved level of synchronization has been reached, control proceeds to step 3326 where applications executing on the recovery site are shut down. At step 3328, another monitoring process is executed in connection with the resynchronization of any remaining data from the R2 at the target site to the bunker site device.

Figure 49:
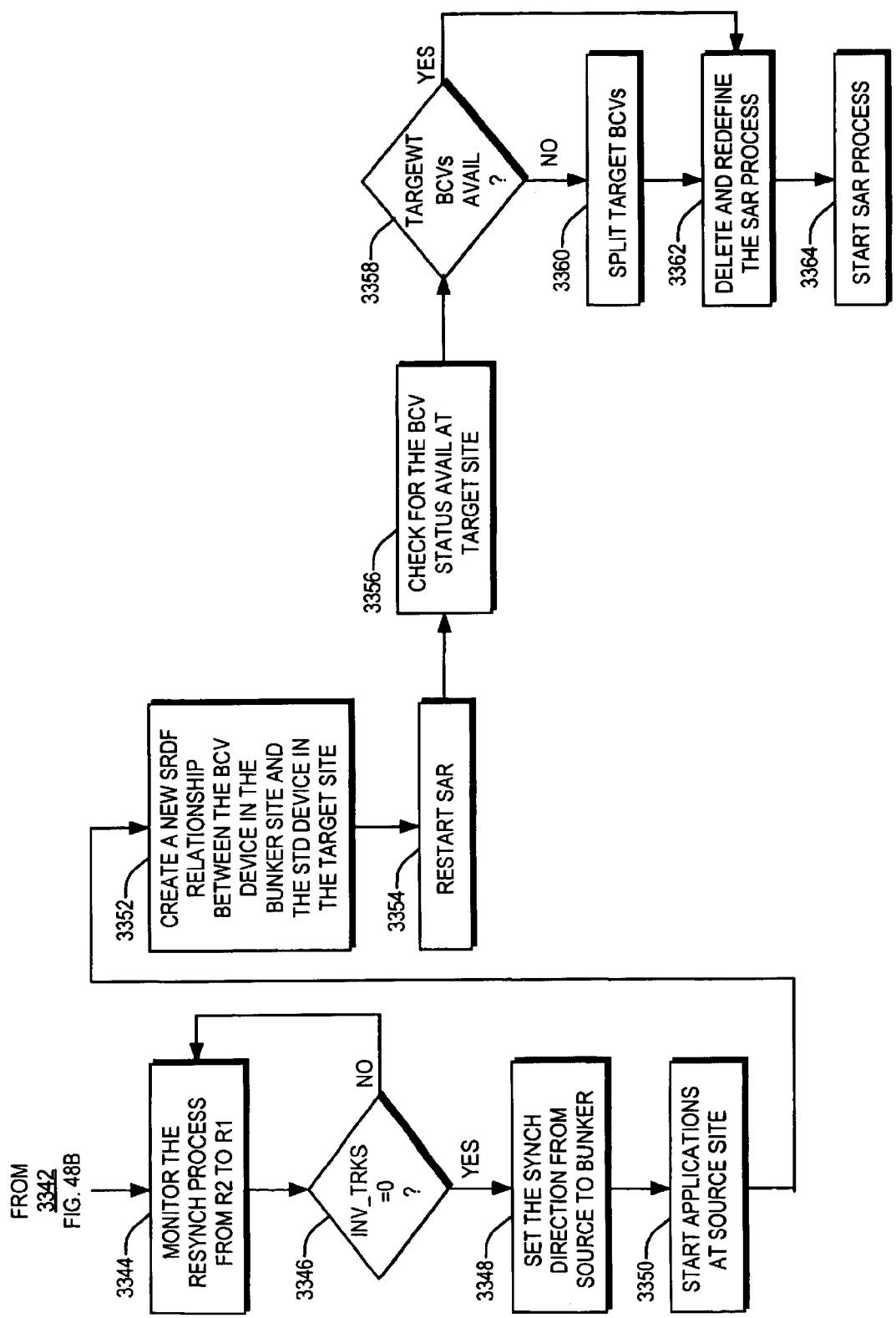
Figure 50:
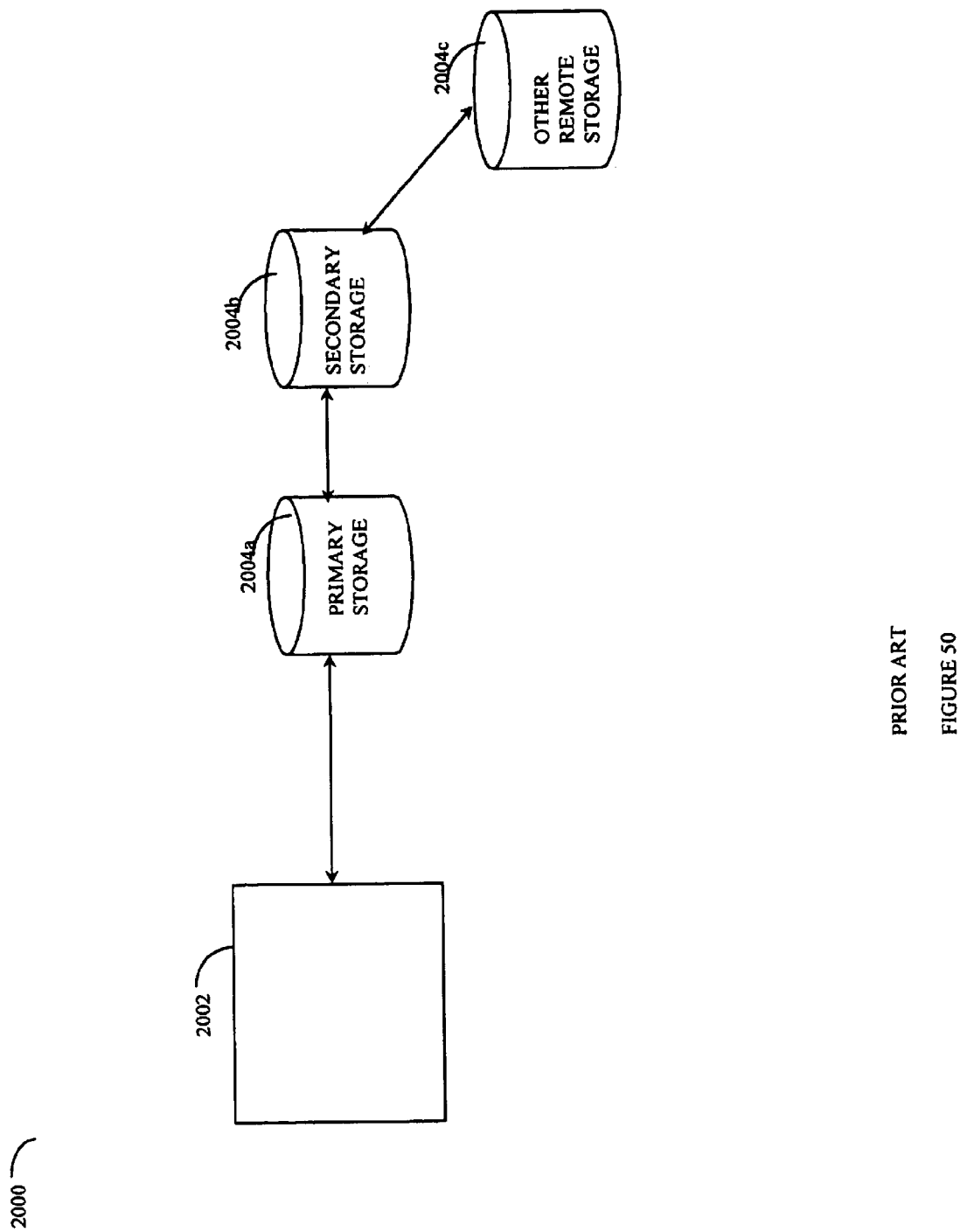
FIG. 50 is an example of a computer system that utilizes prior art techniques for data storage and replication.

When there are no invalid tracks detected at step 3330, the resynchronization process is complete and the bunker site device is synchronized with that of the target device. Control proceeds to step 3332 where RDF is reconfigured to resynchronize the bunker R2 with the source STD. Control proceeds to step 3334 where a delete pair command may be used to delete the target R1 and bunker R2 pair. At step 3336, a new RDF relationship may be created using the create pair command between the STD device and the source site and the STD device of the bunker site. Control proceeds to step 3338 where the synchronization direction has changed from the bunker site to the source site. At step 3340, updated tracks are flagged as invalid R1 tracks and valid R2 tracks in order to propagate any changed data from the bunker site to the source site. At step 3342, normal RDF operations are resumed and synchronization of the bunker site device and the source site device is commenced. Control proceeds to step 3344 of FIG. 49 where the resynchronization process from the bunker site to the source site is monitored until there are no invalid tracks as determined at step 3346.

Once there are no invalid tracks, control proceeds to step 3348 where the synchronization direction is set from the source to the bunker site and applications are started at the source site in step 3350. At step 3352, a create pair command may be used to create a new RDF relationship between the BCV device in the bunker site and the STD device at the target site. At step 3354, the SAR process may be restarted where at step 3356 a check is made of the BCV status available at the target site. If it is determined that all of the target BCVs at the target site are available, control proceeds to step 3362. Otherwise, control proceeds to step 3360 where the target BCVs are split and then control proceeds to step 3362 where the SAR process is deleted and then redefined such that the SAR process may begin again originating from the source site to the target site as prior to the disaster occurring.

As described herein, a zero data loss may be obtained in a multi-hop embodiment utilizing the automated data replication processes in the event of a disaster at the primary site. In connection with a single hop embodiment, there may be some data loss using similar techniques.

It should be noted that the cycle time described herein in connection with SAR process execution may vary in accordance with each embodiment due to factors such as, for example, system data bandwidth and the amount of changed data in each particular system. Cycle time may be tuned in accordance with each of these characteristics and others that may vary with each embodiment.

In the multi-hop embodiments described herein, the source and the bunker sites are typically in close physical proximity resulting in particular communication and data transfer techniques that may be used as described herein. For the multi-hop embodiments described herein, the restart and returning home procedures execute in no protection mode; that is, without having a reverse SAR process execute because the bunker and target sites in the instance of returning home are remotely located typically and not subject to the same physical proximity that the bunker and source sites are. An embodiment may select a new bunker site when performing the returning home procedure to run in a protected mode using the reverse SAR process. However, in this instance the returning home procedure described herein may be varied since data is not being propagated and returned to the primary site through the same path of the original configuration prior to the disaster occurring.

It should be noted that the dynamic RDF techniques as described herein in connection with a multi-hop embodiment may not typically be used in connection with a single hop embodiment which also chooses the option of no protection; that is in which an alternative to executing reverse SAR processing is used to propagate data back to the primary site. In connection with such a single hop embodiment with no protection, it may not justify the configuration overhead associated with using dynamic RDF unless reverse SAR processing is also running.

The foregoing provides a flexible and efficient technique that may be used in connection with a single-hop and a multi-hop embodiment for automated data replication. The foregoing creates a restartable image using consistency technology for disaster recovery on an ongoing basis performed in an automated fashion. The SAR processes described herein may be characterized as asynchronous with respect to the host providing for propagation of data over long distances without propagation delays with respect to host operations. Additionally, in the event of a disaster at the primary site making the primary site unavailable, a zero data loss restartable image may be obtained in connection with a multi-hop embodiment. The restart in the returning home procedures as described herein may use any one of a variety of different options and techniques as well as others to return data back to the originating point or primary site.

It should be noted that processing steps and data structures used in performing the steps described herein may be implemented in hardware, software, or some combination thereof in accordance with the particular requirements of each embodiment. For example, in one embodiment, data structures, such as a bitmap used in connection with determining and maintaining changed device tracks, may be implemented in hardware.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing automated data replication from a first site to a second site comprising:

performing a consistent split data operation splitting a synchronized copy of data from a first device in said first site, said synchronized copy being a consistent point in time copy of data from said first device, wherein performing said consistent split data operation and obtaining said synchronized copy includes suspending write operations from a host computer to a primary device of a primary site for a predetermined time period;

replicating said synchronized copy of data to a second device included in said second site; and performing incremental synchronization of said second device to a third device included in said second site, wherein commands are issued from said host computer to control said automated data replication, wherein a multi-hop configuration includes said first site as a middle site, said second site as a target site, and the multi-hop configuration further includes said primary site, said first device including a mirrored copy of data of said primary device of said primary site maintained in said middle site.

2. The method of claim 1, wherein said primary and middle systems communicate using a synchronous mode of communication to maintain said mirrored copy of data in said middle site.

3. The method of claim 2, wherein said primary and said middle site are in relatively close geographic proximity and said middle site and said target site are not in relatively close geographic proximity.

4. The method of claim 3, wherein said performing a consistent split data operation, said replicating said synchronized copy of data, and said performing incremental synchronization of said second device to a third device are repeatedly performed in accordance with a defined replication cycle controlled by issuing commands from said host computer connected to said primary site.

5. The method of claim 4, further comprising:

copying data from said first device to said second device asynchronously and wherein said third device includes data of said synchronized copy corresponding to an "nth" replication cycle to preserve a point of data consistency during the "n+1" replication cycle.

6. The method of claim 5, comprising:

using at least one consistency group including devices at said primary site in accordance with dependent write operations to ensure a particular ordering of said dependent write operations, said first device being included in said at least one consistency group.

7. The method of claim 6, wherein said copy of data in said third device at said target system is a restartable copy of data from a standard device in said primary site.

8. A computer system comprising:

at least three data storage systems including a primary site, a secondary site and a target site, said secondary site being between said primary and target sites;

a host computer connected to said primary site including instructions that:

automatically control replication of consistent point in time copies of data from said secondary site to said target site;

perform a consistent split data operation splitting a synchronized copy of data from a first device in said secondary site, said synchronized copy being a consistent point in time copy of data from said first device, said first device being a mirrored copy of data from a standard device included in said primary site;

replicate said synchronized copy of data to a second device included in said target site; and perform incremental synchronization of said second device to a third device included in said target site.

9. A computer program product for performing automated data replication from a first site to a second site comprising:

machine executable code that performs a consistent split data operation splitting a synchronized copy of data from a first device in said first site, said synchronized copy being a consistent point in time copy of data from said first device, wherein said machine executable code that performs said consistent split data operation and obtains said synchronized copy includes code that suspends write operations from a host to a primary device of a primary site for a predetermined time period;

machine executable code that replicates said synchronized copy of data to a second device included in said second site; and machine executable code that performs incremental synchronization of said second device to a third device included in said second site, wherein commands are issued from said host computer to control said automated data replication, wherein a multi-hop configuration includes said first site as a middle site, said second site as a target site, and the multi-hop configuration further includes primary site, said first device including a mirrored copy of data of said primary device of said primary site maintained in said middle site.

10. The computer program product of claim 9, wherein said primary and middle systems communicate using a synchronous mode of communication to maintain said mirrored copy of data in said middle site.

11. The computer program product of claim 10, wherein said primary and said middle site are in relatively close geographic proximity and said middle site and said target site are not in relatively close geographic proximity.

12. The computer program product of claim 11, further including machine executable code that repeatedly performs said consistent split data operation, replicates said synchronized copy of data, and performs said incremental synchronization of said second device to a third device in accordance with a defined replication cycle controlled by issuing commands from said host computer connected to said primary site.

13. The computer program product of claim 12, further comprising:

machine executable code that copies data from said first device to said second device asynchronously and wherein said third device includes data of said synchronized copy corresponding to an "nth" replication cycle to preserve a point of data consistency during the "n+1" replication cycle.

14. The computer program product of claim 13, comprising:

machine executable code that uses at least one consistency group including devices at said primary site in accordance with dependent write operations to ensure a particular ordering of said dependent write operations, said first device being included in said at least one consistency group.

15. The computer program product of claim 14, wherein said copy of data in said third device at said target system is a restartable copy of data from a standard device in said primary site.

* * * * *